US012750907B2

(12) United States Patent
Jung et al.

(10) Patent No.: US 12,750,907 B2
(45) Date of Patent: Sep. 29, 2026

(54) METHOD AND DEVICE FOR BEAM FAILURE RECOVERY IN NETWORK COOPERATIVE COMMUNICATION IN WIRELESS COMMUNICATION SYSTEM

(71) Applicant: SAMSUNG ELECTRONICS CO., LTD., Suwon-si (KR)

(72) Inventors: Euichang Jung, Suwon-si (KR); Youngrok Jang, Suwon-si (KR); Suha Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 319 days.

(21) Appl. No.: 18/401,058

(22) Filed: Dec. 29, 2023

(65) Prior Publication Data

US 2024/0138014 A1 Apr. 25, 2024
US 2024/0237118 A9 Jul. 11, 2024

Related U.S. Application Data

(63) Continuation of application No. PCT/KR2022/014450, filed on Sep. 27, 2022.

(30) Foreign Application Priority Data

Sep. 30, 2021 (KR) ........................ 10-2021-0129649

(51) Int. Cl.
*H04B 7/06* (2006.01)
*H04B 7/0408* (2017.01)
(Continued)

(52) U.S. Cl.
CPC ........... *H04W 76/19* (2018.02); *H04W 24/08* (2013.01); *H04W 72/1268* (2013.01);
(Continued)

(58) Field of Classification Search
CPC .. H04B 7/06964; H04B 7/088; H04B 7/0617; H04B 7/0695; H04B 7/0408;
(Continued)

(56) References Cited

U.S. PATENT DOCUMENTS 10,966,183 B2 3/2021 Davydov et al.
11,115,892 B2 9/2021 Dinan et al.
(Continued)

FOREIGN PATENT DOCUMENTS

EP 4064583 A1 9/2022
EP 4322596 A1 2/2024
(Continued)

OTHER PUBLICATIONS

Convida Wireless, 'On Multi-TRP BFR', R1-2108021, 3GPP TSG RAN WG1 Meeting #106-e, Aug. 7, 2021.
(Continued)

*Primary Examiner* — Sai Aung
(74) *Attorney, Agent, or Firm* — NIXON & VANDERHYE P.C.

(57) ABSTRACT

The present disclosure relates to a communication system. The present disclosure may be applied to intelligent services on the basis of 5G communication technology and IoT-related technology. According to the present disclosure, a method performed by a terminal may comprise the steps of: receiving an RRC message, including information on one or more BFD sets, from a base station; identifying whether beam failure is detected for one or more reference signals included in the one or more BFD sets; when beam failure is detected for at least one of the one or more BFD sets, identifying at least one candidate beam reference signal on the basis of a candidate beam set associated with the BFD sets for which beam failure is detected; and transmitting a
(Continued)

BFR request message including information about the at least one candidate beam reference signal.

14 Claims, 28 Drawing Sheets

(51) Int. Cl.

| | |
|---|---|
| ***H04B 7/08*** | (2006.01) |
| ***H04B 17/309*** | (2015.01) |
| ***H04W 24/08*** | (2009.01) |
| ***H04W 72/1268*** | (2023.01) |
| ***H04W 72/1273*** | (2023.01) |
| ***H04W 72/232*** | (2023.01) |
| ***H04W 76/19*** | (2018.01) |
| ***H04W 76/20*** | (2018.01) |

(52) U.S. Cl.
CPC ..... *H04W 72/1273* (2013.01); *H04W 72/232* (2023.01); *H04W 76/20* (2018.02)

(58) Field of Classification Search
CPC ... H04W 72/23; H04W 24/04; H04W 72/046; H04W 52/146; H04W 52/242; H04W 52/42; H04W 72/20; H04W 72/21; H04W 74/004; H04W 84/042; H04W 16/28; H04W 72/02
See application file for complete search history.

(56) References Cited

U.S. PATENT DOCUMENTS

| | | | | |
|---|---|---|---|---|
| 12,082,191 | B2 * | 9/2024 | Bai | H04W 24/04 |
| 2020/0382197 | A1 | 12/2020 | Kang et al. | |
| 2021/0013950 | A1 | 1/2021 | Yang et al. | |
| 2021/0036757 | A1 | 2/2021 | Yu et al. | |
| 2021/0058805 | A1 | 2/2021 | Noh et al. | |
| 2021/0092003 | A1 * | 3/2021 | Zhou | H04W 72/23 |
| 2021/0219366 | A1 * | 7/2021 | Matsumura | H04B 7/0695 |
| 2021/0258065 | A1 | 8/2021 | Xiong et al. | |
| 2021/0351834 | A1 | 11/2021 | Yang et al. | |
| 2022/0166581 | A1 * | 5/2022 | Zhang | H04L 5/0023 |
| 2023/0046074 | A1 * | 2/2023 | Zhang | H04W 72/04 |
| 2023/0050015 | A1 | 2/2023 | Kim et al. | |
| 2023/0053871 | A1 | 2/2023 | Kang et al. | |
| 2023/0144010 | A1 * | 5/2023 | Kwak | H04B 7/024 370/329 |
| 2023/0198602 | A1 * | 6/2023 | Zeineddine | H04B 7/06964 370/329 |
| 2024/0313846 | A1 * | 9/2024 | Yuan | H04B 7/0695 |

FOREIGN PATENT DOCUMENTS

| | | | |
|---|---|---|---|
| WO | 2021-098722 | A | 5/2021 |
| WO | 2021/107575 | A1 | 6/2021 |
| WO | 2021-162423 | A1 | 8/2021 |
| WO | 2021-167528 | A1 | 8/2021 |

OTHER PUBLICATIONS

ZTE, 'Enhancements on beam management for multi-TRP', R1-2106544, 3GPP TSG RAN WG1 Meeting #106-e, Aug. 7, 2021.
Fujitsu, 'Enhancements on beam management for multi-TRP', R1-2107031, 3GPP TSG RAN WG1 Meeting #106-e, Aug. 6, 2021.
3GPP. "Radio Resource Control (RRC) protocol specification (Release 16)" 38.331 v16.6.0. 3rd Generation Partnership Project; Technical Specification Group Radio Access Network; Sep. 2021.
3GPP. "Physical layer procedures for control (Release 16)" 38.213 v16.7.0. 3rd Generation Partnership Project; Technical Specification Group Radio Access Network; Sep. 2021.
3GPP. "Medium Access Control (MAC) protocol specification (Release 16)"38.321 v16.6.0. 3rd Generation Partnership Project; Technical Specification Group Radio Access Network; Sep. 2021.
3GPP. "Summary of enhancements on beam management for multi-TRP (Round 1)" R1-2110494. 3GPP TSG RAN WG1 #106bis-e. e-Meeting, Oct. 11-19, 2021.
3GPP. "Summary of enhancements on beam management for multi-TRP (Round 3)" R1-2110576. 3GPP TSG RAN WG1 #106bis-e. e-Meeting, Oct. 11-19, 2021.
3GPP. "Summary of enhancements on beam management for multi-TRP (Round 1)" R1-2112613. 3GPP TSG RAN WG1 #107-e. e-Meeting, Nov. 11-19, 2021.
3GPP. "Summary of enhancements on beam management for multi-TRP (Round 2)" R1-2112644. 3GPP TSG RAN WG1 #107-e. e-Meeting, Nov. 11-19, 2021.
3GPP. "Moderator summary #1 on enhancements of beam management for multi-TRP" R1-2202612. 3GPP TSG RAN WG1 #108-e. e-Meeting, Feb. 21-Mar. 3, 2022.
3GPP. "Moderator summary #2 on enhancements of beam management for multi-TRP" R1-2202667. 3GPP TSG RAN WG1 #108-e. e-Meeting, Feb. 21-Mar. 3, 2022.
3GPP. "Moderator summary #3 on enhancements of beam management for multi-TRP" R1-2202814. 3GPP TSG RAN WG1 #108-e. e-Meeting, Feb. 21-Mar. 3, 2022.
3GPP. "LS on further questions on feMIMO RRC parameters" R1-2202756. 3GPP TSG-RAN WG1 Meeting #108-e. Electronic Feb. 2022.
3GPP. "[Draft] Additional LS response to RAN2 on beam management for multi-TRP" R1-2202941. 3GPP TSG RAN WG1 #108-e. e-Meeting, Feb. 21-Mar. 3, 2022.
Extended European Search Report for EP 22876802.4 by European Patent Office dated Nov. 19, 2024.
Samsung, "Enhancements on beam management for multi-TRP", 3GPP TSG RAN WG1 #103, R1-2008151, XP051945334, Oct. 2020.

* cited by examiner

METHOD AND DEVICE FOR BEAM FAILURE RECOVERY IN NETWORK COOPERATIVE COMMUNICATION IN WIRELESS COMMUNICATION SYSTEM

CROSS-REFERENCE TO RELATED APPLICATIONS

This application is a continuation application of International Application No. PCT/KR/2022/014450 filed on Sep. 27, 2022, which claims priority from and derives the benefit of Korean Patent Application No. 10-2021-0129649 filed on Sep. 30, 2021, all of which are incorporated herein by reference in their entirety.

TECHNICAL FIELD

The disclosure generally relates to a wireless communication system, and more particularly, to a method and device for efficiently performing a beam failure recovery (BFR) operation.

BACKGROUND 5G mobile communication technology defines a wide frequency band to enable a fast transmission speed and new services, and may be implemented not only in a frequency ('sub 6 GHz') band of 6 GHz or less such as 3.5 GHz, but also in an ultra-high frequency band ('above 6 GHz') called a mmWave such as 28 GHz and 39 GHz. Further, in the case of 6G mobile communication technology, which is referred to as a beyond 5G system, in order to achieve a transmission speed that is 50 times faster than that of 5G mobile communication technology and ultra-low latency reduced to 1/10 compared to that of 5G mobile communication technology, implementations in terahertz bands (e.g., such as 95 GHz to 3 terahertz (3 THz) band) are being considered.

In the early days of 5G mobile communication technology, with the goal of satisfying the service support and performance requirements for an enhanced mobile broadband (eMBB), ultra-reliable low-latency communications (URLLC), and massive machine-type communications (mMTC), standardization has been carried out for beamforming and massive MIMO for mitigating a path loss of radio waves in an ultra-high frequency band and increasing a propagation distance of radio waves, and support for various numerologies (multiple subcarrier spacing operation, and the like) for efficient use of ultra-high frequency resources and dynamic operation for slot formats, initial access technology for supporting multi-beam transmission and broadband, a definition and operation of a band-width part (BWP), a new channel coding method such as low density parity check (LDPC) code for large capacity data transmission and polar code for high reliable transmission of control information, L2 pre-processing, and network slicing that provides a dedicated network specialized for specific services.

Currently, discussions are ongoing to improve initial 5G mobile communication technology and enhance a performance thereof in consideration of services that 5G mobile communication technology was intended to support, and physical layer standardization for technologies such as vehicle-to-everything (V2X) for helping driving determination of an autonomous vehicle and increasing user convenience based on a position and status information of the vehicle transmitted by the vehicle, new radio unlicensed (NR-U) for the purpose of a system operation that meets various regulatory requirements in unlicensed bands, NR UE power saving, a non-terrestrial network (NTN), which is direct UE-satellite communication for securing coverage in areas where communication with a terrestrial network is impossible, and positioning is in progress.

Further, standardization in the field of air interface architecture/protocol for technologies such as industrial Internet of things (IoT) for supporting new services through linkage and convergence with other industries, integrated access and backhaul (IAB) that provides nodes for expanding network service areas by integrating wireless backhaul links and access links, mobility enhancement including conditional handover and dual active protocol stack (DAPS) handover, and 2-step RACH for NR that simplifies a random access procedure is also in progress, and standardization in the field of system architecture/service for 5G baseline architecture (e.g., service based architecture, service based interface) for applying network functions virtualization (NFV) and software-defined networking (SDN) technologies, mobile edge computing (MEC) that receives services based on a position of a UE, and the like is also in progress.

When such a 5G mobile communication system is commercialized, connected devices in an explosive increase trend will be connected to communication networks; thus, it is expected that function and performance enhancement of a 5G mobile communication system and integrated operation of connected devices will be required.

To this end, new research on eXtended reality (XR) for efficiently supporting augmented reality (AR), virtual reality (VR), mixed reality (MR), and the like, 5G performance improvement and complexity reduction using artificial intelligence (AI) and machine learning (ML), AI service support, metaverse service support, and drone communication will be conducted.

Further, the development of such a 5G mobile communication system will be the basis for the development of full duplex technology for improving a system network and frequency efficiency of 6G mobile communication technology, satellite, AI-based communication technology that utilizes artificial intelligence (AI) from a design stage and that realizes system optimization by internalizing end-to-end AI support functions, and next generation distributed computing technology that realizes complex services beyond the limits of UE computing capabilities by utilizing ultra-high-performance communication and computing resources as well as a new waveform for ensuring coverage in a terahertz band of 6G mobile communication technology, full dimensional MIMO (FD-MIMO), multi-antenna transmission technologies such as an array antenna and large scale antenna, metamaterial-based lenses and antennas for improving coverage of terahertz band signals, high-dimensional spatial multiplexing technology using orbital angular momentum (OAM), and reconfigurable intelligent surface (RIS) technology.

With recent developments in communication systems, various studies for improving beam failure recovery procedures are being conducted.

DISCLOSURE

The disclosure provides a method and device capable of flexibly and efficiently performing a beam failure recovery (BFR) operation in a wireless communication system, particularly in a network cooperative communication situation through various embodiments thereof.

According to an embodiment of the disclosure, a method performed by a terminal in a wireless communication system may include receiving, from a base station, a radio resource control (RRC) message including at least one beam failure detection (BFD) set information; identifying whether beam failure for one or more reference signals included in at least one BFD set is detected; identifying, in the case that beam failure is detected for at least one of the one or more BFD sets, at least one candidate beam reference signal based on a candidate beam set linked with the BFD set in which the beam failure is detected; and transmitting a beam failure recovery (BFR) request message including information on the at least one candidate beam reference signal.

According to an embodiment of the disclosure, a terminal of a wireless communication system may include a transceiver; and a processor, wherein the processor may be configured to receive, from a base station, a radio resource control (RRC) message including at least one beam failure detection (BFD) set information, to identify whether beam failure is detected for one or more reference signals included in at least one BFD set, to identify, in the case that beam failure is detected for at least one of the one or more BFD sets, at least one candidate beam reference signal based on a candidate beam set linked with the BFD set in which the beam failure is detected, and to transmit a beam failure recovery (BFR) request message including information on the at least one candidate beam reference signal.

According to an embodiment of the disclosure, a method performed by a base station in a wireless communication system may include transmitting, to a terminal, a radio resource control (RRC) message including at least one beam failure detection (BFD) set information; and receiving a beam failure recovery (BFR) request message including information on at least one candidate beam reference signal, wherein the at least one candidate beam reference signal may be identified based on a candidate beam set linked with a BFD set in which beam failure is detected among one or more BFD sets, and beam failure may be identified based on one or more reference signals included in the BFD set.

According to an embodiment of the disclosure, a base station of a wireless communication system may include a transceiver; and a processor, wherein the processor may be configured to transmit, to a terminal, a radio resource control (RRC) message including at least one beam failure detection (BFD) set information and to receive a beam failure recovery (BFR) request message including information on at least one candidate beam reference signal, wherein the at least one candidate beam reference signal may be identified based on a candidate beam set linked with a BFD set in which beam failure is detected among one or more BFD sets, and beam failure may be identified based on one or more reference signals included in the BFD set.

According to an embodiment of the disclosure, by proposing a method of efficiently performing a beam failure recovery (BFR) operation in a wireless communication system, transmission efficiency of a transmission reception point (TRP) and a reception performance of the terminal in a network cooperative communication situation can be improved.

Figure 1:
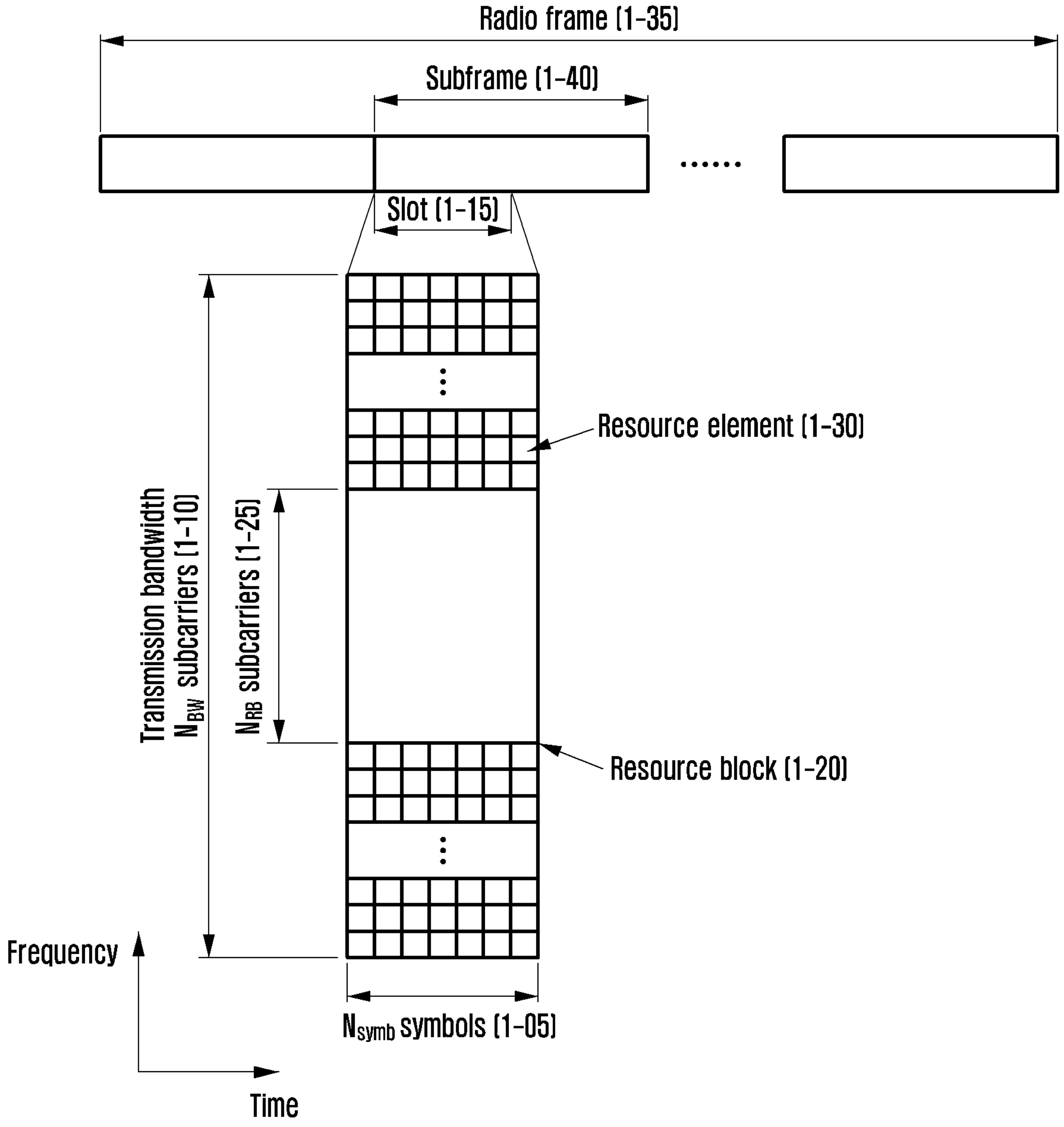
FIG. 1 is a diagram illustrating a time-frequency domain transmission structure of a long-term evolution (LTE), LTE-advanced (LTE-A), new radio (NR) (5G), or similar wireless communication system according to the disclosure.

Hereinafter, embodiments of the disclosure will be described in detail with reference to the accompanying drawings.

In describing embodiments, descriptions of technical contents that are well known in the technical field to which the disclosure pertains and that are not directly related to the disclosure will be omitted. This is to more clearly convey the gist of the disclosure without obscuring the gist of the disclosure by omitting unnecessary description.

For the same reason, some components are exaggerated, omitted, or schematically illustrated in the accompanying drawings. Further, the size of each component does not fully reflect the actual size. In each drawing, the same reference numerals are given to the same or corresponding components.

Advantages and features of the disclosure, and a method of achieving them will become apparent with reference to the embodiments described below in detail in conjunction with the accompanying drawings. However, the disclosure is not limited to the embodiments disclosed below, but may be implemented in various different forms, and only embodiments of the disclosure enable the disclosure to be complete, and are provided to fully inform the scope of the disclosure to those of ordinary skill in the art to which the disclosure belongs, and the disclosure is only defined by the scope of the claims. Like reference numerals refer to like components throughout the specification.

In this case, it will be understood that each block of flowcharts and combinations of the flowcharts may be performed by computer program instructions. Because these computer program instructions may be mounted in a processor of a general purpose computer, a special purpose computer, or other programmable data processing equipment, instructions performed by a processor of a computer or other programmable data processing equipment generate a means that performs functions described in the flowchart block(s). Because these computer program instructions may be stored in a computer usable or computer readable memory that may direct a computer or other programmable data processing equipment in order to implement a function in a particular manner, the instructions stored in the computer usable or computer readable memory may produce a production article containing instruction means for performing the function described in the flowchart block(s). Because the computer program instructions may be mounted on a computer or other programmable data processing equipment, a series of operation steps are performed on the computer or other programmable data processing equipment to generate a computer-executed process; thus, instructions for performing the computer or other programmable data processing equipment may provide steps for performing functions described in the flowchart block(s).

Further, each block may represent a portion of a module, a segment, or a code including one or more executable instructions for executing a specified logical function(s). Further, it should be noted that in some alternative implementations, functions recited in the blocks may occur out of order. For example, two blocks illustrated one after another may in fact be performed substantially simultaneously, or the blocks may be sometimes performed in the reverse order according to the corresponding function.

In this case, a term '-unit' used in this embodiment means software or hardware components such as a field programmable gate array (FPGA) or an application specific integrated circuit (ASIC), and '-unit' performs certain roles. However, '-unit' is not limited to software or hardware. '-unit' may be constituted to reside in an addressable storage medium or may be constituted to reproduce one or more processors. Therefore, according to some embodiments, '-unit' includes components such as software components, object-oriented software components, class components, and task components, processes, functions, properties, procedures, subroutines, segments of program code, drivers, firmware, microcode, circuit, data, databases, data structures, tables, arrays, and variables. Functions provided in the components and '-units' may be combined into a smaller number of components and '-units' or may be further separated into additional components and '-units'. Further, components and '-units' may be implemented to reproduce one or more CPUs in a device or secure multimedia card. Further, according to some embodiments, '-unit' may include one or more processors.

Hereinafter, an operating principle of the disclosure will be described in detail with reference to the accompanying drawings. In the following description, in describing the disclosure, in the case that it is determined that a detailed description of a related well-known function or constitution may unnecessarily obscure the gist of the disclosure, a detailed description thereof will be omitted. Terms described below are terms defined in consideration of functions in the disclosure, which may vary according to intentions or customs of users and operators. Therefore, the definition should be made based on the content throughout this specification.

Hereinafter, a base station is a subject performing resource assignment of a terminal, and may be at least one of a gNode B, an eNode B, a node B, a base station (BS), a radio access unit, a base station controller, a node on a network, or a transmission and reception point (TRP). The terminal may include a user equipment (UE), a mobile station (MS), a cellular phone, a smart phone, a computer, or a multimedia system capable of performing a communication function. The disclosure is not limited to the above example.

Hereinafter, the disclosure describes technology for a UE to receive broadcast information from a base station in a wireless communication system. The disclosure relates to a communication technique that converges a 5th generation (5G) communication system for supporting higher data rates after a 4th generation (4G) system with Internet of Things (IoT) technology, and a system thereof. The disclosure may be applied to intelligent services (e.g., smart home, smart building, smart city, smart car or connected car, healthcare, digital education, retail business, security and safety-related services and the like) based on 5G communication technology and IoT-related technology.

Terms referring to broadcast information, terms referring to control information, terms related to communication coverage, terms (e.g., event) referring to state changes, terms referring to network entities, terms referring to messages, and terms referring to components of a device used in the following description are illustrated for convenience of description. Accordingly, the disclosure is not limited to the terms described below, and other terms having an equivalent technical meaning may be used.

Hereinafter, for convenience of description, some terms and names defined in the 3rd generation partnership project (3GPP) long term evolution (LTE) or 3GPP new radio (NR) standard may be used. However, the disclosure is not limited by the above terms and names, and may be equally applied to systems conforming to other standards. It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

Moving away from providing early voice-oriented services, a wireless communication system is being evolved to a broadband wireless communication system that provides high-speed and high-quality packet data services as in communication standards such as high speed packet access (HSPA), long term evolution (LTE) or evolved universal terrestrial radio access (E-UTRA), LTE-Advanced (LTE-A), and LTE-Pro of 3GPP, high rate packet data (HRPD) and ultra mobile broadband (UMB) of 3GPP2, and IEEE 802.16e.

An LTE system as a representative example of the broadband wireless communication system employs an orthogonal frequency division multiplexing (OFDM) scheme in downlink (DL) and employs a single carrier frequency division multiple access (SC-FDMA) scheme in uplink. The uplink means a radio link in which a user equipment (UE) or a mobile station (MS) transmits data or control signals to an eNode B (eNB) or a base station (BS), and the downlink means a radio link in which a base station transmits data or control signals to a UE. The above-described multiple access scheme may enable data or control information of each user to distinguish by allocating and operating data or control information so that time-frequency resources to carry data or control information for each user do not overlap each other, that is, so that orthogonality is established.

A 5G communication system as a future communication system after LTE should support services that satisfy various requirements because various requirements of users and service providers may be freely reflected. Services considered for the 5G communication system include enhanced mobile broadband (eMBB), massive machine type communication (mMTC), ultra reliability low latency communication (URLLC), and the like.

According to some embodiments, the eMBB aims to provide a more improved data rate than a data rate supported by existing LTE, LTE-A, or LTE-Pro. For example, in the 5G communication system, the eMBB should be able to provide a peak data rate of 20 Gbps in downlink and a peak data rate of 10 Gbps in uplink from the viewpoint of one base station. At the same time, the 5G communication system should provide an increased user perceived data rate of a UE. In order to satisfy such requirements, the 5G communication system requires to improve transmission and reception technologies, including more advanced multi input and multi output (MIMO) transmission technology. Further, the 5G communication system can satisfy a data rate required by the same by using a frequency bandwidth wider than 20 MHz in a frequency band of 3 to 6 GHz or 6 GHz or more instead of 2 GHz band used by current LTE.

At the same time, in the 5G communication system, mMTC is being considered to support application services such as Internet of Things (IoT). In order to efficiently provide IoT, mMTC may require access support for large-scale UEs within a cell, improved coverage of UEs, improved battery time, and reduced UE cost. Because IoT is attached to various sensors and various devices to provide communication functions, it should be able to support a large number of UEs (e.g., 1,000,000 UEs/$km^2$) in a cell. Further, because a UE supporting mMTC is likely to be positioned in a shadow area that is not covered by a cell, such as the basement of a building due to the nature of the service, the UE may require wider coverage than other services provided by the 5G communication system. The UE supporting mMTC should be composed of a low-cost UE, and because it is difficult to frequently replace a battery of the UE, a very long battery life time may be required.

Finally, URLLC is a cellular-based wireless communication service to be used for mission-critical and is a service used for remote control for a robot or machinery, industrial automation, an unmanned aerial vehicle, remote health care, emergency alert and the like and should provide communication providing ultra-low latency and ultra-reliability. For example, a service supporting URLLC should satisfy air interface latency smaller than 0.5 milliseconds and simultaneously has the requirement of a packet error rate of $10^{-5}$ or less. Therefore, for a service supporting URLLC, the 5G system should provide a transmit time interval (TTI) smaller than that of other services, and requires a design requirement that should simultaneously allocate a wide resource in a frequency band. However, the above-described mMTC, URLLC, and eMBB are only examples of different service types, and a service type to which the disclosure is applied is not limited to the above-described examples.

The services considered in the 5G communication system described above should be integrated and provided based on a single framework. That is, for efficient resource management and control, it is desirable for each service to be integrated, controlled, and transmitted as a single system rather than operating independently.

Hereinafter, although embodiments of the disclosure are described using LTE, LTE-A, LTE pro, or NR system as an example, embodiments of the disclosure may be applied to other communication systems having a similar technical background or channel type. Further, embodiments of the disclosure may be applied to other communication systems through some modifications within a range that does not significantly deviate from the scope of the disclosure by the determination of a person having skilled technical knowledge. Hereinafter, a frame structures of LTE, LTE-A, and 5G systems will be described with reference to the drawings, and a design direction of the 5G system will be described.

FIG. 1 is a diagram illustrating a time-frequency domain transmission structure of an LTE, LTE-A, NR (5G), or similar wireless communication system according to the disclosure.

FIG. 1 illustrates a basic structure of a time-frequency resource domain, which is a radio resource domain in which data or control channels of LTE, LTE-A, and NR systems based on a cyclic prefix (CP) orthogonal frequency division multiplexing (OFDM) (CP-OFDM) or single carrier-frequency division multiple access (SC-FDMA) waveform are transmitted.

In FIG. 1, a horizontal axis represents a time domain, and a vertical axis represents a frequency domain. An uplink (UL) may refer to a wireless link through which a UE transmits data or control signals to a base station, and a downlink (DL) may refer to a wireless link through which a base station transmits data or control signals to a UE.

The minimum transmission unit in the time domain of LTE, LTE-A and NR systems is an OFDM symbol or SC-FDMA symbol, and the $N_{symb}$ number of symbols 1-05 may be gathered to form one slot 1-15. In the case of LTE and LTE-A, two slots composed of the $N_{symb}$=7 number of symbols may be gathered to form one subframe 1-40. Further, according to some embodiments, 5G may support two types of slot structures: mini-slot or non-slot. In the case of a 5G slot, $N_{symb}$ may have a value of 14, and in the case of a 5G minislot, $N_{symb}$ may be configured to a value of one of 1, 2, 3, 4, 5, 6, or 7. In LTE and LTE-A, a length of the slot is 0.5 ms and a length of the subframe is fixed to 1.0 ms, but in the case of the NR system, a length of the slot or the minislot may be flexibly changed according to subcarrier spacing. In LTE and LTE-A, a radio frame 1-35 is a time domain unit composed of 10 subframes. In LTE and LTE-A, the minimum transmission unit in the frequency domain is a subcarrier of a 15 kHz unit (subcarrier spacing=15 kHz), and a bandwidth of the entire system transmission band is composed of the total NBW number of subcarriers 1-10. A flexible scalable frame structure of the NR system will be described later.

The basic unit of resources in the time-frequency domain is a resource element (RE) 1-30 and may be represented with an OFDM symbol or SC-FDMA symbol index and a subcarrier index. A resource block (RB) 1-20 or the physical resource block (PRB) may be defined as the $N_{symb}$ number of consecutive OFDM symbols 1-05 or SC-FDMA symbols in the time domain and the $N_R B$ number of consecutive subcarriers 1-25 in the frequency domain. Therefore, one RB 1-20 is composed of the $N_{symb} \times N_{RB}$ number of REs 1-30. In LTE and LTE-A systems, data is mapped in RB units, and the base station performs scheduling in units of RB-pairs constituting one subframe for a predetermined UE. The number of SC-FDMA symbols or the number $N_{symb}$ of OFDM symbols is determined according to a length of a cyclic prefix (CP) added to each symbol in order to prevent interference between symbols, and for example, when a general CP is applied, $N_{symb}$=7, and when an extended CP is applied, $N_{symb}$=6. The extended CP may be applied to a system having a relatively larger radio wave transmission distance than the general CP, thereby maintaining orthogonality between symbols.

According to some embodiments, subcarrier spacing, CP length, and the like are essential information for OFDM transmission and reception, and only when the base station and the UE recognize the value as a common value, smooth transmission and reception may be possible.

A frame structure of the LTE and LTE-A systems as described above is designed in consideration of typical voice/data communications, and has scalability limitations to meet various services and requirements as in the NR system. Therefore, in the NR system, it is necessary to flexibly define and operate the frame structure in consideration of various services and requirements.

Figure 2:
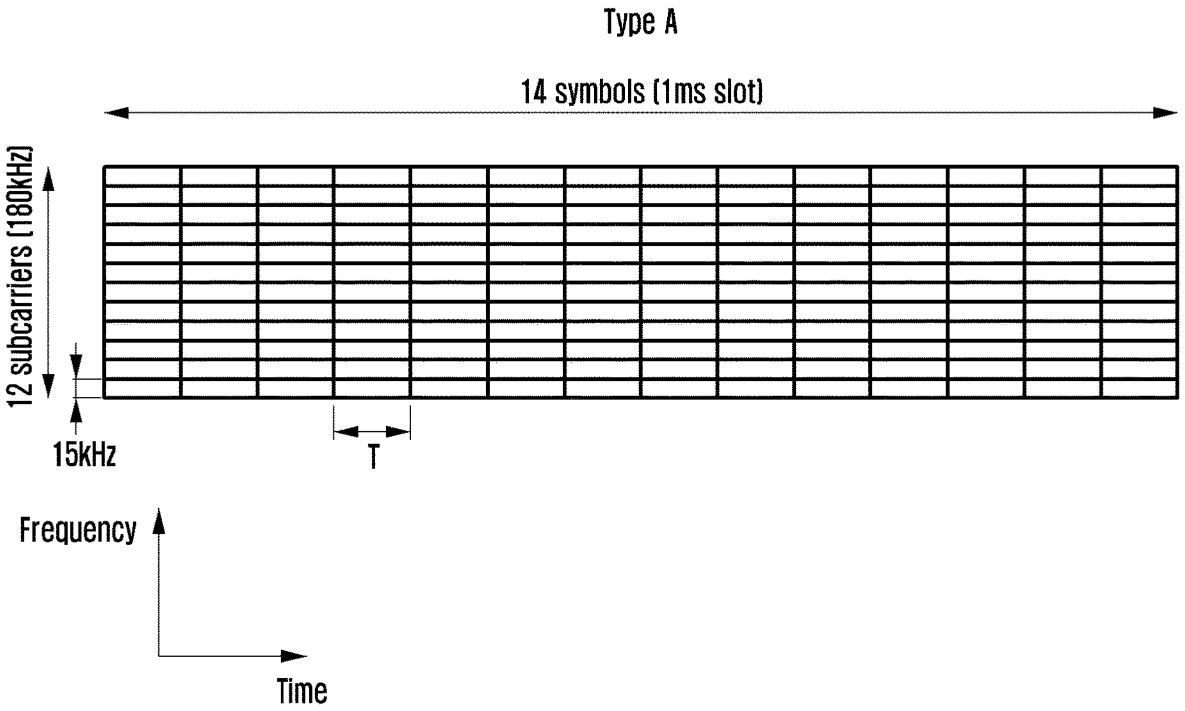
FIG. 2 illustrates a scalable frame structure according to an embodiment of the disclosure.
Figure 3:
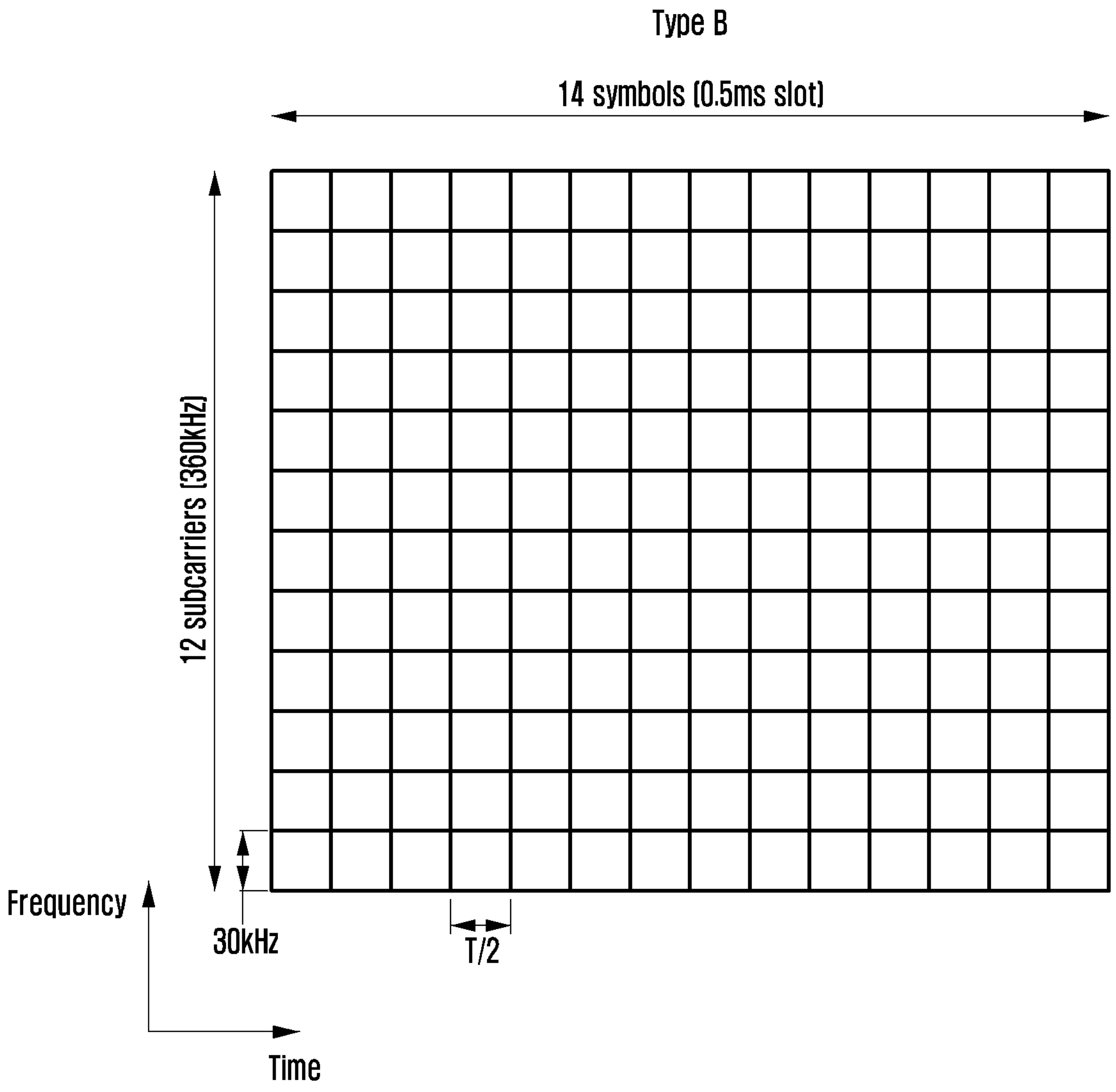
FIG. 3 illustrates a scalable frame structure according to an embodiment of the disclosure.
Figure 4:
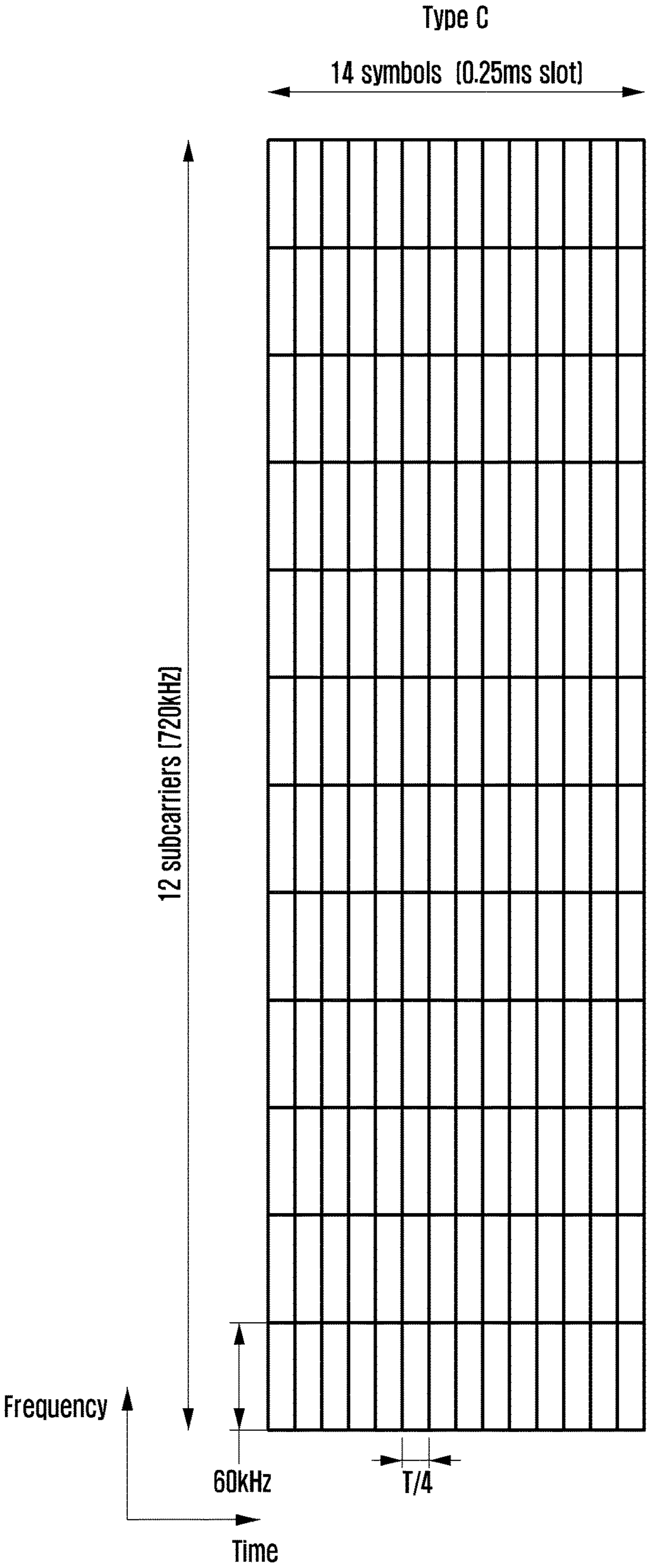
FIG. 4 illustrates a scalable frame structure according to an embodiment of the disclosure.

FIGS. 2 to 4 are diagrams illustrating a scalable frame structure according to an embodiment of the disclosure.

Examples illustrated in FIGS. 2 to 4 may include subcarrier spacing, a CP length, and a slot length as an essential parameter set defining a scalable frame structure.

In the early stages of introduction of the 5G system in the future, at least coexistence or dual mode operation with the existing LTE/LTE-A system is expected. Thereby, the existing LTE/LTE-A may provide a stable system operation, and the 5G system may perform a function of providing improved services. Therefore, the scalable frame structure of the 5G system needs to include at least a frame structure or essential parameter set of LTE/LTE-A. With reference to FIG. 2, it illustrates a 5G frame structure or essential parameter set, such as the frame structure of LTE/LTE-A. A frame structure type A illustrated in FIG. 2 indicates that the subcarrier spacing is 15 kHz, 14 symbols constitute a 1 ms slot, and 12 subcarriers (=180 kHz=12×15 kHz) constitute a physical resource block (PRB).

With reference to FIG. 3, a frame structure type B illustrated in FIG. 3 indicates that the subcarrier spacing is 30 kHz, 14 symbols constitute a 0.5 ms slot, and 12 subcarriers (=360 kHz=12×30 kHz) constitute a PRB. That is, compared to the frame structure type A, the subcarrier spacing and the PRB size are 2 times larger, and the slot length and the symbol length are 2 times smaller.

With reference to FIG. 4, a frame structure type C illustrated in FIG. 4 indicates that the subcarrier spacing is 60 kHz, 14 symbols constitute a 0.25 ms subframe, and 12 subcarriers (=720 kHz=12×60 kHz) constitute a PRB. That is, compared to the frame structure type A, the subcarrier spacing and the PRB size are 4 times larger, and the slot length and the symbol length are 4 times smaller.

That is, when the frame structure type is generalized, subcarrier spacing, CP length, and slot length, which are essential parameter sets have an integer multiple relationship with each other for each frame structure type, thereby providing high scalability. A subframe with a fixed length of 1 ms may be defined to represent a reference time unit that is unrelated to the frame structure type. Therefore, in a frame structure type A, one subframe is composed of one slot, in a frame structure type B, one subframe is composed of two slots, and in a frame structure type C, one subframe is composed of four slots. The scalable frame structure is not limited to the frame structure types A, B, or C described above, and may be applied to other subcarrier spacings such as 120 kHz and 240 kHz and have different structures.

According to some embodiments, the above-described frame structure type may be applied to correspond to various scenarios. From the viewpoint of a cell size, the longer the CP length, the larger cells may be supported; thus, the frame structure type A may support relatively larger cells than the frame structure types B and C. From the viewpoint of the operating frequency band, the larger the subcarrier spacing, the more advantageous it is for phase noise recovery in the high frequency band; thus, the frame structure type C may support a relatively higher operating frequency than the frame structure types A and B. From the viewpoint of a service, a shorter subframe length is more advantageous to support ultra-low-latency services such as URLLC; thus, the frame structure type C is relatively more appropriate for an URLLC service than the frame structure types A and B.

Further, multiple frame structure types may be multiplexed and integrated within one system.

In NR, one component carrier (CC) or serving cell may be composed of maximum 250 or more RBs. Therefore, in the case that the UE always receives the entire serving cell bandwidth as in LTE, power consumption of the UE may be extreme, and in order to solve this, the base station may configure one or more bandwidth parts (BWP) to the UE so that the UE may support to change a receiving area within the cell. In NR, the base station may configure 'initial BWP', which is the bandwidth of a control resource set (CORESET) #0 (or common search space (CSS)) to the UE through a master information block (MIB). Thereafter, the base station may configure first BWP of the UE through RRC signaling and notify at least one BWP configuration information that may be indicated through downlink control information (DCI) in the future. Thereafter, the base station may instruct which band the UE will use by announcing a BWP 1D through DCI. In the case that the UE does not receive DCI at the currently assigned BWP during a particular time or more, the UE returns to 'default BWP' and attempts to receive DCI.

Figure 5:
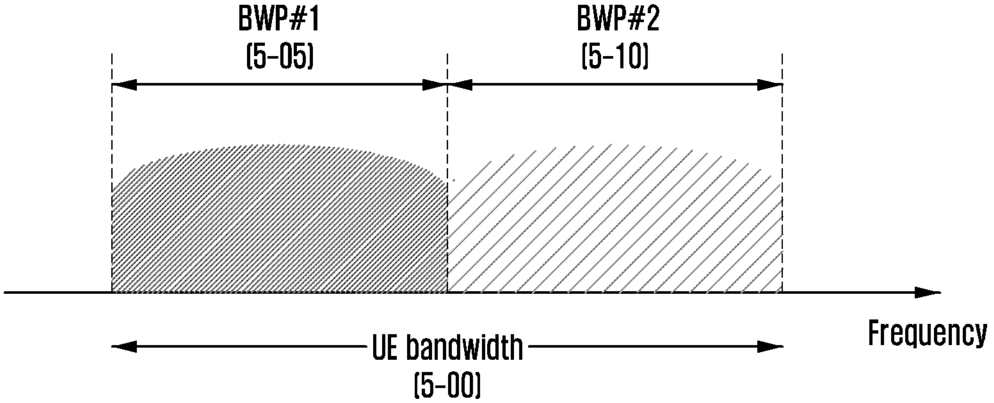
FIG. 5 is a diagram illustrating an example of a configuration for a bandwidth part in a 5G communication system according to an embodiment of the disclosure.

FIG. 5 is a diagram illustrating an example of a configuration for a bandwidth part in an NR (5G) communication system according to an embodiment of the disclosure.

With reference to FIG. 5, a UE bandwidth 5-00 may be configured to two bandwidth parts, that is, a bandwidth part #1, 5-05 and a bandwidth part #2, 5-10. The base station may configure one or multiple bandwidth parts to the UE, and configure the following information for each bandwidth part.

TABLE 1

| |
|---|
| Configuration information 1: Bandwidth of the bandwidth part (number of PRBs constituting the bandwidth part) |
| Configuration information 2: Frequency position of the bandwidth part (This information may include an offset value compared to a reference point, and the reference point may include, for example, a center frequency of the carrier, synchronization signal, and synchronization signal raster) |
| Configuration information 3: Numerology of the bandwidth part (e.g., subcarrier spacing, cyclic prefix (CP) length, and the like) |
| etc. |

In addition to the configuration information in Table 1, various parameters related to the bandwidth part may be configured to the UE. Configuration information may be transmitted by the base station to the UE through upper layer signaling, for example, RRC signaling. Among one or multiple configured bandwidth parts, at least one bandwidth part may be activated. Whether to activate the configured bandwidth part may be semi-statically transmitted from the base station to the UE through RRC signaling or may be dynamically transmitted through a MAC control element (CE) or DCI. A configuration of the bandwidth part supported in the 5G communication system may be used for various purposes. For example, in the case that the bandwidth supported by the UE is smaller than the system bandwidth, this may be supported through a bandwidth part configuration. For example, in Table 1, by configuring a frequency position (configuration information 1) of the bandwidth part to the UE, the UE may transmit and receive data at a specific frequency position within the system bandwidth.

As another example, for the purpose of supporting different numerologies, the base station may configure multiple bandwidth parts to the UE. For example, in order to support both data transmission and reception using subcarrier spacing of 15 kHz and subcarrier spacing of 30 kHz for a certain UE, the two bandwidth parts may be configured to use subcarrier spacings of 15 kHz and 30 kHz, respectively. Different bandwidth parts may be frequency division multiplexed (FDM), and in the case that data is to be transmitted and received at specific subcarrier spacing, the bandwidth part configured at the corresponding subcarrier spacing may be activated.

As another example, for the purpose of reducing power consumption of the UE, the base station may configure bandwidth parts with different sizes of bandwidth to the UE. For example, in the case that the UE supports a very large bandwidth, for example, 100 MHz, and always transmits and receives data with the corresponding bandwidth, very large power may be consumed. In particular, in a situation where there is no traffic, it is very inefficient in terms of power consumption for the UE to monitor unnecessary downlink control channels for a large bandwidth of 100 MHz. Therefore, for the purpose of reducing power consumption of the UE, the base station may configure a relatively small bandwidth part, for example, a bandwidth part of 20 MHz to the UE. In a situation where there is no traffic, the UE may perform monitoring operations in the 20 MHz bandwidth part, and in the case that data is generated, the UE may transmit and receive data using the bandwidth part of 100 MHz according to the instruction of the base station.

Figure 6:
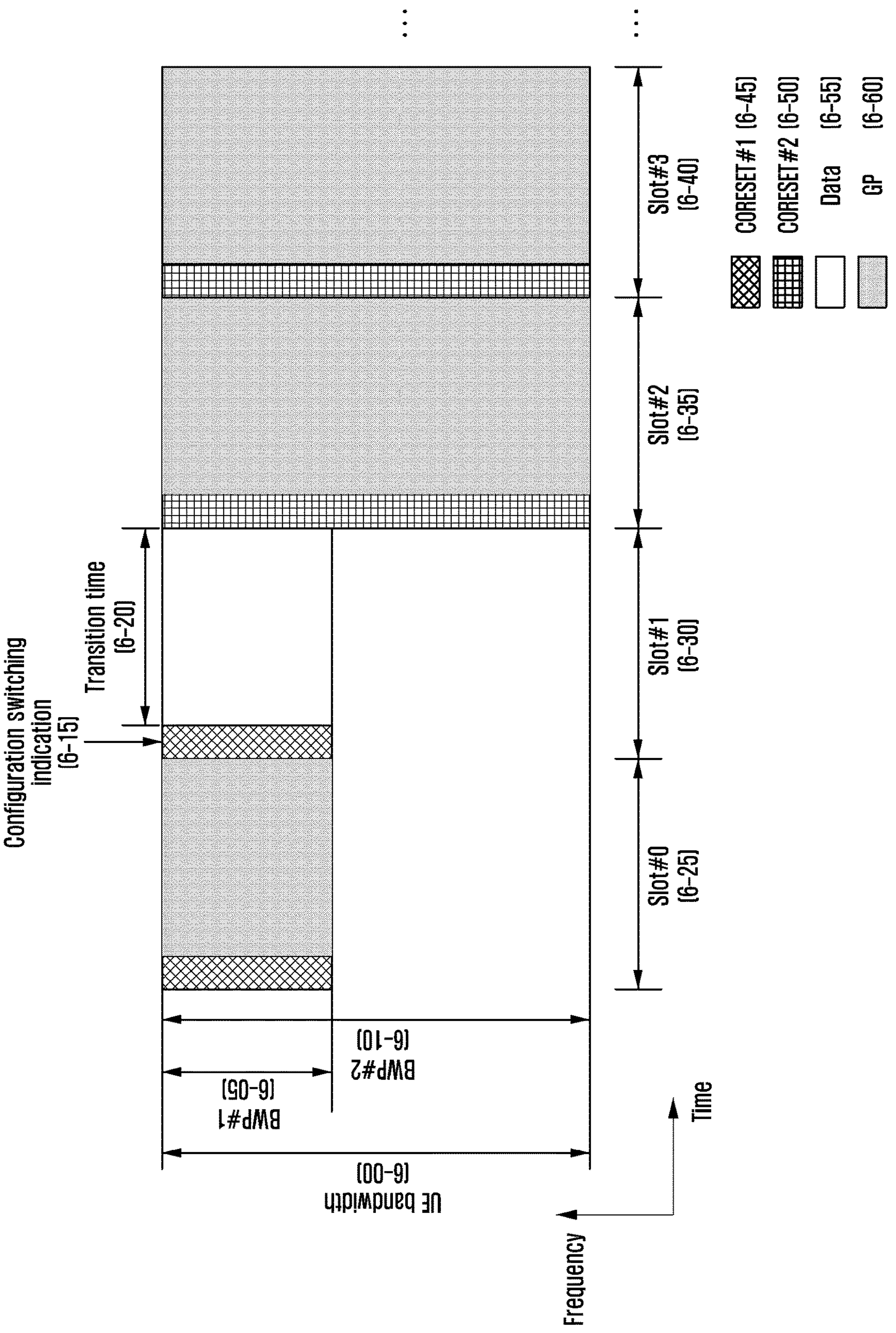
FIG. 6 is a diagram illustrating a method of indicating and changing a bandwidth part according to an embodiment of the disclosure.

FIG. 6 is a diagram illustrating a method of indicating and changing a bandwidth part according to an embodiment of the disclosure.

As described in Table 1, the base station may configure one or multiple bandwidth parts to the UE, and as a configuration for each bandwidth part, the base station may notify information on a bandwidth of the bandwidth part, a frequency position of the bandwidth part, and numerology of the bandwidth part. With reference to FIG. 6, two bandwidth parts, a bandwidth part #1 (BWP #1) 6-05 and a bandwidth part #2 (BWP #2) 6-10 may be configured within a UE bandwidth 6-00 to one UE. Among configured bandwidths, one or multiple bandwidth parts may be activated, and FIG. 6 illustrates an example in which one bandwidth part is activated. In FIG. 6, among bandwidth parts configured in a slot #0, 6-25, the bandwidth part #1, 6-05 is in an activated state, and the UE may monitor a physical downlink control channel (PDCCH) in a control area #1, 6-45 configured to the bandwidth part #1, 6-05, and transmit and receive data 6-55 in the bandwidth part #1, 6-05. A control area in which the UE receives a PDCCH may vary according to which bandwidth part being activated among the configured bandwidth parts, and accordingly, a bandwidth in which the UE monitors the PDCCH may vary.

The base station may additionally transmit an indicator that changes a configuration for the bandwidth part to the UE. Here, changing a configuration for the bandwidth part may be regarded as the same as an operation of activating a specific bandwidth part (e.g., activation change from a bandwidth part A to a bandwidth part B). The base station may transmit a configuration switching indicator to the UE in a specific slot, and the UE may receive the configuration switching indicator from the base station, then determine a bandwidth part to be activated by applying the changed configuration according to the configuration switching indicator from a specific time point, and perform monitoring of the PDCCH in the control area configured in the activated bandwidth part.

In FIG. 6, the base station may transmit a configuration switching indication 6-15 that indicates the UE to switch the activated bandwidth part from the existing bandwidth part #1, 6-05 to the bandwidth part #2, 6-10 at a slot #1, 6-30. After receiving the corresponding indication, the UE may activate the bandwidth part #2, 6-10 according to the contents of the indication. In this case, a transition time 6-20 for switching the bandwidth part may be required, and accordingly, a time point of switching and applying the activated bandwidth part may be determined. FIG. 6 illustrates the case that the transition time 6-20 of 1 slot is required after receiving the configuration switching indication 6-15. Data transmission and reception may not be performed during the corresponding transition time 6-20 (6-60). Accordingly, the bandwidth part #2, 6-10 is activated in a slot #2, 6-35; thus, operations of transmitting and receiving control channels and data with the corresponding bandwidth part may be performed. In a case that transition time of 2 slots are required, bandwidth part #2, 6-10 can be activated in a slot #3, 6-40.

The base station may preconfigure one or multiple bandwidth parts to the UE through upper layer signaling (e.g., RRC signaling), and the configuration switching indication 6-15 may indicate activation with a method of mapping to one of bandwidth part configurations preconfigured by the base station. For example, a log 2N bit indication may select and indicate one of the N number of preconfigured bandwidth parts. Table 2 illustrates an example of indicating configuration information on the bandwidth part using a 2-bit indication.

TABLE 2

| Indication value | Bandwidth part configuration |
|---|---|
| 00 | Bandwidth configuration A configured by upper layer signaling |
| 01 | Bandwidth configuration B configured by upper layer signaling |
| 10 | Bandwidth configuration C configured by upper layer signaling |
| 11 | Bandwidth configuration D configured by upper layer signaling |

The configuration switching indication 6-15 for the above-described bandwidth part may be transmitted from the base station to the UE in the form of medium access control (MAC) control element (CE) signaling or L1 signaling (e.g., common DCI, group-common DCI, and UE-specific DCI). According to the configuration switching indication 6-15 for the above-described bandwidth part, the time point of applying bandwidth part activation depends on the following. A time point to apply the configuration switch depends on a predefined value (e.g., applied after N (≥1) slots after receiving the configuration switching indication), or the base station may configure it to the UE through higher layer signaling (e.g., RRC signaling) or may be included and transmitted as part of the contents of the configuration switching indication 6-15. Alternatively, it may be determined by a combination of the above methods. After receiving the configuration switching indication 6-15 for the bandwidth part, the UE may apply the changed configuration from the time point acquired by the above method.

In addition to frequency domain resource candidate allocation through a bandwidth part indication, NR provides the following detailed frequency domain resource allocation (FD-RA).

Figure 7:
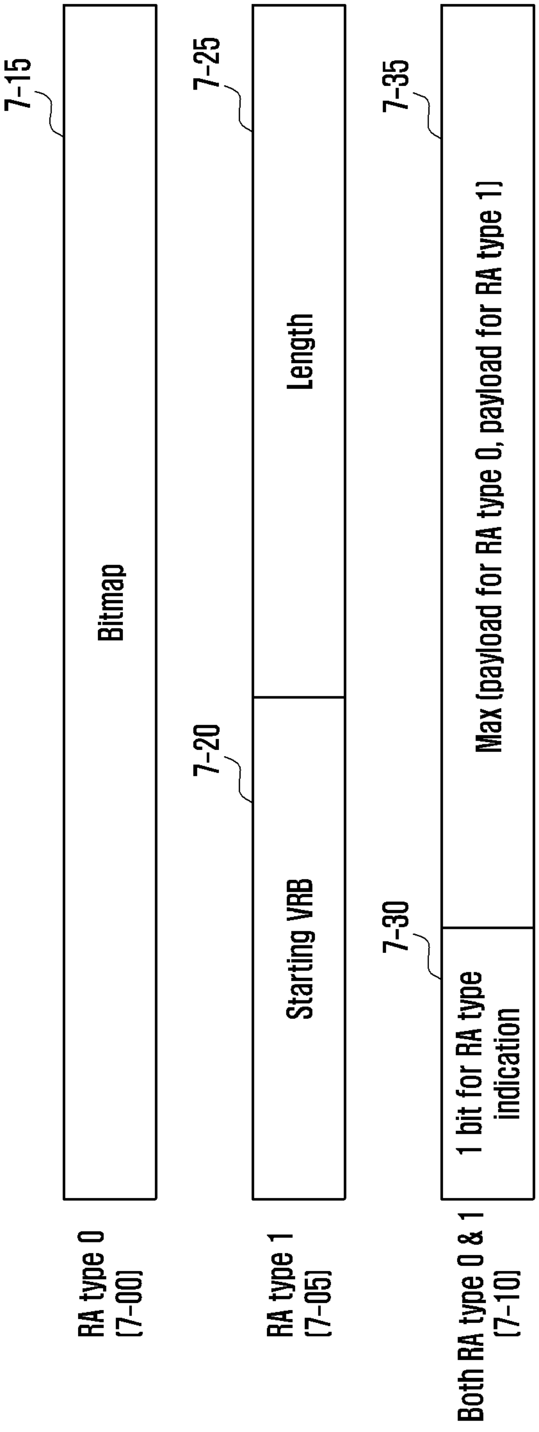
FIG. 7 is a diagram illustrating an example of frequency domain resource assignment of a physical downlink shared channel (PDSCH) according to an embodiment of the disclosure.

FIG. 7 is a diagram illustrating an example of frequency domain resource assignment of a physical downlink shared channel (PDSCH) or a physical uplink shared channel (PUSCH) according to an embodiment of the disclosure.

With reference to FIG. 7, in NR, three frequency domain resource assignment methods of type 0 (7-00), type 1 (7-05), and dynamic switch (7-10) that may be configured through the upper layer are illustrated.

In the case that the UE is configured to use only a resource type 0 through upper layer signaling (7-00), some downlink control information (DCI) that allocates a PDSCH or PUSCH to the UE has a bitmap composed of the NRBG number of bits.

Conditions for this will be described later. In this case, NRBG means the number of resource block groups (RBG) determined as illustrated in Table 3 according to the BWP size assigned by a BWP indicator and an upper layer parameter rbg-Size, and data is transmitted to the RBG indicated as 1 by the bitmap.

TABLE 3

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

In the case that the UE is configured to use only a resource type 1 through upper layer signaling (7-05), some downlink control information (DCI) that allocates a PDSCH or PUSCH to the UE has frequency domain resource assignment information composed of the $$\left\lceil \log_2\left(N_{RB}^{DL,BWP}\left(N_{RB}^{DL,BWP}+1\right)/2\right)\right\rceil$$

number of bits. Conditions for this will be described later. Thereby, the base station may configure a starting VRB 7-20 and a length 7-25 of frequency domain resources continuously allocated from the starting VRB 7-20.

In the case that the UE is configured to use both a resource type 0 and a resource type 1 through upper layer signaling (7-10), some downlink control information (DCI) that allocates a PDSCH or PUSCH to the UE has frequency domain resource assignment information composed of bits of a larger value 7-35 of a payload 7-15 for configuring a resource type 0 and payloads 7-20 and 7-25 for configuring the resource type 1. Conditions for this will be described later. In this case, one bit 7-30 is added to a first part (MSB) of frequency domain resource assignment information within the DCI, and in the case that the bit is 0, it may indicate that a resource type 0 is used, and in the case that the bit is 1, it may indicate that a resource type 1 is used.

Figure 8:
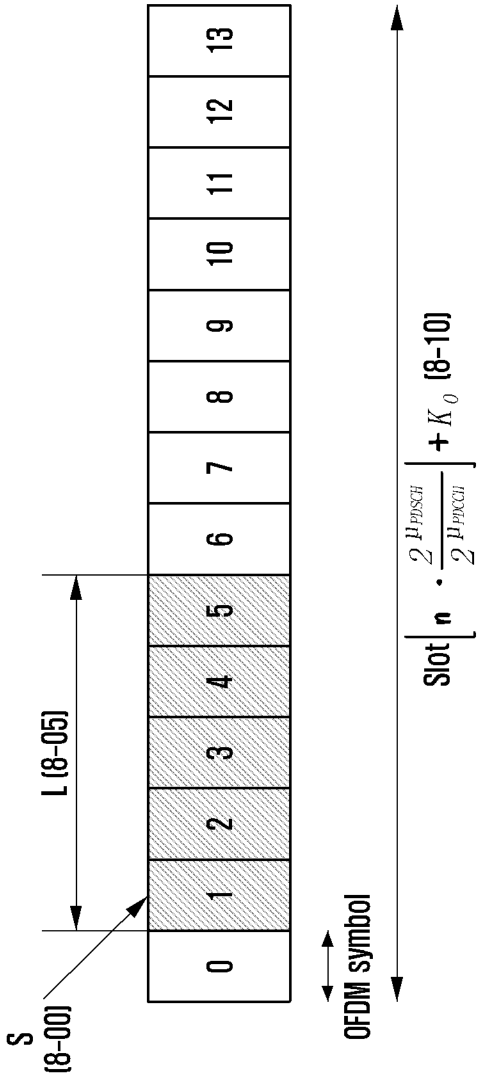
FIG. 8 is a diagram illustrating an example of time domain resource assignment of a PDSCH according to an embodiment of the disclosure.

FIG. 8 is a diagram illustrating an example of time domain resource assignment of a PDSCH or PUSCH according to an embodiment of the disclosure.

With reference to FIG. 8, the base station may indicate a time axis position of the PDSCH resource according to subcarrier spacing of a data channel and control channel configured through upper layer signaling, a scheduling offset ($K_0$ or $K_2$) value, and an OFDM symbol start position 8-00 and length 8-05 within one slot dynamically indicated through DCI.

NR provides various types of downlink control information (DCI) formats, as illustrated in Table 4 according to the purpose for efficient control channel reception of the UE.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, in order to schedule a PDSCH to one cell, the base station may use a DCI format 1_0 or DCI format 1_1. The DC format 1_0 includes at least the following information in the case of being transmitted together with CRC scrambled by a cell radio network temporary identifier (C-RNTI), a configured scheduling RNTI (CS-RNTI), or an MCS-C-RNTI:

- Identifier for DCI formats (1 bits): The DCI format identifier is always configured to 1
- Frequency domain resource assignment $$(\lceil \log_2(N_{RB}^{DL,BWP}(N_{RB}^{DL,BWP}+1)/2)\rceil$$

bits): Indicates frequency domain resource assignment, and in the case that the DCI format 1_0 is monitored in the UE specific search space, $$N_{RB}^{DL,BWP}$$

is the size of the active DL BWP, and in other cases, $$N_{RB}^{DL,BWP}$$

is the size of the initial DL BWP. A detailed method thereof refers to the above frequency domain resource assignment.
- Time domain resource assignment (4 bits): Indicates time domain resource assignment according to the above description.
- VRB-to-PRB mapping (1 bit): 0 indicates non-interleaved, and 1 indicates interleaved VRP-to-PRB mapping.
- Modulation and coding scheme (5 bits): Indicates the modulation order and coding rate used for PDSCH transmission.
- New data indicator (1 bit): Indicates whether the PDSCH is initial transmission or retransmission according to whether toggle.
- Redundancy version (2 bits): Indicates the redundancy version used for PDSCH transmission.
- HARQ process number (4 bits): Indicates the HARQ process number used for PDSCH transmission.
- Downlink assignment index (2 bits): DAI indicator
- TPC command for scheduled PUCCH (2 bits): PUCCH power control indicator
- PUCCH resource indicator (3 bits): The PUCCH resource indicator indicates one of eight resources configured to the upper layer.
- PDSCH-to-HARQ_feedback timing indicator (3 bits): The HARQ feedback timing indicator indicates one of eight feedback timing offsets configured to the upper layer.

The DC format 1_1 includes at least the following information in the case of being transmitted together with CRC scrambled by a C-RNTI, CS-RNTI, or MCS-C-RNTI:

- Identifier for DCI formats (1 bit): The DCI format identifier is always configured to 1
- Carrier indicator (0 or 3 bits): Indicates a CC (or cell) in which a PDSCH allocated by the corresponding DCI is transmitted.
- Bandwidth part indicator (0, 1, or 2 bits): Indicates a BWP in which a PDSCH allocated by the corresponding DCI is transmitted.
- Frequency domain resource assignment (A payload is determined according to the frequency domain resource assignment): Indicates frequency domain resource assignment, and $$N_{RB}^{DL,BWP}$$

is the size of the active DL BWP. A detailed method thereof refers to the above frequency domain resource assignment.
- Time domain resource assignment (4 bits): Indicates time domain resource assignment according to the above description.
- VRB-to-PRB mapping (0 or 1 bit): 0 indicates non-interleaved, and 1 indicates interleaved VRP-to-PRB mapping. In the case that frequency domain resource assignment is configured to a resource type 0, it is 0 bit.
- PRB bundling size indicator (0 or 1 bit): In the case that the upper layer parameter prb-BundlingType is not configured or is configured to 'static', it is 0 bit, and in the case that the upper layer parameter prb-BundlingType is configured to 'dynamic', it is 1 bit.
- Rate matching indicator (0, 1, or 2 bits): Indicates a rate matching pattern.
- ZP CSI-RS trigger (0, 1, or 2 bits): Indicator that triggers an aperiodic ZP CSI-RS.
- For transport block 1:
  - Modulation and coding scheme (5 bits): Indicates the modulation order and coding rate used for PDSCH transmission.
  - New data indicator (1 bit): Indicates whether the PDSCH is initial transmission or retransmission according to whether toggle.
  - Redundancy version (2 bits): Indicates the redundancy version used for PDSCH transmission.
- For transport block 2:
  - Modulation and coding scheme (5 bits): Indicates the modulation order and coding rate used for PDSCH transmission.

New data indicator (1 bit): Indicates whether the PDSCH is initial transmission or retransmission according to whether toggle.

Redundancy version (2 bits): Indicates the redundancy version used for PDSCH transmission.

HARQ process number (4 bits): Indicates the HARQ process number used for PDSCH transmission.

Downlink assignment index (0, 2, or 4 bits): DAI indicator

TPC command for scheduled PUCCH (2 bits): PUCCH power control indicator

PUCCH resource indicator (3 bits): The PUCCH resource indicator indicates one of eight resources configured to the upper layer.

PDSCH-to-HARQ_feedback timing indicator (3 bits): The HARQ feedback timing indicator indicates one of eight feedback timing offsets configured to the upper layer.

Antenna port (4, 5, or 6 bits): Indicates a Demodulation Reference Signal (DMRS) port and Code Division Multiplexing (CDM) group without data.

DMRS sequence initialization (0 or 1 bit): DMRS scrambling ID selection indicator The number of DCIs of different sizes that the UE may receive per slot in the corresponding cell is maximum 4. The number of DCIs of different sizes scrambled with a C-RNTI in which the UE may receive per slot in the corresponding cell is maximum 3.

In NR, in order to receive a PDCCH including DCI, the UE performs blind decoding in a specific time and frequency domain. In order to provide a time, frequency domain, and mapping method in which the UE is to perform blind decoding, the base station may configure a control resource set (CORESET) and search space to the UE through upper layer signaling. The base station may configure maximum 3 CORESETs and maximum 10 search spaces for each BWP configured to the UE. For example, in order to transmit information on the CORESET, the base station and the UE may exchange signaling information as illustrated in Table 5.

TABLE 5

ControlResourceSet information element

```
-- ASN1START-- TAG-CONTROLRESOURCESET-START
ControlResourceSet ::=                      SEQUENCE {
   controlResourceSetId                        ControlResourceSetId,
   frequencyDomainResources                    BIT STRING (SIZE (45)),
   duration                                    INTEGER
(1..maxCoReSetDuration),
   cce-REG-MappingType                         CHOICE {
      interleaved                                 SEQUENCE {
         reg-BundleSize                              ENUMERATED {n2, n3,
n6},
         interleaverSize                             ENUMERATED {n2, n3,
n6},
         shiftIndex
INTEGER(0..maxNrofPhysicalResourceBlocks-1)            OPTIONAL -- Need S
      },
      nonInterleaved                              NULL
   },
   precoderGranularity                         ENUMERATED {sameAsREG-bundle,
allContiguousRBs},
   tci-StatesPDCCH-ToAddList                   SEQUENCE(SIZE (1..maxNrofTCI-
StatesPDCCH)) OF TCI-StateId OPTIONAL,   -- Cond NotSIB1-initialBWP
   tci-StatesPDCCH-ToReleaseList               SEQUENCE(SIZE (1..maxNrofTCI-
StatesPDCCH)) OF TCI-StateId OPTIONAL,   -- Cond NotSIB1-initialBWP
   tci-PresentInDCI                               ENUMERATED {enabled}
OPTIONAL,   -- Need S
   pdcch-DMRS-ScramblingID                        INTEGER (0..65535)
OPTIONAL,   -- Need S
   ...
}
-- TAG-CONTROLRESOURCESET-STOP
-- ASN1STOP
```

Transmission configuration indication (0 or 3 bits): TCI indicator

SRS request (2 or 3 bits): SRS transmission request indicator

CBG transmission information (0, 2, 4, 6, or 8 bits): An indicator indicating whether to transmit code block groups within the allocated PDSCH. 0 means that the corresponding CBG is not transmitted, and 1 means that the corresponding CBG is transmitted.

CBG flushing out information (0 or 1 bit): An indicator that indicates whether previous CBGs are contaminated, 0 means that previous CBGs may be contaminated, and 1 means that previous CBGs may be used (combinable) when receiving retransmissions.

The signaling information ControlResourceSet includes information on each CORESET. Information included in the signaling information ControlResourceSet may have the following meanings:

controlResourceSetId: Indicates the CORESET index.

frequencyDomainResources: Indicates frequency resource information of the CORESET. For all PRBs included in the BWP, 6 RBs are grouped, and indicates with 1 bit whether CORESET frequency resources are included for each RB bundle. (1: Included in the CORESET, 0: Not included in the CORESET)

duration: Symbol level time resource information of the CORESET. It has a value of 1, 2, or 3.

cce-REG-MappingType: Indicates whether control channel elements (CCE) mapped to the CORESET are interleaved. In the case that the CCE is interleaved, it provides additional information (reg-BundleSize, interleaverSize, shiftIndex) on interleaving.

precoderGranularity: Indicates information on frequency resource precoding of the CORESET. The size of the precoder may be the same as the resource element group (REG) bundle size or the size of the entire frequency resource of the CORESET.

tci-StatePDCCH-ToAddList, tci-StatePDCCH-ToReleaseList: Indicates a set of transmission configuration indication (TCI) states that may be activated in the CORESET. One of TCI state sets that may be activated of the CORESET may be activated through higher layer signaling (e.g., MAC CE). In the case that the CORESET is a CORESET configured in an initial connection process, the TCI state set may not be configured. A description of the TCI state will be described later.

tci-PresentInDCI: Indicates whether DCI transmitted from the PDCCH included in the CORESET includes an indicator indicating the TCI state of the PDSCH.

Pdcch-DMRS-ScramblingID: Sequence scrambling index of DMRS transmitted from the PDCCH included in the CORESET The UE may perform blind decoding for receiving the PDCCH with reference to information on the above-described CORESET.

In NR, in order for the UE to smoothly receive and decode a downlink channel (e.g., PDCCH or PDSCH), the base station may transmit information on the quasi co-location (QCL) relationship between antenna ports (e.g., a DMRS port of a PDSCH, a PDSCH DMRS port, or CSI-RS port of CSI-RS) transmitting the downlink channel to the UE. The QCL relationship between antenna ports may have one of total four QCL types.

'QCL-typeA': {Doppler shift, Doppler spread, average delay, delay spread}

'QCL-typeB': {Doppler shift, Doppler spread}

'QCL-typeC': {Doppler shift, average delay}

'QCL-typeD': {Spatial RX parameter}

When some of the above-described QCL types are shared between two different antenna ports, or one antenna port refers to some of QCL types of another antenna port, it may be assumed that the UE has the same value by sharing parameters supported in the QCL types shared or referenced by the two antenna ports.

In order to transmit information on the QCL relationship between antenna ports to the UE, the base station may configure the TCI state. The TCI state includes information on one or two downlink RSs and the supported QCL type. For example, in order to transmit information on the TCI state, the base station and the UE may exchange signaling information as illustrated in Table 6.

TABLE 6

TCI-State information element

```
-- ASN1START-- TAG-TCI-STATE-START
TCI-State ::=          SEQUENCE {
  tci-StateId            TCI-StateId,
  qcl-Type1              QCL-Info,
  qcl-Type2              QCL-Info
OPTIONAL,   -- Need R
  ...
}
QCL-Info ::=           SEQUENCE {
  cell                   ServCellIndex
OPTIONAL,   -- Need R
  bwp-Id                 BWP-Id
OPTIONAL,   -- Cond CSI-RS-Indicated
  referenceSignal        CHOICE {
    csi-rs                 NZP-CSI-RS-ResourceId,
    ssb                    SSB-Index
  },
  qcl-Type               ENUMERATED {typeA, typeB, typeC,
typeD},
  ...
}
-- TAG-TCI-STATE-STOP
-- ASN1STOP
```

The signaling information TCI-state includes information on each TC state. According to the signaling information, each TCI state includes a TCI state index and information on one or two types of QCL-Info (qcl-Type1, qcl-Type2). qcl-Type1 or qcl-Type2 provides a cell index in which an RS is configured, a BWP index including the RS, an RS that provides information on parameters supported in the QCL type according to the QCL type, and information on one of total four QCL types. qcl-Type1 may have one QCL type of 'QCL-typeA', 'QCL-typeB', or 'QCL-typeC' among total four QCL types, and qcl-Type2 may have 'QCL-typeD'. The UE may perform reception and decoding of the downlink channel based on the RS referenced in the activated TCI state and the supported QCL type with reference to the TCI state activated in the antenna port transmitting the downlink channel. NR has a CSI framework for instructing the base station to measure and report channel state information (CSI) of the UE. The CSI framework of NR may be composed of at least two elements of a resource setting and a report setting, and the report setting may have a connection relationship with each other with reference to at least one ID of the resource setting.

According to an embodiment of the disclosure, the resource setting may include information related to a reference signal (RS) for the UE to measure channel state information. The base station may configure at least one resource setting to the UE. For example, in order to transmit information on resource setting, the base station and the UE may exchange signaling information as illustrated in Table 7.

TABLE 7

CSI-ResourceConfig information element

```
-- ASN1START-- TAG-CSI-RESOURCECONFIG-START
CSI-ResourceConfig ::=            SEQUENCE {
   csi-ResourceConfigId              CSI-ResourceConfigId,
   csi-RS-ResourceSetList            CHOICE {
      nzp-CSI-RS-SSB                    SEQUENCE {
         nzp-CSI-RS-ResourceSetList        SEQUENCE (SIZE (1..maxNrofNZP-CSI-
RS-ResourceSetsPerConfig)) OF NZP-CSI-RS-ResourceSetId
OPTIONAL,   -- Need R
         csi-SSB-ResourceSetList           SEQUENCE (SIZE (1..maxNrofCSI-SSB-
ResourceSetsPerConfig)) OF CSI-SSB-ResourceSetId
OPTIONAL   -- Need R
      },
      csi-IM-ResourceSetList            SEQUENCE (SIZE (1..maxNrofCSI-IM-
ResourceSetsPerConfig)) OF CSI-IM-ResourceSetId
   },
   bwp-Id                            BWP-Id,
   resourceType                      ENUMERATED { aperiodic, semiPersistent,
periodic },
   ...
}
-- TAG-CSI-RESOURCECONFIG-STOP
-- ASN1STOP
```

The signaling information CSI-ResourceConfig includes information on each resource setting. According to the signaling information, each resource setting may include a resource set list csi-RS-ResourceSetList including a resource setting index csi-ResourceConfigId, a BWP index bwp-ID, a time axis transmission configuration resourceType of the resource, or at least one resource set. The time axis transmission configuration of resources may be configured to aperiodic transmission, semi-persistent transmission, or periodic transmission. The resource set list may be a set including a resource set for channel measurement or a set including a resource set for interference measurement. In the case that the resource set list is a set including resource sets for channel measurement, each resource set may include at least one resource, which may be an index of a synchronous/broadcast channel block (SS/PBCH block (SSB)) or a CSI reference signal (CSI-RS) resource. In the case that the resource set list is a set including resource sets for interference measurement, each resource set may include at least one interference measurement resource (CSI interference measurement (CSI-IM)). For example, in the case that the resource set includes a CSI-RS, in order to transmit information on the resource set, the base station and the UE may exchange signaling information as illustrated in Table 8.

TABLE 8

NZP-CSI-RS-ResourceSet information element

```
-- ASN1START-- TAG-NZP-CSI-RS-RESOURCESET-START
NZP-CSI-RS-ResourceSet ::=        SEQUENCE {
   nzp-CSI-ResourceSetId             NZP-CSI-RS-ResourceSetId,
   nzp-CSI-RS-Resources              SEQUENCE (SIZE (1..maxNrofNZP-CSI-RS-
ResourcesPerSet)) OF NZP-CSI-RS-ResourceId,
   repetition                        ENUMERATED { on, off }
OPTIONAL,   -- Need S
   aperiodicTriggeringOffset         INTEGER(0..6)
OPTIONAL,   -- Need S
   trs-Info                          ENUMERATED {true}
OPTIONAL,   -- Need R
   ...
}
-- TAG-NZP-CSI-RS-RESOURCESET-STOP
-- ASN1STOP
```

The signaling information NZP-CSI-RS-ResourceSet includes information on each resource set. According to the signaling information, each resource set may include at least a resource set index nzp-CSI-ResourceSetId or information on an index set nzp-CSI-RS-Resources of the including CSI-RS, and include information (repetition) on a spatial domain transmission filter of the including CSI-RS resource or part of information (trs-Info) on whether tracking of the including CSI-RS resource is used. The CSI-RS may be the most representative reference signal included in the resource set. In order to transmit information on CSI-RS resources, the base station and the UE may exchange signaling information as illustrated in Table 9.

TABLE 9

NZP-CSI-RS-Resource information element

```
-- ASN1START-- TAG-NZP-CSI-RS-RESOURCE-START
NZP-CSI-RS-Resource ::=       SEQUENCE {
   nzp-CSI-RS-ResourceId         NZP-CSI-RS-ResourceId,
   resourceMapping               CSI-RS-ResourceMapping,
   powerControlOffset            INTEGER (−8..15),
   powerControlOffsetSS          ENUMERATED{db-3, db0, db3, db6}
OPTIONAL,   -- Need R
```

TABLE 9-continued

| NZP-CSI-RS-Resource information element |
|---|
| scramblingID ScramblingId, |
| periodicityAndOffset CSI-ResourcePeriodicityAndOffset |
| OPTIONAL, -- Cond PeriodicOrSemiPersistent |
| qcl-InfoPeriodicCSI-RS TCI-StateId |
| OPTIONAL, -- Cond Periodic |

information of the CSI-RS resource and may include frequency resource element (RE) mapping, the number of ports, symbol mapping, CDM type, frequency resource density, and frequency band mapping information. The number of ports, frequency resource density, CDM type, and time-frequency axis RE mapping that may be configured through this may have a determined value in one of rows in Table 10.

TABLE 10

| Row | Ports X | Density p | cdm-Type | $(\bar{k}, \bar{l})$ | CDM group index j | k' | l' |
|---|---|---|---|---|---|---|---|
| 1 | 1 | 3 | No CDM | $(k_0, l_0)$, $(k_0 + 4, l_0)$, $(k_0 + 8, l_0)$ | 0, 0, 0 | 0 | 0 |
| 2 | 1 | 1, 0.5 | NO CDM | $(k_0, l_0)$, | 0 | 0 | 0 |
| 3 | 2 | 1, 0.5 | FD-CDM2 | $(k_0, l_0)$, | 0 | 0, 1 | 0 |
| 4 | 4 | 1 | FD-CDM2 | $(k_0, l_0)$, $(k_0 + 2, l_0)$ | 0, 1 | 0, 1 | 0 |
| 5 | 4 | 1 | FD-CDM2 | $(k_0, l_0)$, $(k_0, l_0 + 1)$ | 0, 1 | 0, 1 | 0 |
| 6 | 8 | 1 | FD-CDM2 | $(k_0, l_0)$, $(k_1, l_0)$, $(k_2, l_0)$, $(k_3, l_0)$ | 0, 1, 2, 3 | 0, 1 | 0 |
| 7 | 8 | 1 | FD-CDM2 | $(k_0, l_0)$, $(k_1, l_0)$, $(k_0, l_0 + 1)$, $(k_1, l_0 + 1)$ | 0, 1, 2, 3 | 0, 1 | 0 |
| 8 | 8 | 1 | CDM4 (FD2, TD2) | $(k_0, l_0)$, $(k_1, l_0)$ | 0, 1 | 0, 1 | 0, 1 |
| 9 | 12 | 1 | FD-CDM2 | $(k_0, l_0)$, $(k_1, l_0)$, $(k_2, l_0)$, $(k_3, l_0)$, $(k_4, l_0)$, $(k_5, l_0)$ | 0, 1, 2, 3, 4, 5 | 0, 1 | 0 |
| 10 | 12 | 1 | CDM4 (FD2, TD2) | $(k_0, l_0)$, $(k_1, l_0)$, $(k_2, l_0)$ | 0, 1, 2 | 0, 1 | 0, 1 |
| 11 | 16 | 1, 0.5 | FD-CDM2 | $(k_0, l_0)$, $(k_1, l_0)$, $(k_2, l_0)$, $(k_3, l_0)$, $(k_0, l_0 + 1)$, $(k_1, l_0 + 1)$, $(k_2, l_0 + 1)$, $(k_3, l_0 + 1)$ | 0, 1, 2, 3, 4, 5, 6, 7 | 0, 1 | 0 |
| 12 | 16 | 1, 0.5 | CDM4 (FD2, TD2) | $(k_0, l_0)$, $(k_1, l_0)$, $(k_2, l_0)$, $(k_3, l_0)$ | 0, 1, 2, 3 | 0, 1 | 0, 1 |
| 13 | 24 | 1, 0.5 | FD-CDM2 | $(k_0, l_0)$, $(k_1, l_0)$, $(k_2, l_0)$, $(k_0, l_0 + 1)$, $(k_1, l_0 + 1)$, $(k_2, l_0 + 1)$, $(k_0, l_1)$, $(k_1, l_1)$, $(k_2, l_1)$, $(k_0, l_1 + 1)$, $(k_1, l_1 + 1)$, $(k_2, l_1 + 1)$ | 0, 1, 2, 3, 4, 5, 6, 7, 8, 9, 10, 11 | 0, 1 | 0 |
| 14 | 24 | 1, 0.5 | CDM4 (FD2, TD2) | $(k_0, l_0)$, $(k_1, l_0)$, $(k_2, l_0)$, $(k_0, l_1)$, $(k_1, l_1)$, $(k_2, l_1)$ | 0, 1, 2, 3, 4, 5 | 0, 1 | 0, 1 |
| 15 | 24 | 1, 0.5 | CDM8 (FD2, TD4) | $(k_0, l_0)$, $(k_1, l_0)$, $(k_2, l_0)$ | 0, 1, 2 | 0, 1 | 0, 1, 2, 3 |
| 16 | 32 | 1, 0.5 | FD-CDM2 | $(k_0, l_0)$, $(k_1, l_0)$, $(k_2, l_0)$, $(k_3, l_0)$, $(k_0, l_0 + 1)$, $(k_1, l_0 + 1)$, $(k_2, l_0 + 1)$, $(k_3, l_0 + 1)$, $(k_0, l_1)$, $(k_1, l_1)$, $(k_2, l_1)$, $(k_3, l_1)$, $(k_0, l_1 + 1)$, $(k_1, l_1 + 1)$, $(k_2, l_1 + 1)$, $(k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | $(k_0, l_0)$, $(k_1, l_0)$, $(k_2, l_0)$, $(k_3, l_0)$, $(k_0, l_1)$, $(k_1, l_1)$, $(k_2, l_1)$, $(k_3, l_1)$ | 0, 1, 2, 3, 4, 5, 6, 7 | 0, 1 | 0, 1 |
| 18 | 32 | 1, 0.5 | CDM8 (FD2, TD4) | $(k_0, l_0)$, $(k_1, l_0)$, $(k_2, l_0)$, $(k_3, l_0)$ | 0, 1, 2, 3 | 0, 1 | 0, 1, 2, 3 |

TABLE 9-continued

| NZP-CSI-RS-Resource information element |
|---|
| ... |
| } |
| -- TAG-NZP-CSI-RS-RESOURCE-STOP |
| -- ASN1STOP |

The signaling information NZP-CSI-RS-Resource includes information on each CSI-RS. Information included in the signaling information NZP-CSI-RS-Resource may have the following meaning: —nzp-CSI-RS-ResourceId: CSI-RS resource index resourceMapping: Resource mapping information of CSI-RS resource powerControlOffset: Ratio between PDSCH energy per RE (EPRE) and CSI-RS EPRE powerControlOffsetSS: Ratio between SS/PBCH block EPRE and CSI-RS EPRE scramblingID: scrambling index of CSI-RS sequence periodicityAndOffset: Transmission period and slot offset of CSI-RS resource qcl-InfoPeriodicCSI-RS: In the case that the CSI-RS is a periodic CSI-RS, TCI-state information The resourceMapping included in the signaling information NZP-CSI-RS-Resource indicates resource mapping Table 10 illustrates a frequency resource density, CDM type, frequency axis and time axis start position $(\bar{k}, \bar{l})$ of a CSI-RS component RE pattern that may be configured according to the number (X) of CSI-RS ports, and the number (k') of frequency axis REs and the number (1') of time axis REs of the CSI-RS component RE pattern. The above-described CSI-RS component RE pattern may be a basic unit that constitutes a CSI-RS resource. Through the Y=1+max(k') number of REs of the frequency axis and the Z=1+max(1') number of REs of the time axis, the CSI-RS component RE pattern may be composed of the YZ number of REs. In the case that the number of CSI-RS ports is 1, the CSI-RS RE position may be designated without limitation of subcarriers in the physical resource block (PRB), and the CSI-RS RE position may be designated by a 12-bit bitmap. In the case that the number of CSI-RS ports is 12, 4, 8, 12, 16, 24, 321 and Y=2, a CSI-RS RE position may be designated for every two subcarriers in the PRB, and the CSI-RS RE position may be designated by a 6-bit bitmap. In the case that the number of CSI-RS ports is 4 and Y=4, the CSI-RS RE position may be designated for every four subcarriers in the PRB, and the CSI-RS RE position may be designated by a 3-bit bitmap. Similarly, the time axis RE position may be designated by a bitmap of total 14 bits. In this case, according to the Z value in Table 10, it is possible to change the length of the bitmap as in frequency position designation, but because the principle is similar to the above description, redundant description will be omitted below.

Unlike existing systems, the NR system may support not only services requiring high transmission rates, but also services with very short transmission delays and services requiring a high connection density. In a wireless communication network including multiple cells, transmission and reception points (TRPs), or beams, coordinated transmission between each cell, TRP, or/and beam is one of element technologies that may satisfy the above various service requirements by increasing the strength of the signal received by the UE or efficiently performing interference control between each cell, TRP, or/and beam.

Joint transmission (JT) is a representative transmission technology for the coordinated transmission and through the above technology, the strength of the signal received by the UE may be increased by supporting one UE through different cells, TRPs, or/and beams. Because characteristics of channels between each cell, TRP or/and beam and the UE may differ greatly, different precoding, MCS, and resource assignment need to be applied to the link between each cell, TRP or/and beam and the UE. In particular, in the case of non-coherent joint transmission (NC-JT) supporting non-coherent precoding between each cell, TRP or/and beam, an individual downlink transmission information configuration for each cell, TRP or/and beam becomes important.

Figure 9:
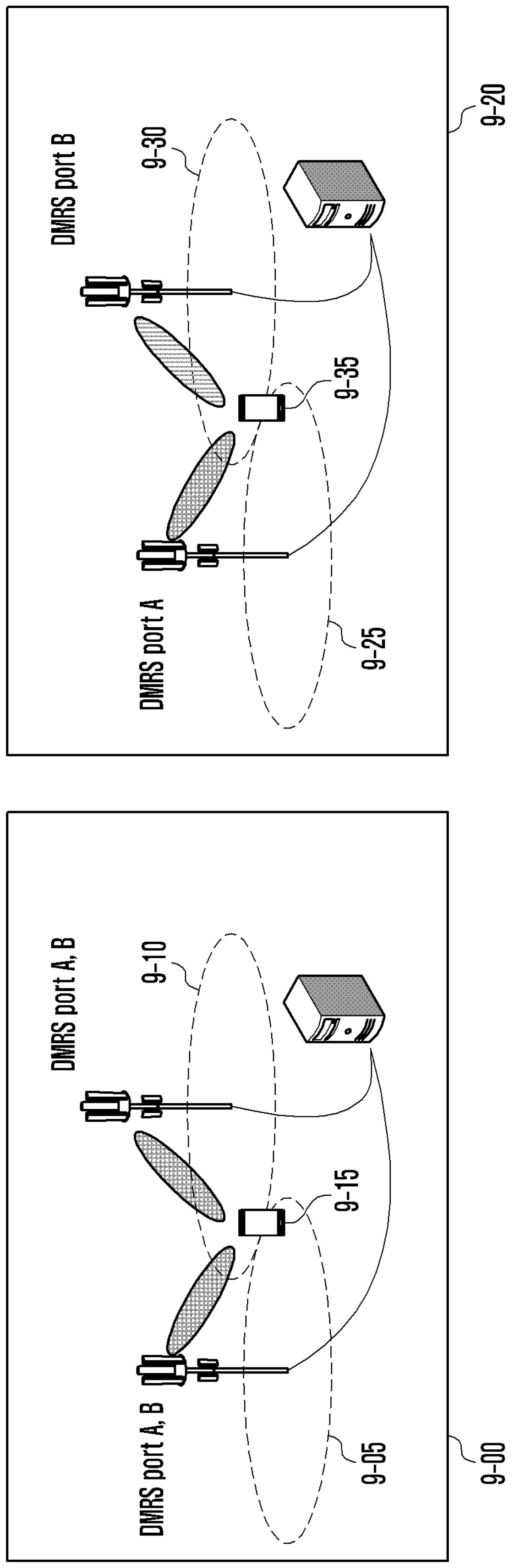
FIG. 9 is a diagram illustrating examples of a radio resource assignment process for each TRP according to a joint transmission (JT) technique and situation according to an embodiment of the disclosure.

FIG. 9 is a diagram illustrating examples of a radio resource assignment process for each TRP according to a joint transmission (JT) technique and situation according to an embodiment of the disclosure.

In FIG. 9, 9-00 is a diagram illustrating coherent joint transmission (C-JT) supporting coherent precoding between each cell, TRP, or/and beam. In C-JT, the same data (PDSCH) is transmitted from a TRP A 9-05 and TRP B 9-10, and joint precoding is performed in a plurality of TRPs. This means that the TRP A 9-05 and the TRP B 9-10 transmit the same DMRS ports (e.g., DMRS ports A and B from both TRPs) for receiving the same PDSCH. In this case, a UE 9-15 will receive one DCI information for receiving one PDSCH demodulated by DMRS ports A and B.

In FIG. 9, 9-20 is a diagram illustrating non-coherent joint transmission (NC-JT) supporting non-coherent precoding between each cell, TRP or/and beam. In the case of NC-JT, different PDSCHs are transmitted in the each cell, TRP or/and beam, and individual precoding may be applied to each PDSCH. This means that a TRP A 9-25 and TRP B 9-30 transmit different DMRS ports (e.g., DMRS port A from the TRP A and DMRS port B from the TRP B) for receiving the different PDSCHs. In this case, a UE 9-35 will receive two types of DCI information for receiving a PDSCH A demodulated by the DMRS port A and a PDSCH B demodulated by another DMRS port B.

In embodiments of the disclosure, "the case of NC-JT" or "the case that NC-JT is applied" may be interpreted in various ways according to the situation, such as "the case that the UE simultaneously receives one or more PDSCHs in one BWP", "the case that the UE simultaneously receives a PDSCH based on two or more TCI indications in one BWP", and "the case that a PDSCH received by the UE is associated with one or more demodulation reference signal (DM-RS) port groups", but for convenience of description, they were used as the expressions described above.

Further, in embodiments of the disclosure, a UE in a coordinated transmission environment may receive information by a plurality of TRPs with various channel qualities, and a TRP that provides main control information with the best channel quality among the plurality of TRPs is referred to as a main TRP, and the remaining TRPs are referred to as cooperative TRPs.

Further, in the embodiments of the disclosure, the "TRP" may be replaced with various terms such as a "panel" or "beam" in actual application.

In order to enable smooth downlink transmission between the base station and the UE, the UE should be able to normally receive a PDCCH transmitted by the base station. In the case that the UE may not normally receive the PDCCH, it may be regarded that beam failure has occurred between the base station and the UE. The reference and method of determining whether the UE may normally receive the PDCCH will be described later. The NR system supports a beam failure recovery (BFR) procedure in order to enable smooth downlink transmission by coping with a dynamic beam failure between the base station and the UE.

A BFR procedure in the NR system may be broadly divided into four processes. A first process is a process of detecting beam failure, which will be described later as a beam failure detection (BFD) process. In the BFD process, it is determined whether the UE may normally receive a PDCCH, and in the case that it is determined that the UE may not normally receive a PDCCH, a lower layer (e.g., physical layer) of the UE reports a beam failure indication (or beam failure instance indication) to a higher layer (e.g., medium access control (MAC) layer). The upper layer of the UE may detect beam failure by reporting and determine whether to perform the next process of BFR. The reference for determining whether the UE may normally receive the PDCCH is a hypothetical PDCCH reception block error rate (BLER) of the UE, which may be determined by comparing the BLER with a predetermined threshold. In order to calculate a hypothetical PDCCH reception BLER of the UE, a reference signal (RS) set for BFD is required, which will be described later as the BFD RS set. The BFD RS set may include maximum two RSs, and the RS may be a periodic CSI-RS transmitted through a single port or a synchronous/broadcast channel block (SS/PBCH block (SSB)). The BFD RS set may be configured through upper layer signaling (e.g., RRC signaling) of the base station. In the case that the BFD RS set is not configured through higher layer signaling, some or all of RSs referenced in the activated TCI state of the CORESET(s) configured for PDCCH monitoring of the UE may be included in the BFD RS set. In the case that there are two or more RSs referenced in the TCI state, an RS referenced for 'QCL-typeD' including beam information may be included in the BFD RS set. The UE may calculate a hypothetical PDCCH reception BLER based only on RSs referenced in an activated TCI state of the CORESET(s) configured for PDCCH monitoring among RSs included in the BFD RS set. The UE may calculate a hypothetical PDCCH reception BLER with reference to Table 11.

TABLE 11

| Attribute | Value for BLER |
|---|---|
| DCI format | 1-0 |
| Number of control OFDM symbols | Same as the number of symbols of CORESET QCLed with respective CSI-RS for BFD |
| Aggregation level (CCE) | 8 |
| Ratio of hypothetical PDCCH RE energy to average CSI-RS RE energy | 0 dB |
| Ratio of hypothetical PDCCH DMRS energy to average | 0 dB |

TABLE 11-continued

| Attribute | Value for BLER |
|---|---|
| CSI-RS RE energy | |
| Bandwidth (MHz) | Same as the number of PRBs of CORESET QCLed with respective CSI-RS for BFD |
| Sub-carrier spacing (kHz) | Same as the SCS of CORESET QCLed with respective CSI-RS for BFD |
| DMRS precoder granularity | REG bundle size |
| REG bundle size | 6 |
| CP length | Same as the CP length of CORESET QCLed with respective CSI-RS for BFD |
| Mapping from REG to CCE | Distributed |

Table 11 provides a configuration for a hypothetical PDCCH in which the UE refers to when calculating a hypothetical PDCCH reception BLER. With reference to Table 11, the UE may calculate a reception BLER of a hypothetical PDCCH that assumes the number of OFDM symbols, bandwidth, subcarrier spacing, and cyclic prefix (CP) length of CORESET(s) in which a TCI state referring to an RS included in the BFD RS set is activated. The UE calculates a hypothetical PDCCH reception BLER for all CORESETs with an activated TCI state referring to the RS included in the BFD RS set, and reports a beam failure indication to the upper layer when a hypothetical PDCCH reception BLER value for all CORESETs exceeds the configured threshold. When the upper layer of the UE receives a beam failure indication report, the upper layer increases a beam failure instance count, and when a count value reaches a configured maximum value, the upper layer may determine whether to perform a next process of BFR and refer to the following parameters configured for an upper layer operation process.

beamFailureInstanceMaxCount: Maximum number of beam failure indication reports of the lower layer of the UE required to perform the next process of the BFR.

beamFailureDetectionTimer: Timer configuration for initializing the number of beam failure indication reports of the UE A second process of a BFR procedure in the NR system is a process of finding a new beam with good channel conditions, which will be described later as a new candidate beam identification process. When the upper layer of the UE detects beam failure and determines to proceed a process of finding a new beam, the upper layer may request the lower layer of the UE to report information on a new candidate beam, for example, L1-reference signal received power (RSRP). The base station may configure a candidate beam RS set to the UE through higher layer signaling so that the UE may calculate information on a new candidate beam. The candidate beam RS set may include maximum 16 RS, and the corresponding RS may be a periodic CSI-RS or SSB. When the upper layer of the UE requests the lower layer of the UE to report information on a new candidate beam, the lower layer of the UE reports index information of the RS and an L1-RSRP measurement value for an RS with an L1-RSRP value greater than an RSRP threshold configured through upper layer signaling among RSs included in the candidate beam RS set. The upper layer of the UE may obtain information on a new beam with good channel conditions through reporting.

When the upper layer of the UE obtains information on new beams with good channel conditions, the upper layer selects one of them and notifies the physical layer of this, and the UE transmits a request signal for BFR to the base station. This corresponds to a third process of the BFR procedure, and will be described later in the BFR request process. The upper layer of the UE selects a new RS to be referenced by the UE for a BFR request from the candidate beam RS set based on information on a new beam and notifies the physical layer of the new RS. The UE may obtain configuration information on a physical random access channel (PRACH) transmission to send the BFR request through new RS information on the BFR request and BFR request resource information configured through upper layer signaling. For example, in order to transmit configuration information for PRACH transmission to send a BFR request, the base station and the UE may exchange upper layer signaling information as illustrated in Table 12.

TABLE 12

BeamFailureRecoveryConfig information element

```
-- ASN1START-TAG-BEAMFAILURERECOVERYCONFIG-START
BeamFailureRecoveryConfig ::=        SEQUENCE {
  rootSequenceIndex-BFR                INTEGER (0..137)
OPTIONAL,   -- Need M
  rach-ConfigBFR                       RACH-ConfigGeneric
OPTIONAL,   -- Need M
  rsrp-ThresholdSSB                    RSRP-Range
OPTIONAL,   -- Need M
  candidateBeamRSList                  SEQUENCE (SIZE(1..maxNrofCandidateBeams)) OF
PRACH-ResourceDedicatedBFR   OPTIONAL,   -- Need M
  ssb-perRACH-Occasion                 ENUMERATED {oneEighth, oneFourth, oneHalf, one,
two,
                                         four, eight, sixteen}
OPTIONAL,   -- Need M
  ra-ssb-OccasionMaskIndex             INTEGER (0..15)
OPTIONAL,   -- Need M
  recoverySearchSpaceId                SearchSpaceId
OPTIONAL,   -- Need R
  ra-Prioritization                    RA-Prioritization
OPTIONAL,   -- Need R
  beamFailureRecoveryTimer             ENUMERATED {ms10, ms20, ms40, ms60, ms80, ms100,
ms150, ms200}   OPTIONAL,   -- Need M
  ...,
  [[
  msg1-SubcarrierSpacing-v1530         SubcarrierSpacing
OPTIONAL   -- Need M
```

TABLE 12-continued

BeamFailureRecoveryConfig information element

```
  ]]
}
PRACH-ResourceDedicatedBFR ::=    CHOICE {
  ssb                               BFR-SSB-Resource,
  csi-RS                            BFR-CSIRS-Resource
}
BFR-SSB-Resource ::=              SEQUENCE {
  ssb                               SSB-Index,
  ra-PreambleIndex                  INTEGER (0..63),
  ...
}
BFR-CSIRS-Resource ::=            SEQUENCE {
  csi-RS                            NZP-CSI-RS-ResourceId,
  ra-OccasionList                   SEQUENCE (SIZE(1..maxRA-OccasionsPerCSIRS)) OF
INTEGER (0..maxRA-Occasions-1)   OPTIONAL,   -- Need R
  ra-PreambleIndex                  INTEGER (0..63)
OPTIONAL,   -- Need R
  ...
}
-- TAG-BEAMFAILURERECOVERYCONFIG-STOP
-- ASN1STOP
```

Upper layer signaling information BeamFailureRecoveryConfig includes information on PRACH transmission to send a BFR request. Information included in BeamFailureRecoveryConfig may have the following meaning. That is, the BeamFailureRecoveryConfig may include the following information: —rootSequenceIndex-BFR: Root sequence index of the sequence used for PRACH transmission.

- rach-ConfigBFR: The rach-ConfigBFR includes a PRACH configuration index, number of frequency resources, frequency resource start point, response monitoring window, and parameters for adjusting PRACH transmission intensity among parameters for PRACH transmission.
- rsrp-ThresholdSSB: RSRP threshold that may be selected as a new beam among RSs included in the candidate beam RS set
- candidateBeamRSList: candidate beam RS set
- ssb-perRACH-Occasion: Number of SSBs connected to random access channel (RACH) transmission occasion
- ra-ssb-OccasionMaskIndex: PRACH mask index for random access resource selection of the UE
- recoverySearchSpaceId: Search space index for receiving the PDCCH used for random access response (RAR) signal transmission of the base station according to the BFR request.
- ra-Prioritization: A parameter set used in a random access process with a priority.
- beamFailureRecoveryTimer: Timer for initializing a configuration for a PRACH resource to send a BFR request
- msg1-SubcarrierSpacing-v1530: Subcarrier spacing of PRACH transmission to send a BFR request.

The UE may transmit a BFR request signal to the base station with reference to configuration information on PRACH transmission to send a BFR request.

A fourth process of the BFR procedure in the NR system is a process in which the base station that has received the BFR request signal from the UE sends a response signal to the UE, and will be described later as a gNB response process. Among configuration parameters for the BFR, the above-described signaling information BeamFailureRecoveryConfig includes a search space index for receiving a PDCCH used for random access response signal transmission of the base station according to the BFR request. The base station may transmit a PDCCH using resources of a search space configured for a response. When the UE receives the PDCCH through the search space for receiving the PDCCH, the UE may determine that the BFR procedure is complete. When the UE receives the PDCCH through a search space for receiving the PDCCH, the base station may instruct the UE to configure a new beam for PDCCH or physical uplink control channel (PUCCH) transmission.

The disclosure provides a BFR method and process using simplified procedures in an NR system considering network coordinated transmission, and the method and process will be described below as partial BFR. The partial BFR may be defined to performing BFR using only some processes of existing BFR procedures of the NR system or partially performing existing BFR by simplifying some of the overall processes, according to various embodiments of the disclosure as described later.

The current NR system may include maximum two RSs in the BFD RS set, and the UE may receive a configuration of information on RSs included in the BFD RS set from the base station through upper layer signaling, and in the case that the BFD RS set is not configured through upper layer signaling, the UE may include maximum two of some or all of RSs referenced in an activated TCI state of a CORESET(s) configured for PDCCH monitoring in the BFD RS set. In this case, because the base station may not obtain information on the BFD RS set determined by the UE, the understanding of a BFR request signal of the UE may be low.

Another problem is that the BFD RS set may include maximum 2 RSs, while a CORESET configured for PDCCH monitoring of the UE may be configured to maximum 3 in the current NR system. Further, in the release 16 NR system, in the case of multiple PDCCH-based multi-TRP transmission, the maximum number of CORESETs per bandwidth part was increased to 5, and in Release 16 NR-U, there was discussion on the increase of the maximum number of CORESETs per bandwidth part in order to support a wideband operation. Therefore, as in the existing BFD operation, when the hypothetical PDCCH reception BLER is calculated with reference to Table 11 for all RSs in the BFD RS, and all BLER values exceed the threshold, and beam failure indication reporting to the upper layer is performed, latency required to proceed to the remaining BFR process may be increased, and a situation in which only the BLER value for a specific RS in the BFD RS set exceeds the threshold cannot be detected. Therefore, in the case that the BFD RS set is not configured to the UE through upper layer signaling, for RSs in the selected BFD RS set among RSs referenced in an activated TCI state of a CORESET(s) configured for PDCCH monitoring of the UE, by instructing by the base station, to the UE, a method of configuring to perform a beam failure indication with only some of the RSs, configuring a plurality of BFD RS sets to the UE through upper layer signaling, or enabling the UE to arbitrarily select a plurality of BFD RS sets, the efficiency of the BFD process that determines whether smooth downlink transmission between the base station and the UE is possible may be increased, making it possible to perform the BFR procedure with low latency.

Further, in the current NR system, when the base station configured a BFD RS set to the UE through upper layer signaling, RSs in the configuration cannot be changed. Among RSs included in the BFD RS set, the UE may detect beam failure based only on the RS referenced in the activated TCI state of the CORESET configured for PDCCH monitoring. Therefore, according to the foregoing description, when the BFD RS set is configured through upper layer signaling, the RS that does not correspond to the RS referenced in the activated TCI state of the CORESET configured for PDCCH monitoring of the UE among RSs included in the BFD RS set configured through upper layer signaling is not used when the UE detects beam failure. Therefore, in the case that there is a discrepancy between the BFD RS set configured through upper layer signaling and the RS referenced in the activated TC state of the CORESET configured for PDCCH monitoring of the UE, it is difficult to expect stable beam failure detection of the UE, which may soon lead to a decrease in downlink reception performance. For example, the base station may configure a BFD RS set to the UE through RRC signaling, whereas because the base station activates the TCI state of the CORESET through MAC CE signaling, there may occur a discrepancy between the two due to the difference in latency according to the signaling method. In order to solve the above-described problem, the base station may recognize information on the BFD RS set selected by the UE by instructing, to the UE, a method of selecting some of RSs referenced in the activated TC state of the CORESET(s) configured for PDCCH monitoring of the UE. This may be used for increasing understanding of the base station on a BFR request signal of the UE. Alternatively, it may be possible to perform a BFR procedure with less latency by increasing efficiency of the BFD process that determines whether smooth downlink transmission between the base station and the UE is possible. Alternatively, it may be possible to perform a BFD process of effectively determining beam failure between the base station and the UE by instructing the appropriate RS to be included in the BFD RS set. The same problem may be applied to the candidate beam RS set used in a new candidate beam identification process.

Further, because the BFR procedure of the current NR system was designed without considering operations of a multi-TRP/panel of the base station, the BFR procedure may be performed efficiently when using each link between the multi-TRP/panel of the base station and the UE rather than operating according to the existing BFR procedure when operating the multi-TRP/panel of the base station. For example, when using a link between a TRP or panel that is not experiencing beam failure among multi-TRPs/panels connected to the UE and the UE, BFR for a link between a TRP or panel that is experiencing beam failure and the UE may be recovered within low latency. Among embodiments of the disclosure, the simplification of a BFR procedure considering multiple links of the multi-TRP/panel is not limited to the multi-TRP/panel, and even in a single-TRP/panel situation, a plurality of BFD RS sets are defined, and the same may be applied in an environment where BFR is performed for each BFD RS set.

Hereinafter, embodiments of the disclosure will be described in detail with accompanying drawings. Further, in describing the disclosure, in the case that it is determined that a detailed description of a related function or constitution may unnecessarily obscure the gist of the disclosure, a detailed description thereof will be omitted. Terms described below are terms defined in consideration of functions in the disclosure, which may vary according to intentions or customs of users and operators. Therefore, the definition should be made based on the content throughout this specification.

Hereinafter, in the disclosure, the above examples are described through a number of embodiments, but these are not independent examples, and one or more embodiments may be applied simultaneously or in combination.

Embodiment 1: Method of Constituting and Providing BFD RS Set and BFD RS Group for Partial BFR In an embodiment of the disclosure, the UE may receive a configuration of one or more BFD RS sets from the base station through upper layer signaling. In this case, the number of RSs in each BFD RS set may be maximum 2 or more RSs. Further, in order to enable the base station and the UE to perform partial BFR, RSs defined in the BFD RS set are grouped, and in the case that beam failure occurs in all RSs in the group for each group, a physical layer of the UE transmits a beam failure indication to the upper layer. In this case, the unit of grouped RSs may have one of various names such as a BFD RS group, BFD RS subset, BFD RS subgroup, BFD RS subset, and BFD RS subgroup, which will be described later as a BFD RS group. Regardless of whether there is one or more BFD RS sets, there may be one or more BFD RS groups within each BFD RS set defined to perform partial BFR. Considering each or a combination of elements listed below, RSs in each BFD RS set may be grouped and used as a basis for prioritizing in constituting each BFD RS group.

- RS time axis operation method: There may be three types of RS: periodic, semi-persistent, and aperiodic RS. For example, a method of disposing (including) in the RS group in order of periodic→semi-periodic→aperiodic RS or a method of first disposing one periodic RS in each RS group and then disposing semi-persistent RS and aperiodic RS may be used.
- CORESET index value: It may be disposed in the RS group according to the magnitude of an index value of the CORESET that receives a configuration of the TCI state that uses each RS as the reference. For example, a method of disposing from an RS corresponding to a low CORESET index for each RS group or a method of disposing from an RS corresponding to a high CORESET index for each RS group may be used.
- CORESETPoolIndex value: The CORESET may include an index such as CORESETPoolIndex that may identify which TRP it was transmitted from. A method of grouping reference RSs of the TCI state configured to the CORESET with the same index into the same group with reference to the corresponding index may be used.
- QCL Type: a method of disposing one of RSs configured to a specific QCL-Type (e.g., QCL-TypeD) in the TCI state of the CORESET in each group or a method of configuring RSs configured to a specific QCL-Type (e.g., QCL-TypeD) into one group may be used.

In the case that the UE does not receive a configuration of the BFD RS set from the base station through upper layer signaling, the above method of configuring and providing a BFD RS set may be applied even to the case of indicating a method in which the UE arbitrarily constitutes the BFD RS set or in which the base station constitutes the BFD RS set to the UE.

Figure 10:
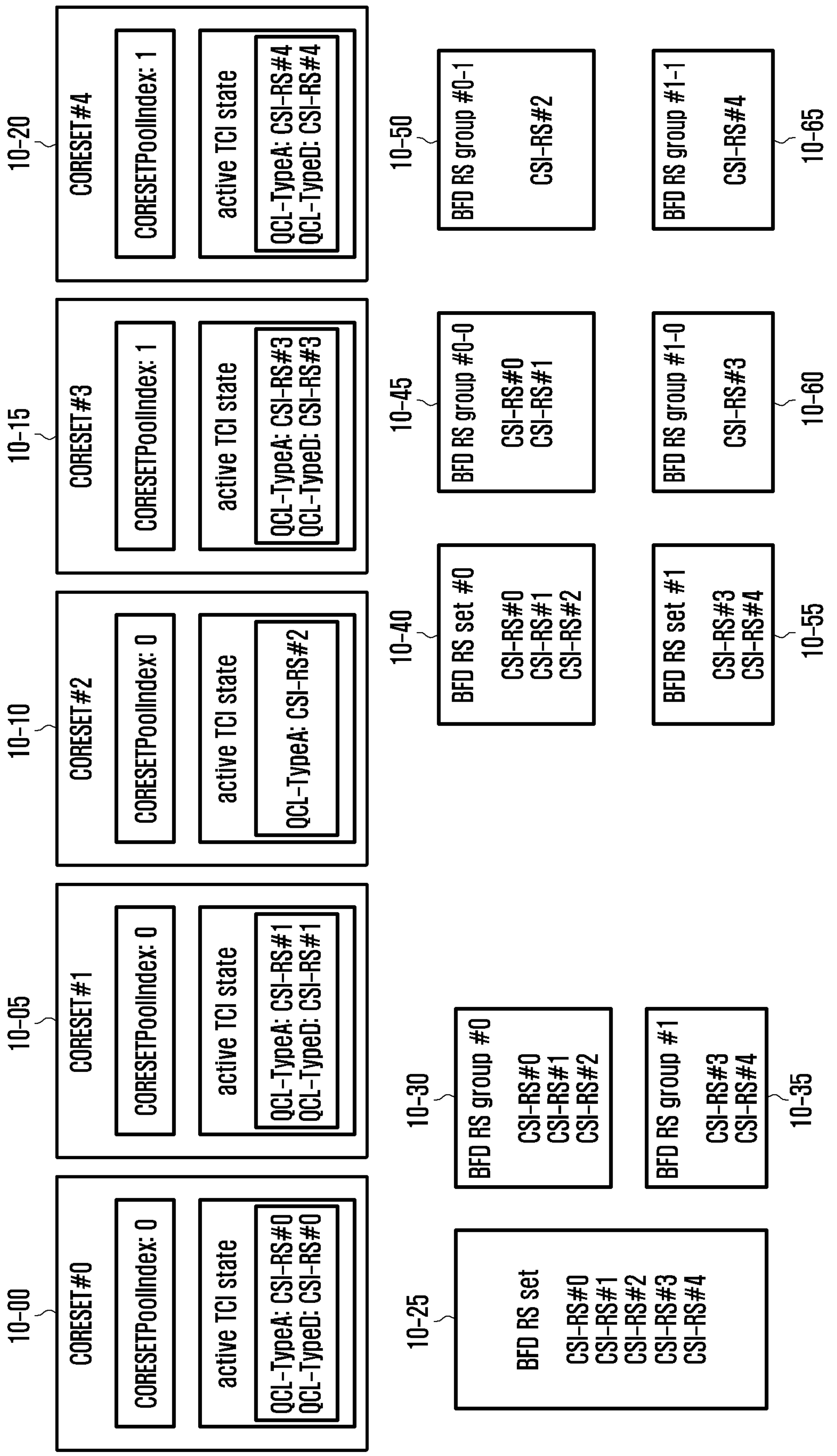
FIG. 10 is a diagram illustrating an example of a beam failure detection (BFD) reference signal (RS) set constitution and a BFD RS group constitution for performing partial BFR according to an embodiment of the disclosure.

FIG. 10 is a diagram illustrating an example of a BFD RS set constitution and a BFD RS group constitution for performing partial BFR according to an embodiment of the disclosure.

In FIG. 10, as an example, it is assumed that five CORESETs are configured for a specific bandwidth part between the base station and the UE and that an activated TCI state, reference RS, and QCL Type for each CORESET are 10-00, 10-05, 10-10, 10-15, and 10-20, respectively. This is an example for convenience of description, and the disclosure is not limited thereto.

When the base station configures one BFD RS set 10-25 {CSI-RS #0, CSI-RS #1, CSI-RS #2, CSI-RS #3, CSI-RS #4} to the UE, as illustrated in FIG. 10, two BFD RS groups in the BFD RS set may be configured to a BFD RS group #0, 10-30 {CSI-RS #0, CSI-RS #1, CSI-RS #2} and a BFD RS group #1, 10-35 {CSI-RS #3, CSI-RS #4}, respectively, and in this case, a determination reference of the BFD RS set is the same CORESETPoolIndex value. That is, among RSs belonging to the BFD RS set, RSs belonging to CORESET with the same CORESETPoolIndex may belong to the same BFD RS group. In another example, in the case that the base station configures two BFD RS sets to a BFD RS set #0, 10-40 {CSI-RS #0, CSI-RS #1, CSI-RS #2} and a BFD RS set #1, 10-55 {CSI-RS #3, CSI-RS #4}, respectively, to the UE, the BFD RS set #0 may be grouped into a BFD RS group #0-0, 10-45 {CSI-RS #0, CSI-RS #1} and a BFD RS group #0-1, 10-50 {CSI-RS #2}, and the BFD RS set #1 may be grouped into a BFD RS group #1-0, 10-60 {CSI-RS #3} and a BFD RS group #1-1, 10-65 {CSI-RS #4}. In this case, the reference for dividing into the BFD RS group #0-0 and the BFD RS group #0-1 may be a QCL-Type. In FIG. 10, RSs configured to the QCL-TypeD were grouped preferentially. Therefore, the CSI-RS #0 configured to the reference RS of QCL-TypeA and QCL-TypeD in the CORESET #0, 10-00, and the CSI-RS #1 configured to the reference RS of QCL-TypeA and QCL-TypeD in the CORESET #1, 10-05 may be preferentially grouped into the BFD RS group #0-0, and the remaining CSI-RS #2 may be grouped into the BFD RS group #0-1. Further, the reference for dividing the BFD RS group #1-0 and the BFD RS group #1-1 may be a CORESET index value. For example, for RSs belonging to the BFD RS set #1, the CSI-RS #3 configured to the QCL reference RS of the CORESET #3 with a lower index value among the CORESET #3 and CORESET #4 configured to an activate TCI state may be preferentially configured to the BFD RS group #1-0, and the CSI-RS #4 configured to the QCL reference RS of the CORESET #4 with the next lowest index value may be configured to the BFD RS group #1-1. In addition to the example illustrated in FIG. 10, in the case that the base station configures information on the BFD RS set or BFD RS group to the UE through upper layer signaling using the reference listed above or a combination of the reference listed above or that the UE has no configuration information on the BFD RS set or BFD RS group from the base station, the UE may use the information in constituting a BFD RS set or BFD RS group.

Embodiment 2: BFD Process Constitution and Method According to Partial BFR

In an embodiment of the disclosure, the UE may receive a configuration for a BFD RS set and BFD RS group from the base station through upper layer signaling, and be configured with information required in the BFD process according to the configured BFD RS set and BFD RS group information. Information required in the BFD process may include information such as a beamFailureInstanceMaxCount, which means the maximum beam failure indication value, and a beamFailureDetectionTimer, which means a value in which the beam failure detection timer is reset. For example, as illustrated in 10-25 to 10-35 of FIG. 10, when the UE is configured with one BFD RS set and two BFD RS groups, the UE may be configured with information such as beamFailureinstanceMaxCount and beamFailureDetectionTimer required in the BFD process for each BFD RS group. As another example, as illustrated in 10-40 to 10-65 of FIG. 10, when the UE is configured with two BFD RS sets for two BFD RS groups and each BFD RS set, the UE may be configured with information such as beamFailureinstanceMaxCount and beamFailureDetectionTimer required during the BFD process for each BFD RS set and each BFD RS group, respectively or may be configured with information such as the same beamFailureinstanceMaxCount and beamFailureDetectionTimer for all BFD RS groups within each BFD RS set. As another example, in the case that the UE does not receive a configuration for the BFD RS set and BFD RS group from the base station through upper layer signaling and that the UE thus constitutes the BFD RS set and BFD RS group, the base station may configure information required in the BFD process for each BFD RS set and each BFD RS group through upper layer signaling.

Figure 11:
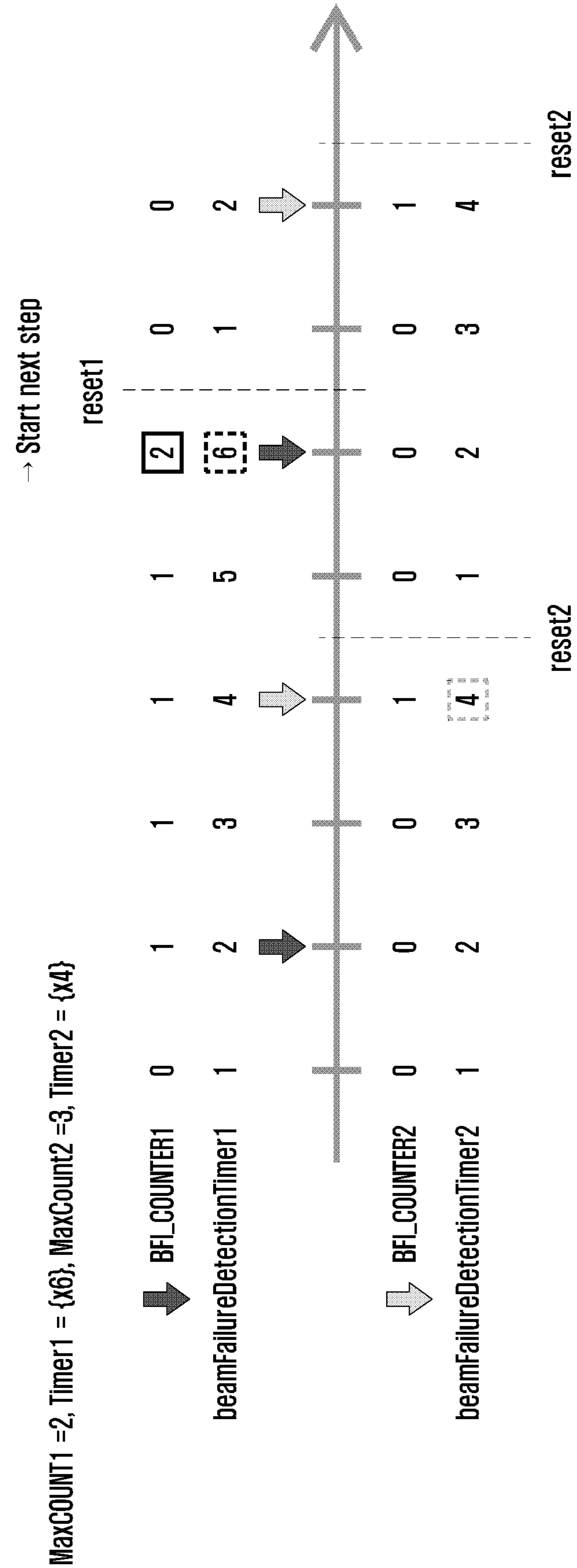
FIG. 11 is a diagram illustrating an example when a plurality of pieces of information required in a BFD process such as beamFailureInstanceMaxCount and beamFailureDetectionTimer are configured according to an embodiment of the disclosure.

FIG. 11 is a diagram illustrating an example when a plurality of pieces of information required in a BFD process such as a beamFailureInstanceMaxCount and beamFailureDetectionTimer are configured according to an embodiment of the disclosure.

In FIG. 11, MaxCount1 and MaxCount2 mean an individual beamFailureInstanceMaxCount and have values of 2 and 3, respectively. Further, Timer1 and Timer2 mean an individual beamFailureDetectionTimer and have values of 6 and 4, respectively. Each configuration information of FIG. 11 may be applied to the case that two BFD RS groups exist in a single BFD RS set, the case that two BFD RS sets do not have a BFD RS group, or the case that while two BFD RS sets have 2 or more BFD RS groups for each BFD RS set, information required in the BFD process such as a beamFailureInstanceMaxCount and beamFailureDetectionTimer is configured for each BFD RS set.

In FIG. 11, a beamFailureDetectionTimer1 increases by 1 for each beam failure indication period and is reset when it reaches 6, and a beamFailureDetectionTimer2 increases by 1 for each beam failure indication period and is reset when it reaches 4. A BFI_COUNTER1 is a counter incremented in the case that a beam failure indication occurs in a BFD process in which a MaxCount1 and beamFailureDetectionTimer1 are configured, and in the BFD process, in the case that beam failure occurs for all BFD RSs within the corresponding group or set according to which group or set it being applied to, as described above, it is regarded as a beam failure indication. A BFI_COUNTER2 is a counter incremented in the case that a beam failure indication occurs in a BFD process in which MaxCount2 and beamFailureDetectionTimer2 are configured, and the same description as that of BFI_COUNTER1 may be applied to the BFD process. In the case that the beamFailureDetectionTimer1 and beamFailureDetectionTimer2 each reach the maximum values thereof, the BFI_COUNTER1 and BFI_COUNTER2 are reset. In FIG. 11, the beam failure indication corresponding to the BFI_COUNTER1 has occurred in the case that beamFailureDetectionTimer1 is 2 or 6, and it may be seen that the BFI_COUNTER1 increases by 1 at each beam failure indication. In this case, because a value of MaxCount1 is 2, as illustrated in FIG. 11, in the case that the BFI_COUNTER1 reaches MaxCount, the process proceeds to the next step of BFR. Further, the beam failure indication corresponding to the BFI_COUNTER2 has occurred in the case that beamFailureDetectionTimer2 is 4, and in the case that the beam failure indication has occurred, it may be seen that the BFI_COUNTER2 increases by 1. However, because the BFI_COUNTER2 did not reach MaxCount2 until the beamFailureDetectionTimer2 reaches 4, the beamFailureDetectionTimer2 is reset to 1 after 4, and in this case, the BFI_COUNTER2 is also reset to 0. Thereafter, when the beamFailureDetectionTimer2 is 4, a beam failure indication occurs and the BFI_COUNTER2 increases by 1, but the beamFailureDetectionTimer2 has already reached 4; thus, in the next period, the beamFailureDetectionTimer2 is again reset to 1, and the BFI_COUNTER2 is also reset to 0. The above-described example is merely an example for convenience in describing an embodiment of the disclosure, and the disclosure is not limited thereto.

Embodiment 3: New Candidate Beam Indication Process Constitution and Method According to Partial BFR In an embodiment of the disclosure, in order to overcome beam failure that has occurred in a BFR process, the UE may perform a process of replacing a beam with a new beam. A method of indicating a new beam candidate determined in this process may be defined as a new candidate beam indication. The UE may receive a configuration of one or a plurality of candidateBeamRSLists from the base station through upper layer signaling. One or a plurality of candidateBeamRSLists correspond to the above BFD RS set or a plurality of BFD RS groups within the BFD RS set, respectively, and are defined as a list of new beam candidates that should be replaced due to beam failure. In order to derive a new beam candidate for each BFD RS set or BFD RS group connected to one or a plurality of configured candidateBeamRSLists, the UE measures L1-RSRP for new beam candidates in the candidateBeamRSList and compares it with a reference value. In this case, the reference value may be configured to an individual value for one or a plurality of candidateBeamRSLists or may be configured to the same value. An upper layer of the UE selects one of the new beam candidates with L1-RSRP higher than the reference value (threshold) and transmits it to a physical layer of the UE, and the physical layer of the UE transmits information on the new beam candidate to the base station through the uplink physical channel connected to the received new beam candidate.

For example, the candidateBeamRSList may be composed of a plurality of new beam candidates, and each new beam candidate may have an SSB index or CSI-RS resource index, and includes one of PRACH, SRS, and PUCCH resources as an uplink physical channel connected to the new beam candidate. One new beam candidate may be connected to (or linked with) one uplink physical channel. As another example, the candidateBeamRSList may be composed of a plurality of uplink physical channels, and each uplink physical channel may be connected to an SSB index or CSI-RS resource index indicating a new beam candidate. In this case, the candidateBeamRSList may be composed of only one type of uplink physical channel among a PRACH, SRS, and PUCCH or may be composed of two or more types of uplink physical channel. In this case as well, one uplink physical channel may be connected to one new beam candidate.

Figure 12:
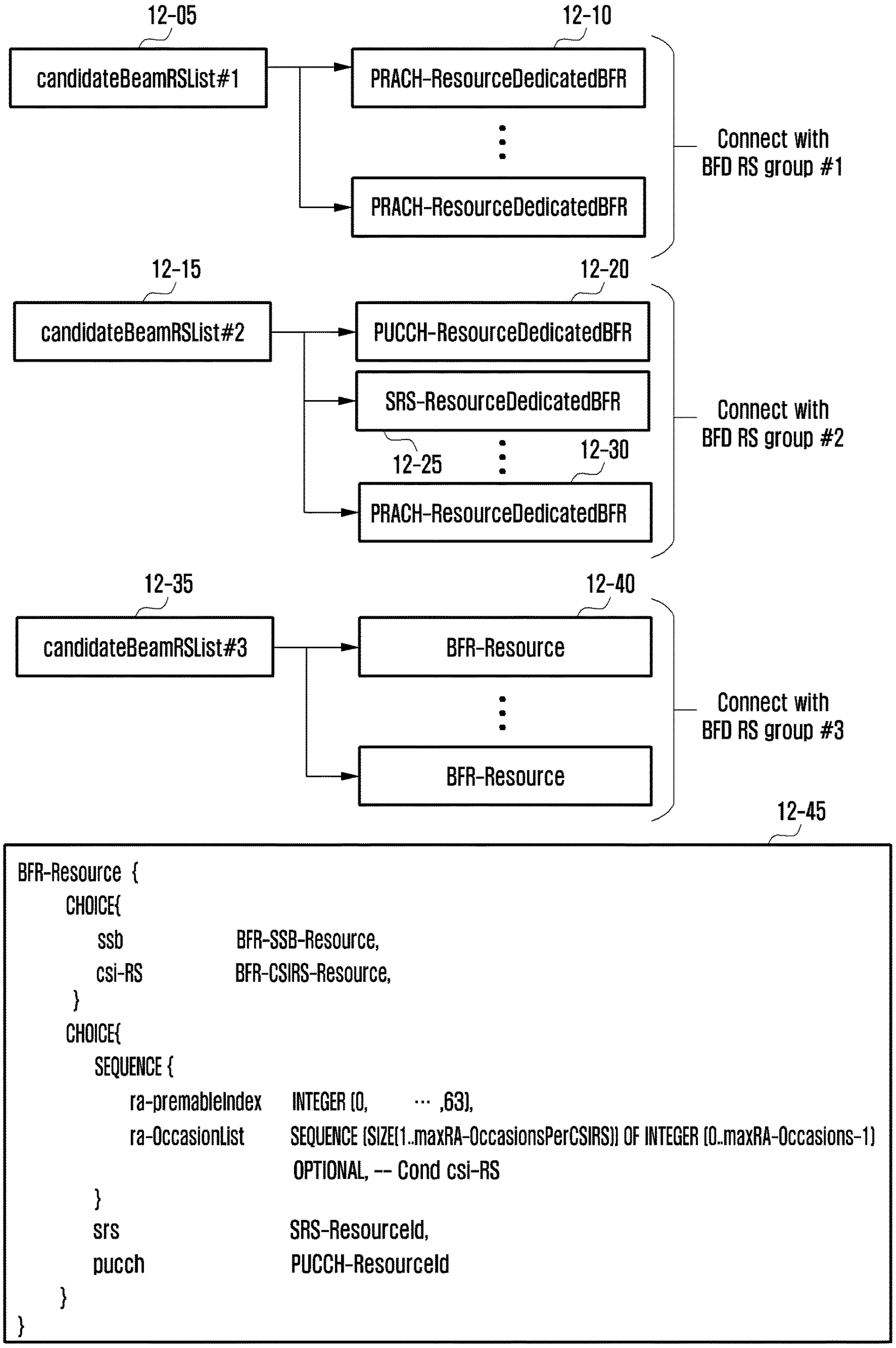
FIG. 12 is a diagram illustrating each of a plurality of candidateBeamRSLists defined (or configured) according to an embodiment of the disclosure.

FIG. 12 is a diagram illustrating that a plurality of candidateBeamRSList each are defined (or configured) according to an embodiment of the disclosure.

FIG. 12 is a diagram illustrating that three candidateBeamRSLists 12-05, 12-15, and 12-35 each are defined (or configured) according to an embodiment of the disclosure. The candidateBeamRSList #1, 12-05 is composed of a plurality of PRACH resources 12-10, and each PRACH resource may have a connected new beam candidate. In this case, when a new beam candidate was determined, only one type of PRACH resource was used in an uplink physical channel used by the UE. The candidateBeamRSList #2, 12-15 is composed of a plurality of PRACHs 12-30, SRS 12-25, and PUCCH resource 12-20, and each PRACH, SRS, and PUCCH resource may have a connected new beam candidate. In this case, when a new beam candidate was determined, in an uplink physical channel used by the UE, three types of PRACH, SRS, and PUCCH resources were used. The candidateBeamRSList #3, 12-35 is composed of a plurality of new beam candidates 12-40, and each new beam candidate may include information such as 12-45. For example, a specific new beam candidate may have an SSB index and have an SRS resource as a connected uplink physical channel. The candidateBeamRSLists #1, #2, and #3 are connected to the BFD RS groups #1, #2, and #3, respectively, and in the case that beam failure occurs in a specific BFD RS group, a new beam candidate may be determined in the connected candidateBeamRSList to be used in the subsequent BFR process.

Embodiment 4: BFRQ and Base Station Response Process Constitution and Method According to Partial BFR In an embodiment of the disclosure, in the case that the UE performs a BFD process for a plurality of BFD RS sets or groups, and then reaches the maximum value of a beam failure indication, as described above for one of the plurality of BFD RS sets or groups, the UE may notify the base station of a beam failure situation and transmit the determined new beam candidate to the base station to perform a beam failure recovery request (BFRQ) process of requesting beam failure recovery. The UE may determine a new beam candidate within the candidateBeamRSList connected to the BFD RS set or group that has reached the maximum value of the beam failure indication, and perform a BFRQ using the uplink physical channel connected to the determined new beam candidate. According to which uplink physical channel the UE uses, the subsequent base station response process may be different.

Figure 13:
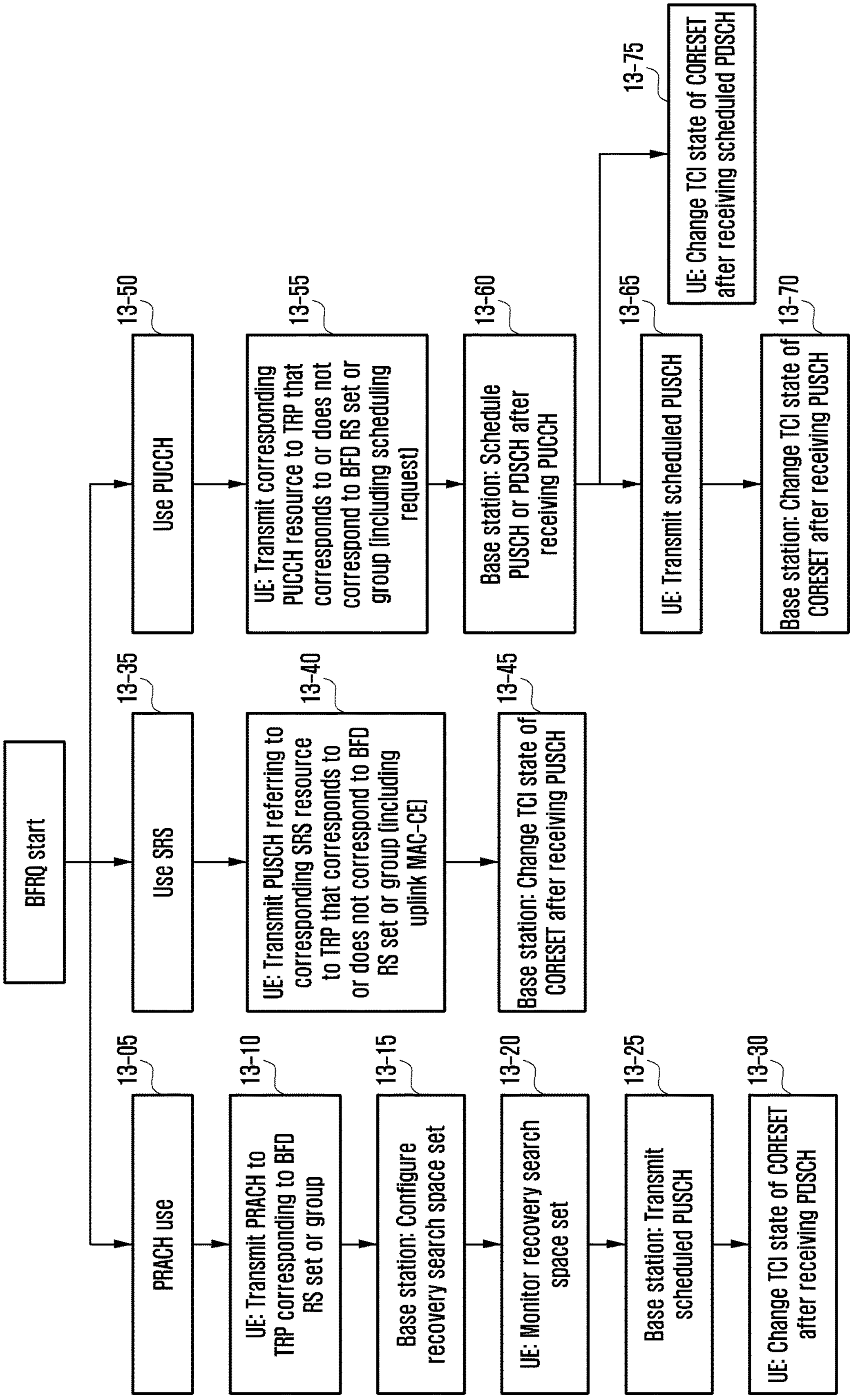
FIG. 13 is a sequence diagram illustrating a constitution and method of a base station response process and a beam failure recovery request (BFRQ) of a UE according to an embodiment of the disclosure.

FIG. 13 is a diagram illustrating a constitution and method of a base station response process and a BFRQ of a UE according to an embodiment of the disclosure.

For example, when an uplink physical channel connected to the determined new beam candidate is a PRACH 13-05 and the new beam candidate includes an SSB index, the UE performs PRACH transmission in a RACH occasion connected to the SSB using a preamble index configured for PRACH transmission. When an uplink physical channel connected to the determined new beam candidate is a PRACH and the new beam candidate includes a CSI-RS resource index, the UE performs PRACH transmission in the corresponding RACH occasion using RACH occasion information and a preamble index configured for PRACH transmission. In this case, in the case that a BFD RS set or group corresponds to each TRP, that is, when the BFD RS set or group is determined based on the CORESETPoolIndex, the UE transmits a PRACH toward the TRP corresponding to the CORESETPoolIndex of the BFD RS set or group (13-10). That is, the UE transmits the PRACH for the TRP in which beam failure has occurred. As described above, when a candidateBeamRSList to which the new beam candidate belongs corresponds to (or is connected to) a specific BFD RS set or BFD RS group, and the corresponding BFD RS set or BFD RS group corresponds to, for example, a CORESETPoolIndex value 0, it may be regarded that the corresponding new beam candidate also corresponds to the CORESETPoolIndex value 0. Therefore, here, transmitting a PRACH for a TRP in which beam failure has occurred may mean, for example, in the case that a CORESETPoolIndex value corresponding to the BFD RS set or BFD RS group in which beam failure has occurred is 0, transmitting a PRACH connected to a new beam candidate corresponding to the CORESETPoolIndex value 0. In this case, it may be regarded that the transmitted PRACH also corresponds to the CORESETPoolIndex value 0. After PRACH transmission, the base station configures a recovery search space set (13-15), and the UE monitors the PDCCH in the recovery search space set (13-20) and receives scheduling of the PDSCH including a MAC-CE that changes the TCI state of the CORESET in which beam failure has occurred (13-25). When receiving the corresponding PDCCH or PDSCH, the UE may assume that the PDCCH and PDSCH are QCLed with the determined new beam candidate. The UE receives the PDSCH to change the TCI state of the CORESET using a TCI state activation MAC-CE in the PDSCH (13-30).

As another example, when the uplink physical channel connected to the determined new beam candidate is an SRS (13-35), the UE may perform a BFRQ through PUSCH transmission referring to the corresponding SRS resource. In this case, the UE may include a new beam candidate and BFD RS set and group information in PUSCH transmission to transmit a MAC-CE activation signal indicating a reference RS of a TCI state of which CORESET to change. Further, in the case that the BFD RS set or group corresponds to each TRP, that is, when the BFD RS set or group is determined based on a CORESETPoolIndex, the UE may transmit a scheduled PUSCH for the remaining TRPs, except for the TRP corresponding to the CORESETPoolIndex of the BFD RS set or group (13-40). That is, the UE may transmit a scheduled PUSCH for other TRPs (e.g., TRPs in which beam failure has not occurred) except for the TRP in which beam failure has occurred. As described above, when the candidateBeamRSList to which the new beam candidate belongs corresponds to (or is connected to) a specific BFD RS set or BFD RS group, and the corresponding BFD RS set or BFD RS group corresponds to, for example, a CORESETPoolIndex value 0, it may be regarded that the corresponding new beam candidate also corresponds to the CORESETPoolIndex value 0. Therefore, here, transmitting a scheduled PUSCH for other TRPs, except for a TRP in which the beam failure has occurred may mean, for example, in the case that the CORESETPoolindex value corresponding to the BFD RS set or BFD RS group in which the beam failure has occurred is 0, transmitting a PUSCH connected to a new beam candidate corresponding to the CORESETPoolindex value 1. In this case, it may be regarded that the transmitted PUSCH also corresponds to the CORESETPoolIndex value 1. Accordingly, BFR between the TRP in which beam failure has occurred and the UE may be performed through the TRP in which beam failure does not occur. The UE may transmit a scheduled PUSCH for the TRP corresponding to the CORESETPoolIndex of the BFD RS set or group (13-40). That is, the UE may transmit a scheduled PUSCH for the TRP in which beam failure has occurred. As described above, when the candidateBeamRSList to which a new beam candidate belongs corresponds to (or is connected to) a specific BFD RS set or BFD RS group, and the corresponding BFD RS set or BFD RS group corresponds to, for example, a CORESETPoolIndex value 0, it may be regarded that the corresponding new beam candidate also corresponds to the CORESETPoolIndex value 0. Therefore, here, transmitting a scheduled PUSCH for the TRP in which the beam failure has occurred may mean, for example, in the case that the BFD RS set or BFD RS group in which beam failure has occurred corresponds to the CORESETPoolIndex value 0, transmitting the PUSCH connected to a new beam candidate corresponding to the CORESETPoolIndex value 0. In this case, it may be regarded that the transmitted PUSCH also corresponds to the CORESETPoolIndex value 0.

After receiving PUSCH transmission of the UE, the base station may change the RS of the TCI state of the CORESET wanting to change to a new beam candidate based on information included in the PUSCH (13-45).

As another example, when the uplink physical channel connected to the determined new beam candidate is a PUCCH (13-50), the UE may perform a BFRQ through PUCCH transmission using the corresponding PUCCH resource. In this case, the UE may include scheduling request information in PUCCH transmission, and the scheduling request may be a scheduling request for PUSCH or PDSCH transmission (13-55). In this case, a PUCCH format used by the UE for PUCCH transmission may be 0 or 1. Further, the scheduling request configuration may be configured separately for BFR use, and the scheduling request configuration for BFR use may have a higher priority than that of the scheduling request configuration for non-BFR use. Further, in the case that the BFD RS set or group corresponds to each TRP, that is, when the BFD RS set or group is determined based on a CORESETPoolIndex, the UE may transmit a scheduled PUCCH for the remaining TRPs, except for the TRP corresponding to the CORESETPoolIndex of the BFD RS set or group. That is, the UE may transmit a scheduled PUCCH for other TRPs (e.g., TRP in which beam failure does not occur), except for the TRP in which beam failure has occurred. As described above, when a candidateBeamRSList to which a new beam candidate belongs corresponds to (or is connected to) a specific BFD RS set or BFD RS group, and the corresponding BFD RS set or BFD RS group corresponds to, for example, a CORESETPoolIndex value 0, it may be regarded that the corresponding new beam candidate also corresponds to the CORESETPoolIndex value 0. Therefore, here, transmitting a scheduled PUCCH for other TRPs, except for the TRP in which beam failure has occurred may mean, for example, in the case that a CORESETPoolIndex value corresponding to the BFD RS set or BFD RS group in which beam failure has occurred is 0, transmitting a PUCCH connected to a new beam candidate corresponding to the CORESETPoolIndex value 1. In this case, it may be regarded that the transmitted PUCCH also corresponds to the CORESETPoolIndex value 1. Accordingly, BFR between a TRP in which beam failure has occurred and the UE may be performed through the TRP in which beam failure does not occur. Further, the UE may perform PUCCH transmission for the TRP corresponding to the CORESETPoolIndex of the BFD RS set or group. That is, the UE may transmit a scheduled PUCCH for the TRP in which beam failure has occurred. As described above, when the candidateBeamRSList to which the new beam candidate belongs corresponds to (or is connected to) a specific BFD RS set or BFD RS group, and the corresponding BFD RS set or BFD RS group corresponds to, for example, a CORESETPoolIndex value 0, it may be regarded that the corresponding new beam candidate also corresponds to the CORESETPoolIndex value 0. Therefore, here, transmitting a scheduled PUCCH for the TRP in which beam failure has occurred may mean, for example, in the case that the BFD RS set or BFD RS group in which the beam failure has occurred corresponds to the CORESETPoolIndex value 0, transmitting a PUCCH connected to a new beam candidate corresponding to the CORESETPoolIndex value 0. In this case, it may be regarded that the transmitted PUCCH also corresponds to the CORESETPoolIndex value 0.

After receiving PUCCH transmission of the UE, when there is a PUSCH scheduling request (13-60), the base station transmits the corresponding DCI to schedule (13-65) the PUSCH including the MAC-CE that activates the TCI state change of the CORESET to enable the UE to change the RS of the TCI state of the CORESET wanting to change using a new candidate beam (13-70). Alternatively, after receiving PUCCH transmission of the UE, when there is a PDSCH scheduling request (13-60), the base station transmits the corresponding DCI and schedules the PDSCH including the MAC-CE that activates the TCI state change of the CORESET to enable the UE to change the RS of the TCI state of the CORESET wanting to change using a new candidate beam (13-75).

On the other hand, the UE may include an MAC-CE to use for partial BFR in the PUSCH. For example, at least one of the following information may be included in the MAC-CE.

- For RSs in the BFD RS set or BFD RS group corresponding to each TRP (or RSs in the BFD RS set or BFD RS group corresponding to each CORESETPoolIndex), an index(s) of the TRP having a radio link quality lower than that of the given threshold: for example, it may be the index(s) of the BFD RS set or a CORESETPoolIndex(es).
- Whether there is a new beam candidate corresponding to the TRP index(s) (or CORESETPoolIndex)
- When a new beam candidate corresponding to the TRP (or CORESETPoolIndex) exists, an index(s) of the new beam candidate The UE may receive DCI using the same hybrid automatic repeat request (HARQ) process ID as that of DCI that scheduled PUSCH transmission including the MAC-CE from the base station to receive scheduling of new PUSCH transmission, and the UE may perform a CORESET reception operation with reference to a TRP index(s) (or index(s) of the BFD RS set, CORESETPoolIndex(es)) in the MAC-CE from a time point after the X number of symbols (e.g., X is a value related to a downlink reception beam change of the UE and may have a value of one of 7, 14, and 28). For example, when a TRP index with a CORESETPoolIndex value of 0 is included in the MAC-CE, it may be assumed that all CORESETs with a CORESETPooIndex configured to 0 and the new beam candidate included in the MAC-CE are in a QCL relationship with each other, and accordingly, the UE may perform an operation of receiving the CORESET. As another example, when a TRP index with a CORESETPoolIndex value of 1 is included in the MAC-CE, it may be assumed that all CORESETs with a CORESETPoolIndex configured to 1 and a new beam candidate included in the MAC-CE are in a QCL relationship with each other, and accordingly, the UE may perform an operation of receiving the CORESET.

Embodiment 5: Method of Changing BFD RS Set/Group or Candidate Beam Set Configuration In an embodiment of the disclosure, the base station and the UE may give and receive signaling for addition/change/deletion of BFD RSs in a BFD RS set or group and addition/change/deletion of a new candidate beam in a candidate beam set or a connected uplink physical channel. For example, in the case that the base station configures a BFD RS set or group to the UE through upper layer signaling and in the case that the number of times in which a specific BFD RS within the configured BFD RS set or group exceeds the reference value for calculating a hypothetical PDCCH reception BLER becomes larger than the specific number of times, the UE may request the base station to change the corresponding BFD RS. In this case, a request method from the UE to the base station may use an explicit method such as a PUCCH-based scheduling request method or PUSCH-based MAC-CE activation. The PUCCH-based scheduling request method may be performed by requesting PDSCH scheduling to the base station by the UE and receiving a downlink MAC-CE indicating activation for a new BFD RS from the base station, or may be performed by a method of transmitting a PUSCH including a MAC-CE indicating activation for a new BFD RS by requesting PUSCH scheduling to the base station by the UE. PUSCH-based MAC-CE activation is a method of transmitting information on the BFD RS in which the UE wants to change to the base station by including the information in the uplink MAC-CE and including the information in the PUSCH payload. When performing a PUCCH-based scheduling request method or PUSCH-based MAC-CE activation, information on the BFD RS to be added/changed/deleted and information on the BFD RS group or set including the BFD RS to be added/changed/deleted may be included when transmitting to the base station by the UE. As another example, in the case that the base station changes the TCI state of the CORESET in both the case that the base station configures or not the BFD RS set or group to the UE through upper layer signaling, when the RS in the TCI state before the change is included in the BFD RS set or group, the RS in the changed TCI state is added to the BFD RS set or group, and the RS in the TCI state before the change is deleted from the BFD RS set or group. In this case, among the RSs in the changed TCI state, the RS configured to QCL-TypeD is configured with a priority. As in addition/change/deletion of BFD RSs in a BFD RS set or group, the same method may be applied to addition/change/deletion of a connected uplink physical channel or a new candidate beam in a candidate beam set.

Figure 14:
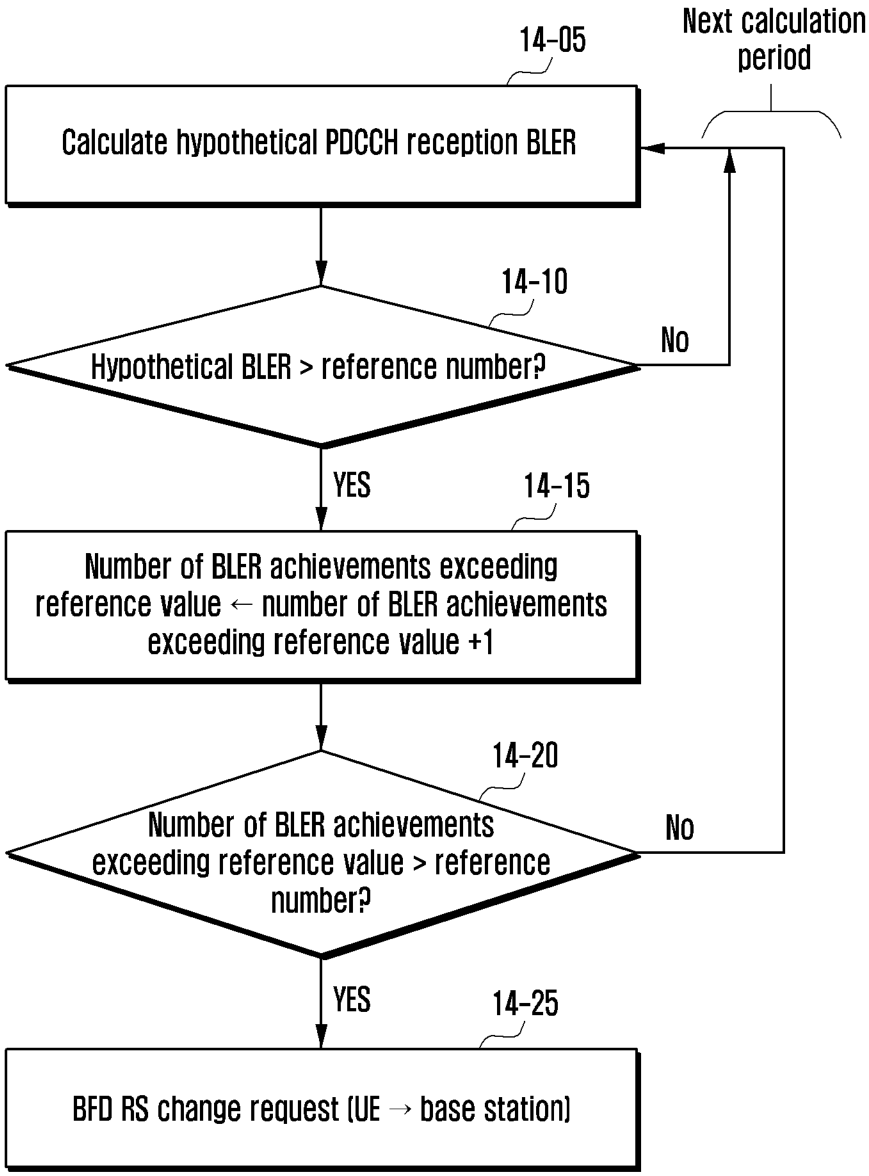
FIG. 14 is a sequence diagram illustrating a BFD RS change procedure according to an embodiment of the disclosure.

FIG. 14 is a diagram illustrating a BFD RS change procedure according to an embodiment of the disclosure.

The UE calculates a hypothetical PDCCH reception BLER for a specific BFD RS in a BFD RS set or group (14-05) and compares the calculated hypothetical BLER value with the reference BLER value (14-10), and if the calculated hypothetical BLER value is not greater than the reference BLER value, the UE calculates again the hypothetical PDCCH reception BLER in the next hypothetical BLER calculation period.

If the hypothetical BLER value is greater than the reference BLER value, the UE increases the number of BLER achievements exceeding the reference value by 1 (14-15). The UE compares the number of BLER achievements exceeding the reference value with the reference number (14-20), and if the number of BLER achievements exceeding the reference value is not greater than the reference number, the UE calculates again the hypothetical PDCCH reception BLER in the next hypothetical BLER calculation period. If the number of BLER achievements exceeding the reference value is greater than the reference value, the UE may request a change to the corresponding BFD RS to the base station (14-25). In this case, a request method of the UE may use an explicit method such as a PUCCH-based scheduling request method or PUSCH-based MAC-CE activation, as described above.

Embodiment 6: Partial BFR Operation for Each TRP Group

In an embodiment of the disclosure, for the above partial BFR operation, the UE may perform partial BFR for each TRP group that bundles several TRPs, rather than performing partial BFR for each TRP. Here, the TRP group refers to the case that BFD RSs each corresponding to several TRPs belong to one BFD RS set or belong to a BFD RS group defined within the BFD RS set.

For example, a BFD RS #1 and a BFD RS #2 exist in one BFD RS set, and it may be considered the case that the BFD RS #1 corresponds to a TRP #1 and that the BFD RS #2 corresponds to a TRP #2. Here, the correspondence between the BFD RS and the TRP may be the case that the BFD RS exists as a reference RS of the TCI state of the CORESET transmitted by a specific TRP, and in this case, the CORESET may be configured with a specific CORESETPoolIndex value. Further, the correspondence between the BFD RS and the TRP may be, in the case that QCL assumption of a specific CORESET has a plurality of TC states, the case that the corresponding BFD RS exists as a reference RS for one of the plurality of TC states. For example, in the case that the UE is configured or not with a BFD RS set 1 composed of reference RSs of the TCI state of CORESETs with CORESETPoolIndex values of 0 and 1, and a BFD RS set 2 composed of reference RSs of the TCI state of CORESETs with CORESETPoolIndex values of 2 and 3 through upper layer signaling, the UE may arbitrarily constitute.

In this case, the UE may perform each partial BFR operation for the BFD RS sets 1 and 2. The UE may calculate a hypothetical PDCCH BLER for all BFD RSs existing in the BFD RS set 1, and in the case that all hypothetical PDCCH BLER values are smaller than the reference value, the physical layer of the UE may indicate BFD to the upper layer. A BFD process for a partial BFR operation for each TRP group may be performed similarly to the Embodiment 2.

Similar to the Embodiment 3, the UE may perform a process of replacing a beam with a new beam in order to overcome beam failure for a partial BFR operation for each TRP group. A method of indicating a new beam candidate determined in this process may be defined as a new candidate beam indication. The UE may receive a configuration of one or a plurality of candidateBeamRSLists from the base station through upper layer signaling. One or a plurality of candidateBeamRSLists correspond to the above BFD RS set or a plurality of BFD RS groups within the BFD RS set, respectively, and are defined as a list of new beam candidates that should be replaced due to beam failure. Similar to the BFD RS set or group for a partial BFR operation for each TRP group, each candidateBeamRSList may have new beam candidates corresponding to TRPs connected to BFD RSs included in the corresponding BFD RS set or BFD RS group.

For example, as in the above example, in the case that the UE receives a configuration of a BFD RS set 1 composed of reference RSs of the TCI state of CORESETs with CORESETPoolIndex values of 0 and 1, and a BFD RS set 2 composed of reference RSs of the TCI state of CORESETs with CORESETPoolIndex values of 2 and 3 from the base station through upper layer signaling, or in the case that there is no configuration, when the UE arbitrarily constitutes, the candidateBeamRSList #1 corresponding to the BFD RS set 1 includes new beam candidates connected to each TRP transmitting the CORESET with CORESEToolIndex values of 0 and 1, and the candidateBeamRSList #2 corresponding to the BFD RS set 2 may include new beam candidates connected to each TRP transmitting the CORESET with CORESEToolIndex values of 2 and 3.

The UE measures L1-RSRP for new beam candidates in the candidateBeamRSList and compares L1-RSRP with the reference value, and the upper layer of the UE selects some of the new beam candidates with L1-RSRP higher than the reference value and transmits them to the physical layer of the UE. In this case, the upper layer of the UE may use a method of selecting one of new beam candidates in order to change a beam for one TRP among all TRPs connected to new beam candidates in the candidateBeamRSList, and selecting at least one new beam candidate for all connected TRPs among new beam candidates with L1-RSRP greater than the reference value in order to change a beam for all TRPs connected to new beam candidates in the candidateBeamRSList. For example, in the case that there are 4 new beam candidates in the candidateBeamRSList and that the new beam candidate #1 and #2 correspond to the TRP #1 and that the new beam candidate #3 and #4 correspond to the TRP #2 and that the new beam candidates #1, #3, and #4 have L1-RSRP greater than the reference value, the UE may randomly select only a new beam candidate #1 among three, and in order to select at least one of new beam candidates corresponding to the TRP #1 and TRP #2, the UE may select new beam candidates #1 and #3. New beam candidates selected in the upper layer of the UE are transmitted to the physical layer, and the UE transmits information on the new beam candidate to the base station through the uplink physical channel connected to the transmitted new beam candidate.

Similar to the above Embodiment 4, in the case that the UE reaches the maximum value of a beam failure indication for one of the plurality of BFD RS sets or groups, as described above, the UE may notify the base station of a beam failure situation and transmit the determined new beam candidate to the base station to perform a beam failure recovery request (BFRQ) process that requests beam failure recovery. The UE may determine a new beam candidate within the candidateBeamRSList connected to the BFD RS set or group that has reached the maximum value of the beam failure indication, and perform a BFRQ using an uplink physical channel connected to the determined new beam candidate. According to which uplink physical channel the UE uses, the subsequent base station response process may be different.

In the case that there is one selected new beam candidate, the UE and the base station may operate similarly to the Embodiment 4 for a BFRQ process. In the case that the selected new beam candidates are the plural, a BFRQ process similar to the Embodiment 4 but considering that there are multiple beams to be changed is performed. For example, when an uplink physical channel connected to the determined new beam candidate is a PRACH and a new beam candidate includes an SSB index, the UE performs PRACH transmission in the RACH occasion connected to the corresponding SSB using a preamble index configured for PRACH transmission.

When an uplink physical channel connected to the determined new beam candidate is a PRACH and a new beam candidate includes a CSI-RS resource index, the UE performs PRACH transmission in the corresponding RACH occasion using a preamble index and RACH occasion information configured for PRACH transmission. In this case, in the case of contention-free random access-based BFR, each RACH occasion corresponding to a plurality of new beam candidates does not expect to be the same as each other. That is, in the case of contention-free random access-based BFR, it may be characterized that each RACH occasion corresponding to a plurality of new beam candidates is not the same (non-overlapped) as each other.

Further, the UE transmits a PRACH toward the TRP corresponding to the CORESETPoolIndex connected to each new beam candidate. That is, the UE transmits a PRACH for a TRP in which beam failure has occurred. After PRACH transmission, the base station configures a recovery search space set, and the UE monitors a PDCCH in a recovery search space set and receives scheduling of a PDSCH including an MAC-CE that changes the TCI state of the CORESET in which beam failure has occurred. In this case, the base station may configure one recovery search space to the UE, and the UE may assume that a plurality of PDCCHs monitored in the recovery search space set are QCLed with a plurality of new beam candidates. For example, in the case that a new beam candidate #1 and new beam candidate #2 are selected and that one recovery search space set is configured, the UE may assume that a first PDCCH is QCLed with a new beam candidate #1 and that a second PDCCH is QCLed with a new beam candidate #2 in transmission order for the PDCCH monitored in the recovery search space set.

As another example, the base station may configure a plurality of recovery search space sets to the UE, and each recovery search space set may be connected to each new beam candidate through higher layer signaling. For example, the UE may assume that a PDCCH monitored in recovery search space #1 is QCLed with a new beam candidate #1 and that a PDCCH monitored in recovery search space #2 is QCLed with a new beam candidate #2. Further, the UE may assume that the PDSCH scheduled by each PDCCH also has the same QCL relationship as the new beam candidate in a QCL relationship with the PDCCH. The UE that monitors the PDCCH in the recovery search space set receives the PDSCH scheduled by the corresponding PDCCH and changes the TCI state of the CORESET using a TCI state activation MAC-CE in the PDSCH.

As another example, when the uplink physical channel connected to the determined new beam candidate is an SRS (13-35), the UE may perform a BFRQ through PUSCH transmission referring to the corresponding SRS resource. In this case, the UE may include a new beam candidate and BFD RS set and group information in PUSCH transmission and transmit a MAC-CE activation signal indicating a reference RS of a TCI state of which CORESET to change. Further, in the case that a BFD RS set or group corresponds to each TRP, that is, when the BFD RS set or group is determined based on the CORESETPoolIndex, the UE may transmit a scheduled PUSCH for the remaining TRPs, except for the TRP corresponding to the CORESETPoolIndex of the BFD RS set or group (13-40).

Further, in the case that the BFD RS set or group corresponds to a plurality of TRPs, that is, when the BFD RS set or group is determined based on a plurality of CORESETPoolIndexes, the UE may transmit a scheduled PUSCH for the remaining TRPs, except for TRPs corresponding to all CORESETPoolIndexes of the BFD RS set or group. That is, the UE performs BFR between the TRP in which beam failure has occurred and the UE through the TRP in which beam failure does not occur. Further, the UE may transmit a scheduled PUSCH for TRPs corresponding to one or a plurality of CORESETPoolIndexes of the BFD RS set or group (13-40). After receiving PUSCH transmission of the UE, the base station may change the RS of the TCI state of the CORESET wanting to change to a new beam candidate based on information included in the PUSCH (13-45).

As another example, when an uplink physical channel connected to the determined new beam candidate is PUCCH (13-50), the UE may perform a BFRQ through PUCCH transmission using the corresponding PUCCH resource. In this case, the UE may include scheduling request information in PUCCH transmission, and the scheduling request may be a scheduling request for PUSCH or PDSCH transmission (13-55). Further, in the case that the BFD RS set or group corresponds to each TRP, that is, when the BFD RS set or group is determined based on a CORESETPoolIndex, the UE may transmit a scheduled PUCCH for the remaining TRPs, except for the TRP corresponding to the CORESETPoolIndex of the BFD RS set or group.

Further, in the case that the BFD RS set or group corresponds to a plurality of TRPs, that is, when the BFD RS set or group is determined based on a plurality of CORESETPoolIndexes, the UE may transmit a scheduled PUCCH for the remaining TRPs, except for the TRPs corresponding to all CORESETPoolIndexes of the BFD RS set or group. That is, the UE performs BFR between the TRP in which beam failure has occurred and the UE through the TRP in which beam failure does not occur. Further, the UE may perform PUCCH transmission for TRPs corresponding to one or a plurality of CORESETPoolIndexes of the BFD RS set or group.

After receiving PUCCH transmission of the UE, when there is a PDSCH scheduling request (13-60), the base station transmits the corresponding DCI and schedules the PDSCH including the MAC-CE that activates the TCI state change of the CORESET (13-65) to enable the UE to change the RS of the TCI state of the CORESET wanting to change using a new candidate beam (13-70). After receiving PUCCH transmission of the UE, when there is a PDSCH scheduling request (13-60), the base station transmits the corresponding DCI and schedules the PDSCH including the MAC-CE that activates the TCI state change of the CORESET to enable the UE to change the RS of the TCI state of the CORESET wanting to change using a new candidate beam (13-75).

The UE may report to the base station that the UE may perform a partial BFR operation as a UE capability. For example, through UE capability reporting, the UE may report that a partial BFR operation is possible. As another example, through UE capability reporting, the UE may report the number of BFD RS sets, the maximum number of BFD RSs, the maximum number of BFD RSs per BFD RS set, the number of TRPs connected to BFD RSs in each BFD RS set, the number of candidate beam sets, the number of TRPs connected to candidate beams in the candidate beam set, and the maximum number of candidate beams per candidate beam set in which the UE may receive a configuration for a partial BFR operation.

With reference to capability reporting of the UE, the base station may configure the number of BFD RS sets, the maximum number of BFD RSs, the maximum number of BFD RSs per BFD RS set, the number of TRPs connected to BFD RSs in each BFD RS set, the number of candidate beam sets, and the maximum number of candidate beams per candidate beam set to the UE through upper layer signaling. Further, the maximum number of BFD RSs or the number of candidate beams may be included within the number of SSB, CSI-RS, or CSI-IM in which the UE may use within all subcarriers according to the type of the BFD RS or candidate beam being the SSB, CSI-RS, or CSI-RS.

Figure 15A:
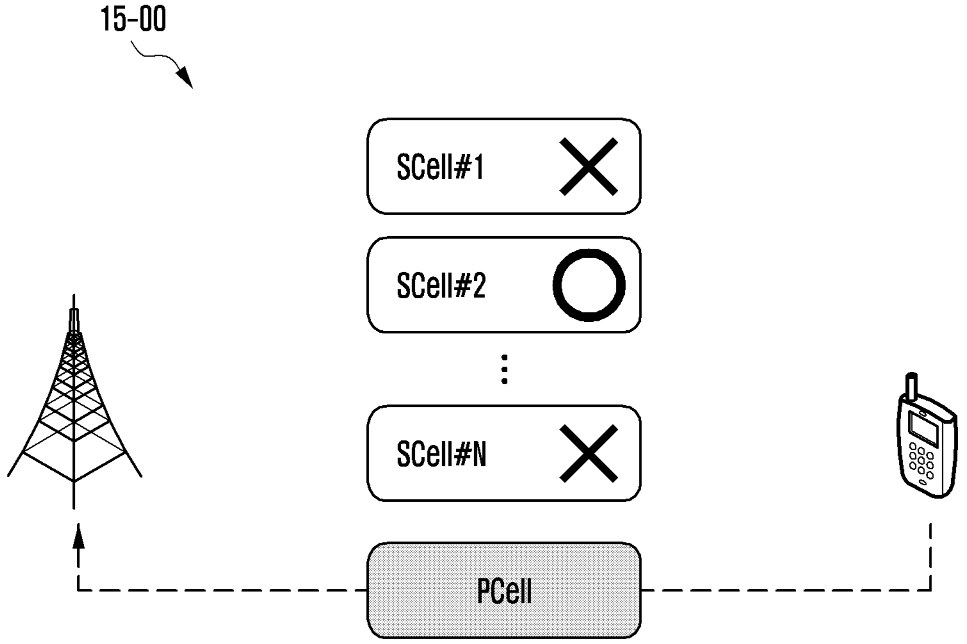
FIG. 15A is a diagram illustrating BFD for a secondary cell in carrier aggregation (CA) in which a plurality of component carriers (CCs) or cells are configured according to an embodiment of the disclosure.
Figure 15B:
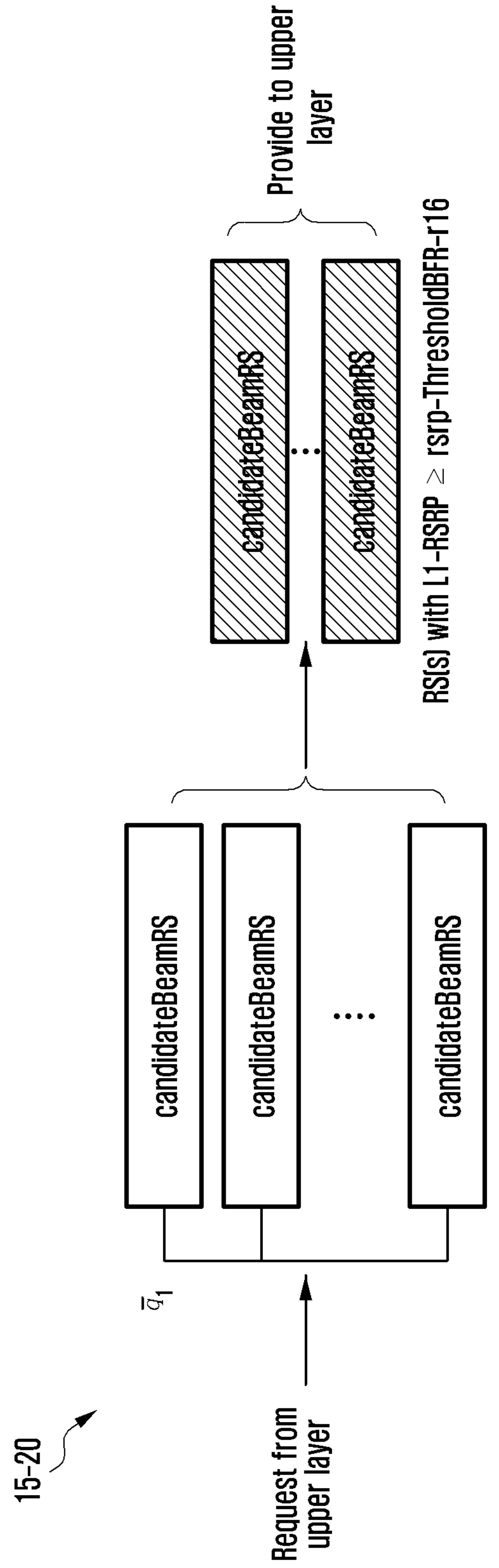
FIG. 15B is a diagram illustrating a method in which a base station configures an RS for a candidate beam for each cell for RS monitoring by a UE according to an embodiment of the disclosure.
Figure 15C:
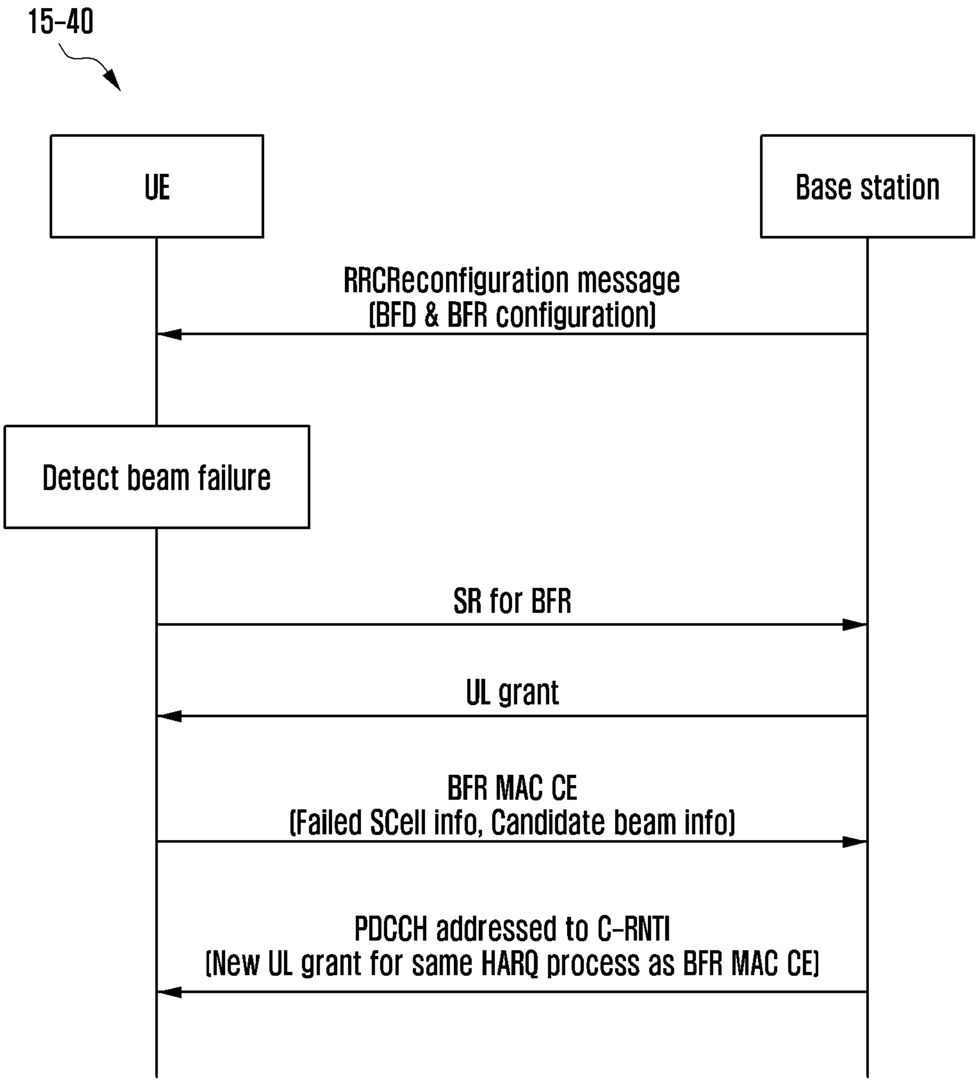
FIG. 15C is a sequence diagram illustrating a BFR procedure and identifying BFD of a SCell according to an embodiment of the disclosure.

FIGS. 15A through 15C are a diagram illustrating a method of BFD for a secondary cell (SCell) in carrier aggregation (CA) in which a plurality of component carriers (CCs) or cells are configured according to an embodiment of the disclosure.

15-00 illustrates the case that at least one SCell is additionally configured in a state in which the base station and UE are connected to a PCell. In the case that one PCell and the N number of SCells are configured, the UE may monitor a link based on an RS configured for each cell.

15-20 is a diagram illustrating an RS configuration for a candidate beam by the base station in each cell for RS monitoring based on preconfigured conditions or periodic RS monitoring of the UE. The base station may perform an RS configuration (e.g., $\overline{q}_0$) for periodic RS monitoring for BFD of the UE through upper layer signaling (e.g., RRC signaling, candidateBeamRSListExt for PCell, candidateBeamRSSCellList for SCell) or an RS configuration (e.g., $\overline{q}_1$) for RS monitoring based on periodic or preconfigured conditions. Here, $\overline{q}_1$ represents a plurality of candidatebeamRS(s), and the UE may acquire a new beam for BFR among the candidatebeamRS(s) according to conditions determined by the UE and the base station. For example, the condition may be represented as RS(s) with L1-RSRP≥rsrpThresholdBFR-r16. Here, rsrpThresholdBFR-r16 represents a threshold for selecting a new beam. The base station may configure maximum 64 new beam indication RS(s) in order to support both a PCell and a SCell.

15-40 is a diagram illustrating an RS monitoring process based on preconfigured conditions or a periodic RS monitoring process of the UE based on the above-described RS, a process of identifying BFD of a specific SCell, and a process (BFR) of recovering the BFD. While monitoring the RS, the UE may determine BFD based on the RS for beam failure detection and transmit a beam failure recovery request for recovering the BFD to the base station through a link of the PCell configured to the UE based on information of the SCell in which the BFD is identified. In this case, the beam failure recovery request operation of the UE may include an operation of transmitting a link recovery request message to the UE using a PUCCH resource (dedicated SR-like PUCCH) including an SR separately configured for BFR. Here, the number of PUCCH resources for the BFR may be configured to include one per PUCCH group configured to the UE (Step-1).

Thereafter, the base station may receive a PUCCH-SR request of the UE transmitted at a specific resource and timing. When the base station receives a PUCCH-SR signal or message, the base station may transmit a UL grant to the UE. The UE that has received the UL grant may transmit a BFR MAC CE message based on the PUSCH resource allocated by the base station. Here, information included in the BFR MAC CE may include failed SCell info in which at least BFD is identified, whether a new candidate beam exists, candidate beam info, or related signal strength.

When the BFR MAC CE message transmitted by the UE is successfully received, the base station may transmit a PDCCH scrambled with a C-RNTI to the UE. Here, DCI information included in the PDCCH transmitted to the UE may allocate a new UL grant using the same HARQ process information as that of the BFR MAC CE transmitted by the UE (Step-2). The UE may perform monitoring of the PDCCH in all CORESET(s) in the SCell from a time point after 28 symbols based on a PDCCH reception time point scheduling the UL grant. In this case, subcarrier spacing for 28 symbols may be determined based on the smaller of subcarrier spacing of activated DL BWP receiving the PDCCH and subcarrier spacing of the activated DL BWP in each failed SCell. Specifically, SCell monitoring of the UE is an operation of identifying a new beam for recovery of a new link instead of a link in which beamforming has failed, and the UE applies a spatial domain filter based on preconfigured $q_{new}$ related information to perform beamforming, thereby transmitting an uplink control channel (e.g., PUCCH-SCell) or data channel.

Embodiment 7: BFD and BFR Operation for Each TRP in a Plurality of TRPs

In various embodiments described above, a UE that supports beamforming capable of transmitting and receiving to and from a plurality of TRP(s) was able to determine BFD in units of a TRP group or all TRP(s) received by the UE.

In the following embodiment, an operation in which a UE supporting a plurality of TRPs determines or performs BFD in units (e.g., one) of each TRP will be described.

The UE may be configured with each RS that identifies and determines BFD corresponding to each TRP in a plurality of TRPs. Here, each TRP may be linked with a resource set including at least one BFD-RS resource or BFD-RS resources, and the BFD-RS resource (set) may be linked with at least one CORESET monitored by the UE in terms of QCL relation. Specifically, at least two BFD-RS resource sets may be configured for each BWP, and each BFD-RS resource set may include the maximum N number of BFD-RS resources for each BWP. For example, the maximum value of N may be determined by the capability of the UE and be configured by the base station or determined by a standard to a value of 2 to 64. Specifically, each TRP and BFD-RS may be configured explicitly by the RRC layer and MAC layer, and be configured implicitly by DCI information or an agreement of the base station and the UE.

Figure 16A:
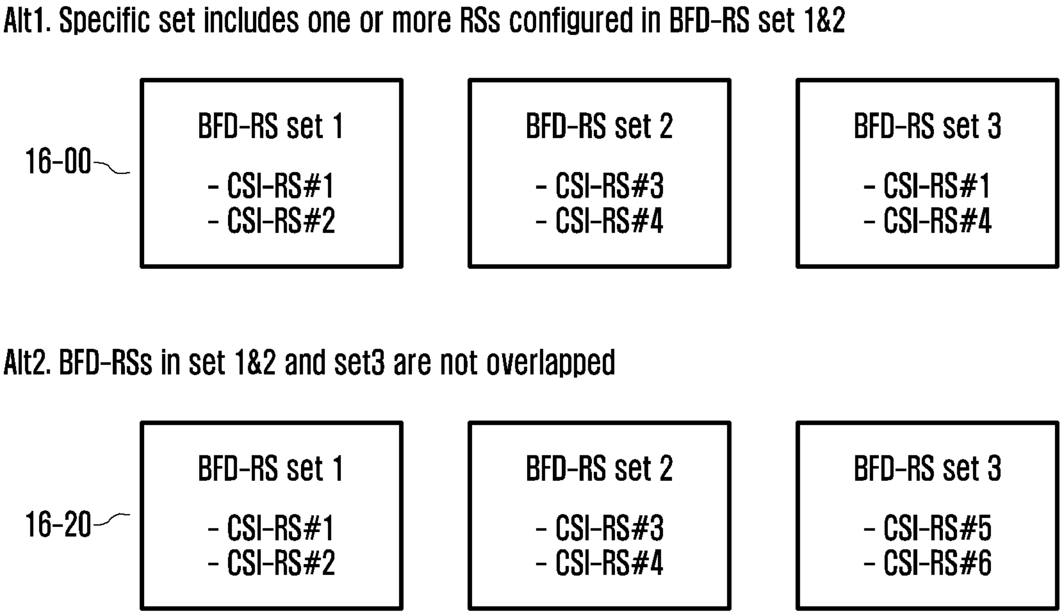
FIG. 16A is a diagram illustrating a BFD-RS set(s) configuration according to an embodiment of the disclosure.
Figure 16B:
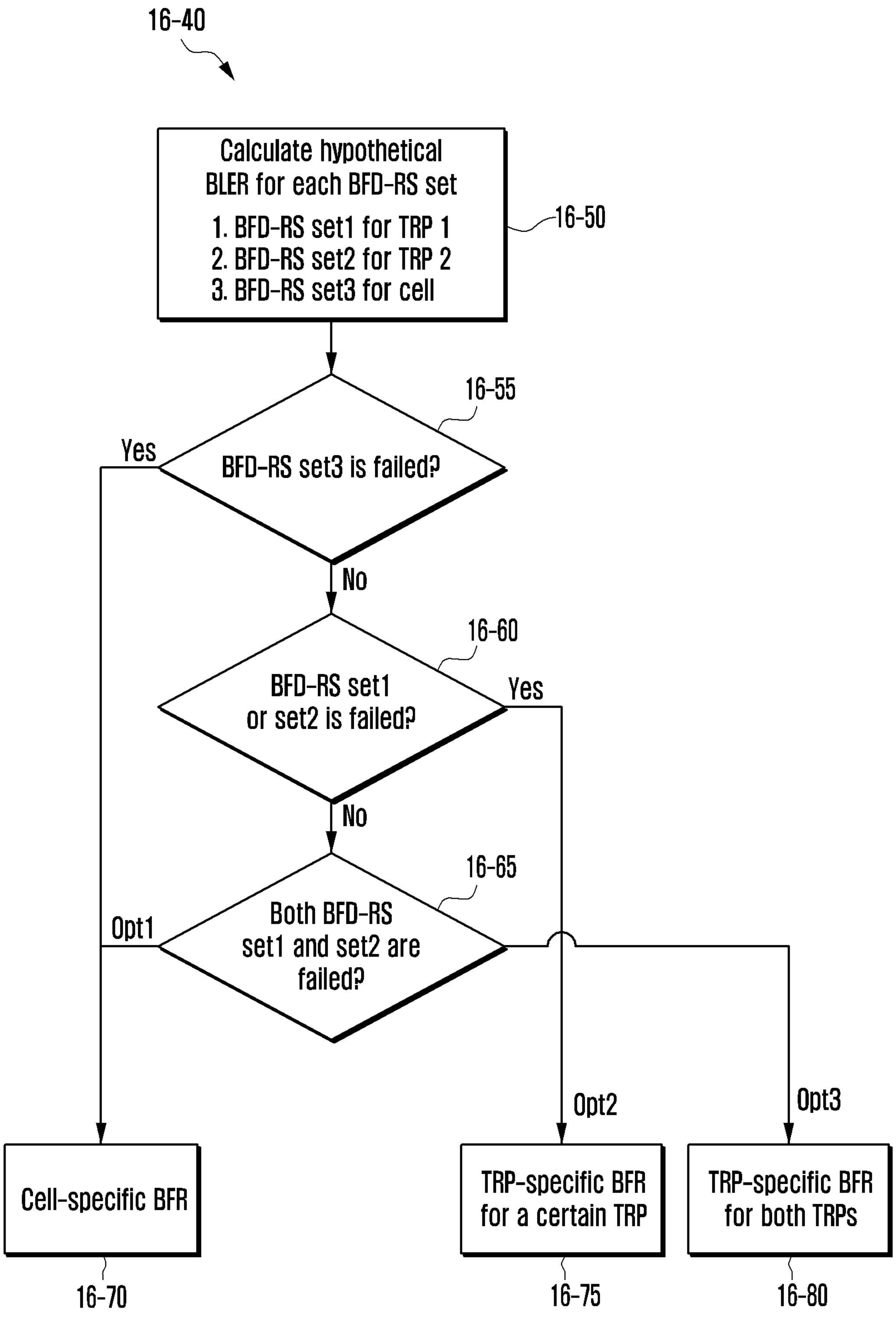
FIG. 16B is a sequence diagram illustrating a method in which a UE configured with cell-specific BFR and/or per-TRP BFR detects beam failure and performs a BFR operation according to an embodiment of the disclosure.

FIGS. 16A through 16B illustrate various embodiments in which a BFD-RS is configured.

First, the base station may configure a BFD-RS so that cell-specific BFR and per-TRP BFR (TRP specific BFR) are not simultaneously supported in one specific CC of a plurality of component carriers (CCs) for the UE. For example, the UE may support only cell-specific BFR in a specific CC of a plurality of CCs, and support per-TRP BFR (TRP specific BFR) in other CCs.

Second, the base station may configure to simultaneously support cell-specific BFR and per-TRP BFR (TRP specific BFR) in one specific CC of a plurality of CCs for the UE. For example, the base station and the UE may configure both a BFD-RS resource (set) for cell-specific BFR and a BFD-RS resource (set) for per-TRP resource (set) in a specific CC of a plurality of CCs. For the above simultaneous support, the base station may independently configure or mixedly configure BFD-RS for the cell-specific BFR purpose and a BFD-RS resource (set) for per-TRP BFR (TRP specific BFR) purpose.

Alt-1: The base station may configure a BFD-RS resource set-1 for a first TRP, configure a BFD-RS resource set-2 for a second TRP, and configure a BFD-RS resource set-3 for specific cell-based BFR (e.g., cell constituting first TRP and second TRP), as illustrated in FIG. 16-00. The BFD-RS resource set-1, BFD-RS resource set-2, and BFD-RS resource set-3 may each include at least one BFD-RS resource. For example, a BFD-RS resource of the BFD-RS resource set-1 may include a CSI-RS #1 and a CSI-RS #2, a BFD-RS resource of BFD-RS resource set-2 may include a CSI-RS #3 and a CSI-RS #4, and a BFD-RS resource of the BFD-RS resource set-3 may include BFD-RS resources (e.g., CSI-RS #1, CSI-RS #4) overlapped to include each of at least one RS configured in the set-1 and set-2.

Further, a configuration for an NBI-RS (set) for identifying a new beam may be configured similarly for the cell-specific BFR and per-TRP BFR as in the configuration for the BFD-RS (set) described above, and the BFD-RS (set) and NBI-RS (set) may be linked and configured to be one-to-one correspondence, many-to-one correspondence, or many-to-many correspondence.

Alt-2: The base station may configure a BFD-RS resource set-1 for a first TRP, as illustrated in FIG. 16-20, configure a BFD-RS resource set-2 for a second TRP, and configure a BFD-RS resource set-3 for specific cell-based BFR (e.g., cell constituting the first TRP and second TRP). The BFD-RS resource set-1, BFD-RS resource set-2, and BFD-RS resource set-3 may each include at least one BFD-RS resource. For example, a BFD-RS resource of the BFD-RS resource set-1 may include a CSI-RS #1 and a CSI-RS #2, a BFD-RS resource of the BFD-RS resource set-2 may include a CSI-RS #3 and a CSI-RS #4, and a BFD-RS resource of the BFD-RS resource set-3 may include a BFD-RS resource (e.g., CSI-RS #5, CSI-RS #6) that enables at least one RS configured in the set-1 and set-2 to be mutually exclusive.

Further, a configuration for an NBI-RS (set) for identifying a new beam may be similarly configured for cell-specific BFR and per-TRP BFR as in a configuration for a BFD-RS (set) described above, and the BFD-RS (set) and the NBI-RS (set) may be linked and configured to be one-to-one correspondence, many-to-one correspondence, or many-to-many correspondence.

After a BFD identification operation corresponding to each TRP in a plurality of TRPs, in order to identify and determine a new transmission or reception beam from each TRP, the UE may configure an RS (e.g., new beam identification RS (NBI-RS)) corresponding to each TRP. Here, each TRP may be linked with a resource set including an NBI-RS resource or at least one NBI-RS resource, and the NBI-RS may be linked in a QCL relation aspect with at least one CORESET monitored by the UE. For example, at least two sets of NBI-RS resources (sets) may be configured for each BWP, and each NBI-RS resource set may include the maximum M number of NBI-RS resources for each BWP. Further, the maximum value of M may be determined by the capability of the UE, and the value of M may be configured by the base station or determined by a standard to a value of 4 to 64. Specifically, each TRP and NBI-RS may be configured explicitly by the RRC layer and MAC layer, and be configured implicitly by DCI information or an agreement between the base station and the UE.

Further, the association between the BFD-RS and NBI-RS may be mapped to correspond one-to-one. Specifically, each TRP may be linked so that the BFD-RS and NBI-RS correspond one-to-one, and for example, a BFD-RS configuration configured for the first TRP may be configured to correspond one-to-one with the NBI-RS for the first TRP, and the BFD-RS configuration configured for the second TRP may be configured to correspond one-to-one with the NBI-RS for the second TRP. For another example, the BFD-RS configuration configured for the first TRP may be configured to correspond one-to-one with the NBI-RS for the second TRP, and the BFD-RS configuration configured for the second TRP may be configured to correspond one-to-one with the NBI-RS for the first TRP.

In addition, the condition for searching and identifying a new beam based on the NBI-RS may be considered to independently perform the operation previously described in the Embodiment 3 or 4 for each TRP among a plurality of TRPs. Further, TRP-specific BFD counter and timer operations may be considered to independently perform the operation described in the Embodiment 2 for each TRP among a plurality of TRPs.

FIG. 16-40 illustrates an embodiment that a UE in which the previously described cell-specific BFR and/or per-TRP BFR are/is configured in a specific CC detects beam failure based on the previously described BFD-RS and NBI-RS and performs a BFR operation based on this.

As illustrated in FIGS. 16-00 and 16-20, the UE in which the BFD-RS is configured may determine whether beam failure occurs for the first TRP using the BFD-RS resource set-1, determine whether beam failure for second TRP occurs using the BFD-RS resource set-2, and determine whether beam failure for a specific CC or a specific cell occurs using the BFD-RS resource set-3 (16-50).

The UE may identify whether beam failure occurs for each TRP (TRP-specific BFR) or may identify whether beam failure occurs for each cell (Cell-specific BFR).

For example, when the UE determines whether beam failure occurs based on the CSR-RS #1 and CSR-RS #4 configured in the BFD-RS resource set-3 and identifies beam failure, the UE may perform cell-specific BFR (16-55). As another example, when the UE determines whether beam failure occurs based on the CSR-RS #5 and CSR-RS #6 configured in the BFD-RS resource set-3 and identifies beam failure, the UE may perform cell-specific BFR (16-55).

In the case that beam failure does not occur for the BFD-RS resource set-3, the UE determines whether beam failure occurs based on a CSR-RS #1 and CSR-RS #2 or a CSR-RS #3 and CSR-RS #4 configured in one set of the BFD-BFD-RS resource set-1 and BFD-RS resource set-2 and identifies beam failure, the UE may perform TRP-specific BFR (e.g., first TRP or second TRP) for a specific BFR (e.g., first TRP or second TRP) based on the RS (16-60).

In the case that beam failure occurs for both BFD-RS resource set-1 and BFD-RS resource set-2, the UE may operate as follows.

Method-1: The UE may perform cell-specific BFR (Fall-back to Rel-15 BFR) (16-70).

Here, in cell-specific BFR, in the case that BFD occurs and that an identified cell is a PCell, the UE may perform BFR using a PRACH signal according to an uplink resource configuration of the PCell, and in the case that BFD occurs and that an identified cell is a SCell, the UE may perform BFR using a PUCCH-SR signal according to an uplink resource configuration of the SCell.

Method-2: The UE may perform TRP-specific BFR for only one TRP of two TRP(s) in which BFD has occurred (16-75). In this case, the UE may perform TRP-specific BFR for only one TRP corresponding to a low BFD-RS resource set, and an index of a specific BFD-RS resource set is configured through upper layer signaling; thus the UE may perform TRP-specific BFR for only a TRP corresponding to an index of the corresponding BFD-RS resource set.

Here, in TRP-specific BFR, in the case that BFD occurs and that an identified cell is a PCell, the UE may perform BFR using a PUCCH-SR signal according to an uplink resource configuration of the SCell. Further, in TRP-specific BFR, in the case that BFD occurs and that an identified cell is a SCell, the UE may perform BFR using a PUCCH-SR signal according to an uplink resource configuration of the SCell.

Method-3: the UE may perform TRP-specific BFR for all TRPs among two TRP(s) in which BFD has occurred (16-80).

Here, in TRP-specific BFR, in the case that BFD occurs and that all identified cells are PCells, the UE may perform BFR using a PUCCH-SR signal according to an uplink (or uplink of Scell) resource configuration of the PCell. Further, in TRP-specific BFR, in the case that BFD occurs and that all identified cells are SCells, the UE may perform BFR using a PUCCH-SR signal according to an uplink (or uplink of Scell) resource configuration of the PCell. Further, in TRP-specific BFR, in the case that BFD occurs and one identified cell is a PCell and that the other cell is an SCell, the UE may perform BFR using a PUCCH-SR signal according to an uplink (or uplink of Scell) resource configuration of the Pcell or may perform BFR using a PRACH signal according to the uplink resource configuration of the PCell.

A new capability of the UE may be determined for the above-described TRP specific BFR operation and cell-specific BFR operation. Capability items of the UE may include whether a BFD RS and NBI RS are configured and the number of the BFD RS and NBI RS, and include information indicating whether TRP specific BFR is supported or whether cell-specific BFR is supported. Further, the capability items of the UE may include whether methods 1 to 3 are supported and whether alt-1 or alt-2 is supported.

The above description of 16-40 described operations 16-55, 16-60, and 16-65 in a sequential procedure with a priority, but according to various embodiments of the disclosure, the priority may be changed or constituted to determine in parallel or simultaneously.

In the following embodiment, an operation in which a UE supporting a plurality of TRPs performs BFRQ and BFRQ response in units (e.g., 1 or 2) of each TRP will be briefly described based on the above-described BFD determination operation.

The UE that determines BFD for each TRP may perform a TRP-specific BFR operation in order to recover the beam link. Here, the TRP-specific BFR may basically be composed of two steps, as described above.

While monitoring the RS, the UE may determine BFD based on the RS for beam failure detection, identify a candidatebeamRS linked with the BFD, and transmit the candidatebeamRS to the base station through a link of the PCell or connected SCell based on spatial QCL that satisfies the conditions. In this case, in a beam failure recovery request operation process (Step-1), the UE may transmit a link recovery request message to the CC or TRP corresponding to at least one information of a failed CC, other/non failed CC, failed TRP, or other/non failed TRP using a PUCCH resource (dedicated SR-like PUCCH) including an SR separately configured for BFR. Here, the number of PUCCH resources for the BFR may be configured to include at least one per PUCCH group configured to the UE.

In the following embodiment, an operation in which a UE supporting a plurality of TRPs performs BFRQ and BFRQ response in units (e.g., 1 or 2) of each TRP based on the BFD determination operation in at least one cell will be described in detail.

Figure 17A:
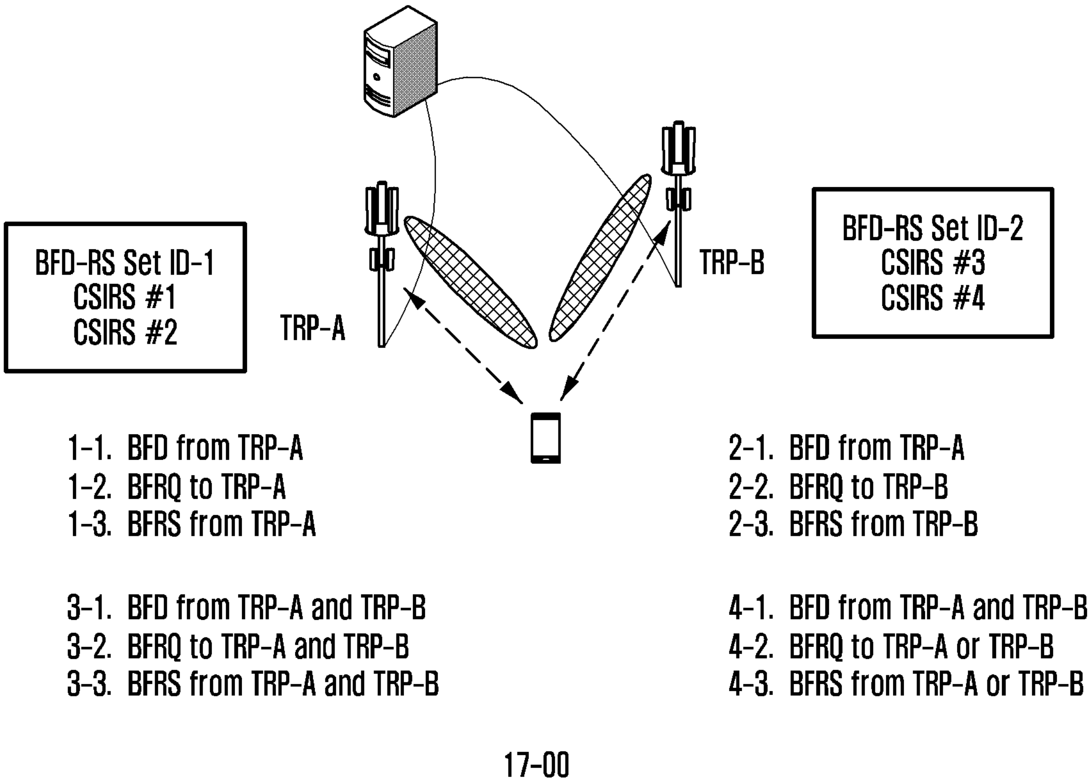
FIG. 17A is a diagram illustrating an operation in which a UE performs TRP-specific BFR or cell-specific BFRQ and BFRS procedures according to an embodiment of the disclosure.
Figure 17B:
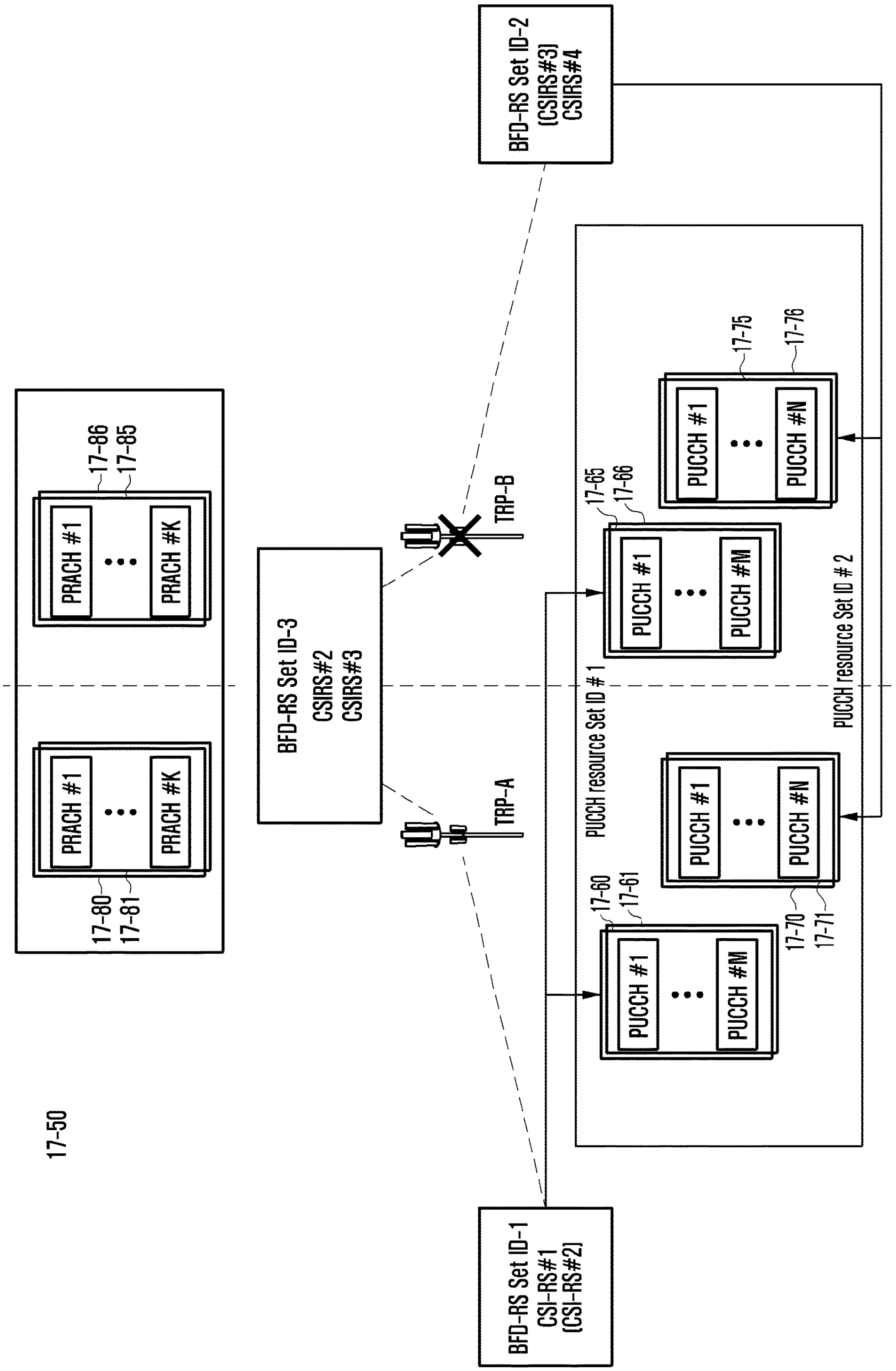
FIG. 17B is a diagram illustrating an operation in which a UE detects TRP-specific BFR or cell-specific BFRQ, selects an uplink resource, and performs a BFRS procedure according to an embodiment of the disclosure.

FIGS. 17A and 17B illustrate an operation in which a UE that has identified BFD performs TRP-specific BFR, cell-specific BFRQ, or beam failure request response (BFRS) according to the number of connected CCs.

Method A

In the case that beam failure is detected for one CC in at least one BFD-RS set(s) configured in one CC, the UE may perform the following operations.

Hereinafter, in method A, the UE assumes that a CSI-RS #1 is configured for BFD of a first TRP in the PCell and that a CSI-RS #4 is configured for BFD of a second TRP and that a CSI-RS #2 and CSI-RS #3 are configured for cell-specific BFD of the PCell.

A-1) In the case that the UE is configured with only one CC, when TRP-specific beam failure is identified in the PCell of the UE, the UE may transmit a BFRQ based on the PUCCH-SR resource linked with a failed BFD-RS set of the PCell.

For example, when the UE identifies BFD based on monitoring of the CSI-RS #1 from the first TRP (TRP-A) in the PCell (operation 1-1), the UE may transmit a BFRQ to the first TRP (TRP-A) using an SR resource (e.g., 17-60) of the PUCCH configured in the PCell (operation 1-2), and the UE may receive a BFRQ response message from the first TRP (TRP-A) in the PCell (operations 1-3).

As another example, when the UE identifies BFD for both the first TRP (TRP-A) and the second TRP (TRP-B) based on monitoring of a CSI-RS #1 and CSI-RS #4 from the first TRP (TRP-A) and the second TRP (TRP-B) in the Pcell (operation 3-1), the UE may transmit BFRQ to the first TRP (TRP-A) using an SR resource (e.g., 17-60 or 17-70) of the PUCCH configured in the PCell, and the UE may transmit a BFRQ to the second TRP (TRP-B) using an SR resource (e.g., 17-65 or 17-75) of the PUCCH configured in the PCell (operation 3-2). The UE may receive a BFRQ response message from the first TRP (TRP-A) and the second TRP (TRP-B) in the PCell (operation 3-3).

As another example, when the UE identifies BFD for both the first TRP (TRP-A) and the second TRP (TRP-B) based on monitoring of a CSI-RS #1 and CSI-RS #4 from the first TRP (TRP-A) and the second TRP (TRP-B) in the Pcell (operation 4-1), the UE may transmit a BFRQ to the first TRP (TRP-A) using an SR resource (e.g., 17-60 or 17-70) of the PUCCH configured in the Pcell, or the UE may select one of the second TRPs (TRP-B) and transmit a BFRQ using an SR resource (e.g., 17-65 or 17-75) of the PUCCH configured in the Pcell (operation 4-2). The UE may expect to receive a BFRQ response message from at least one (e.g., the first TRP or the second TRP) of the first TRP (TRP-A) or the second TRP (TRP-B) in the PCell (operation 4-3).

A-2) In the case that the UE is configured with only one CC, when TRP-specific beam failure is identified in the PCell of the UE, the UE may transmit a BFRQ based on the PUCCH-SR resource linked with a non-failed BFD-RS set of the PCell.

For example, when the UE identifies BFD based on monitoring of the CSI-RS #1 from the first TRP (TRP-A) in the PCell (operation 2-1), the UE may transmit a BFRQ to the second TRP (TRP-B) using an SR resource (e.g., 17-65) of the PUCCH configured in the PCell (operation 2-2), and the UE may receive a BFRQ response message from the second TRP (TRP-B) in the PCell (operation 2-3).

A-3) In the case that the UE is configured with only one CC, when cell-specific beam failure is identified in the PCell of the UE, the UE may transmit a BFRQ based on the PRACH resource linked with a failed BFD-RS set of the PCell.

For example, when the UE identifies BFD from the first TRP (TRP-A) based on monitoring of the CSI-RS #2 in the PCell and identifies BFD from the second TRP (TRP-B) based on monitoring of the CSI-RS #3, the UE may transmit a BFRQ to the first TRP (TRP-A) or the second TRP (TRP-B) using a PRACH resource (17-80 or 17-85) configured in the PCell, and the UE may receive a BFRQ response message from the first TPR (TRP-A) or the second TRP (TRP-B) in the PCell. The BFRQ transmitted by the UE may select one of the 17-80 resource and 17-85 resource or both resources by the implementation of the UE.

Method B

In the case that beam failure is detected for one CC in at least one BFD-RS set(s) configured in two or more CCs, the UE may perform the following operations.

Hereinafter, in methods B-1 to B-3, it is assumed that a CSI-RS #1 and CSI-RS #5 are configured for BFD of a first TRP in the Pcell and that a CSI-RS #3 and CSI-RS #6 are configured for BFD of a second TRP and that a CSI-RS #2 is configured for BFD of the first TRP in the Scell and that a CSI-RS #4 is configured for BFD of the second TRP, and it is assumed that a CSI-RS #5 and CSI-RS #6 are configured for cell-specific BFD of the Pcell and that the CSI-RS #2 and CSI-RS #4 are configured for cell-specific BFD of the SCell.

B-1) In the case that the UE is configured with multiple CCs, when TRP-specific beam failure occurs in the PCell of the UE, the UE may transmit a BFRQ based on the PUCCH-SR resource linked with a failed BFD-RS set of the PCell.

For example, when the UE identifies TRP-specific BFD for the first TRP (TRP-A) based on monitoring of the CSI-RS #1 and CSI-RS #5 from the first TRP (TRP-A) in the PCell (operation 1-1), the UE may transmit a BFRQ to the first TRP (TRP-A) using the SR resource (e.g., 17-60 or 17-61) of the PUCCH configured in the PCell or SCell (operation 1-2), and the UE may receive a BFRQ response message from the first TRP (TRP-A) in the PCell or SCell (operation 1-3).

As another example, when the UE identifies TRP-specific BFD for both the first TRP (TRP-A) and the second TRP (TRP-B) based on monitoring of the CSI-RS #1 and CSI-RS #5 and CSI-RS #3 and CSI-RS #6 from the first TRP (TRP-A) and the second TRP (TRP-B) in the PCell (operation 3-1), the UE may transmit a BFRQ to the first TRP (TRP-A) and the second TRP (TRP-B) using an SR resource (e.g., 17-60, 17-61, 17-65, 17-66, 17-70, 17-71, 17-75, or 17-76) of the PUCCH configured in the PCell or SCell (operation 3-2), and the UE may receive a BFRQ response message from the first TRP (TRP-A) and the second TRP (TRP-B) in the PCell or SCell (operation 3-3).

As another example, when the UE identifies TRP-specific BFD for both the first TRP (TRP-A) and the second TRP (TRP-B) based on monitoring of the CSI-RS #1 and CSI-RS #5 and the CSI-RS #3 and CSI-RS #6 from the first TRP (TRP-A) and the second TRP (TRP-B) in the PCell (operation 4-1), it may be expected that the UE selects one of the first TRP (TRP-A) and the second TRP (TRP-B) and transmits a BFRQ using an SR resource (e.g., 17-60, 17-61, 17-65, 17-66, 17-70, 17-71, 17-75, or 17-76) of the PUCCH configured in the PCell or SCell (operation 4-2), and that the UE receives a BFRQ response message from at least one (e.g., the first TRP or the second TRP) of the first TRP (TRP-A) or the second TRP (TRP-B) in the PCell or SCell (operation 4-3).

B-2) In the case that the UE is configured with multiple CCs, when TRP-specific beam failure occurs in the PCell of the UE, the UE may transmit a BFRQ based on the PUCCH-SR resource linked with a non-failed BFD-RS set of the PCell.

For example, when the UE identifies TRP-specific BFD for the first TRP (TRP-A) based on monitoring of the CSI-RS #1 and CSI-RS #5 from the first TRP (TRP-A) in the PCell (operation 2-1), the UE may transmit a BFRQ to the second TRP (TRP-B) using the SR resource (e.g., 17-65 or 17-66) of the PUCCH configured in the PCell or SCell (operation 2-2), and the UE may receive a BFRQ response message from the second TRP (TRP-B) in the PCell or SCell (operation 2-3).

B-3) In the case that the UE is configured with multiple CCs, when cell-specific beam failure is identified in the PCell of the UE, the UE may transmit a BFRQ based on the PRACH resource linked with a failed BFD-RS set of the PCell.

For example, when the UE identifies cell-specific BFD for the PCell based on monitoring of the CSI-RS #5 from the first TRP (TRP-A) and the CSI-RS #6 from the second TRP (TRP-B) in the PCell, the UE may transmit a BFRQ to the first TRP (TRP-B) or the second TRP (TRP-B) using the PRACH resource 17-80 or 17-85 configured in the PCell, and the UE may receive a BFRQ response message from the first TPR (TRP-A) or the second TRP (TRP-B) in the PCell. The BFRQ transmitted by the UE may select one of the 17-80 resource and 17-85 resource, or both resources by the implementation of the UE.

Hereinafter, in methods B-4 to B-6, it is assumed that the CSI-RS #1 is configured for BFD of the first TRP in the PCell and that the CSI-RS #3 is configured for BFD of the second TRP and that the CSI-RS #2 and CSI-RS #5 are configured for BFD of the first TRP in the SCell and that the CSI-RS #4 and CSI-RS #6 are configured for BFD of the second TRP, and it is assumed that the CSI-RS #1 and CSI-RS #3 are configured for cell-specific BFD of the PCell and that the CSI-RS #5 and CSI-RS #6 are configured for cell-specific BFD of the SCell.

B-4) In the case that the UE is configured with multiple CCs, when TRP-specific beam failure occurs in at least one SCell of the UE, the UE may transmit a BFRQ based on the PUCCH-SR resource of the PCell linked with the failed BFD-RS set of the SCell.

For example, when the UE identifies TRP-specific BFD for the first TRP (TRP-A) based on monitoring of the CSI-RS #2 and CSI-RS #5 from the first TRP (TRP-A) in the SCell (operation 1-1), the UE may transmit a BFRQ including information on at least one failed SCell to the first TRP using the SR resource (e.g., 17-60) of the PUCCH configured in the PCell directly or indirectly linked with the CSI-RS #2 and CSI-RS #5 of the SCell (operation 1-2), and the UE may receive a BFRQ response message from the TRP-A in the PCell (operation 1-3).

As another example, when the UE identifies TRP-specific BFD for both the first TRP (TRP-A) and the second TRP (TRP-B) based on monitoring of the CSI-RS #2 and CSI-RS #5 and the CSI-RS #4 and CSI-RS # from the first TRP (TRP-A) and the second TRP (TRP-B) in the SCell (operation 3-1), the UE may transmit a BFRQ including information on at least one failed SCell to the first TRP (TRP-A) and the second TRP (TRP-B) using the SR resource (e.g., 17-60, 17-65, 17-70, or 17-75) of the PUCCH configured in the PCell directly or indirectly linked with the CSI-RS #2 and CSI-RS #5 or the CSI-RS #4 and CSI-RS #6 of the SCell (operation 3-2), and the UE may receive a BFRQ response message from the first TRP (TRP-A) and the second TRP (TRP-B) in the PCell (operation 3-3).

As another example, when the UE identifies TRP-specific BFD for both the first TRP (TRP-A) and the second TRP (TRP-B) based on monitoring of the CSI-RS #2 and CSI-RS #5 and the CSI-RS #4 and CSI-RS #6 from the first TRP (TRP-A) and the second TRP (TRP-B) in the Scell (operation 4-1), it may be expected that the UE may select one of the first TRP (TRP-A) and the second TRP (TRP-B) and transmit a BFRQ including information on at least one failed Scell using the SR resource (e.g., 17-60, 17-65, 17-70, or 17-75) of the PUCCH configured in the PCell directly or indirectly linked with the CSI-RS #2 and CSI-RS #5 or the CSI-RS #4 and CSI-RS #6 of the SCell (operation 4-2) and that the UE may receive a BFRQ response message from at least one (e.g., the first TRP or the second TRP) of the first TRP (TRP-A) or the second TRP (TRP-B) in the Pcell (operation 4-3).

B-5) In the case that the UE is configured with multiple CCs, when TRP-specific beam failure occurs in the SCell of the UE, the UE may transmit a BFRQ based on the PUCCH-SR resource of the PCell linked with a non-failed BFD-RS set of the SCell.

For example, when the UE identifies TRP-specific BFD for the first TRP (TRP-A) based on monitoring of the CSI-RS #2 and CSI-RS #5 from the first TRP (TRP-A) in the SCell (operation 2-1), the UE may transmit a BFRQ including information on at least one failed SCell to the second TRP (TRP-B) using the SR resource (e.g., 17-65) of the PUCCH configured in the PCell directly or indirectly linked with the CSI-RS #2 and CSI-RS #5 of the SCell (operation 2-2), and the UE may receive a BFRQ response message from the second TRP (TRP-B) in the Pcell (operation 2-3).

B-6) In the case that the UE is configured with multiple CCs, when cell-specific beam failure is identified in at least one SCell of the UE, the UE may transmit a BFRQ based on the PRACH resource of the PCell or SCell linked with a failed BFD-RS set of the SCell.

For example, when the UE identifies BFD based on monitoring of the CSI-RS #5 from the first TRP (TRP-A) in the SCell and identifies cell-specific BFD for the SCell based on monitoring of the CSI-RS #6 from the second TRP (TRP-B), the UE may transmit a BFRQ to the first TRP (TRP-A) or the second TRP (TRP-B) using the PRACH resource (17-80 or 17-85) configured in the PCell or the PRACH resource (17-81 or 17-86) configured in the SCell, and the UE may receive a BFRQ response message from the first TPR (TRP-A) or the second TRP (TRP-B) in the PCell or SCell. The BFRQ transmitted by the UE may select at least one of a 17-80 resource, 17-81 resource, 17-85 resource, or 17-86 resource by the implementation of the UE.

Each component or step may be selectively coupled/combined and applied between the above-described embodiments and methods in the disclosure. Further, according to configurations and/or definitions on a system, all of steps described above do not necessarily have to be included, and some steps may be omitted.

Embodiment 8: BFR-Related RS Resource Configuration and Mapping Operation

The following description describes, in a multiple TRP operation, an operation in which the UE identifies a new beam in a beam failure recovery process, and assumption and basic operation for resource scheduling from a plurality of TRPs performed by the UE based on a new beam after a predetermined time period.

Figure 18A:
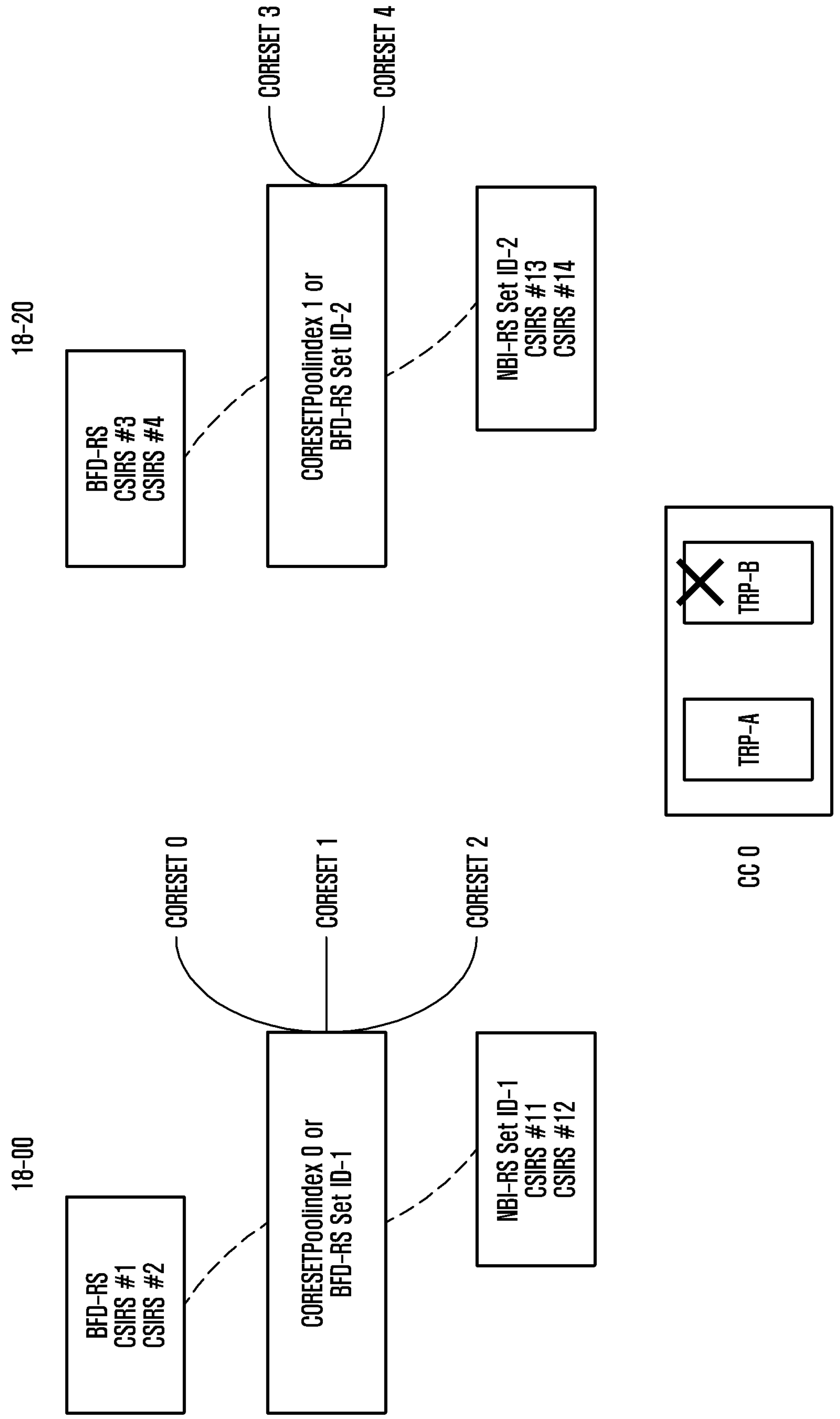
FIG. 18A illustrates a resource configuration and association required for a plurality of TRPs to perform BFD and identify a new beam.
Figure 18B:
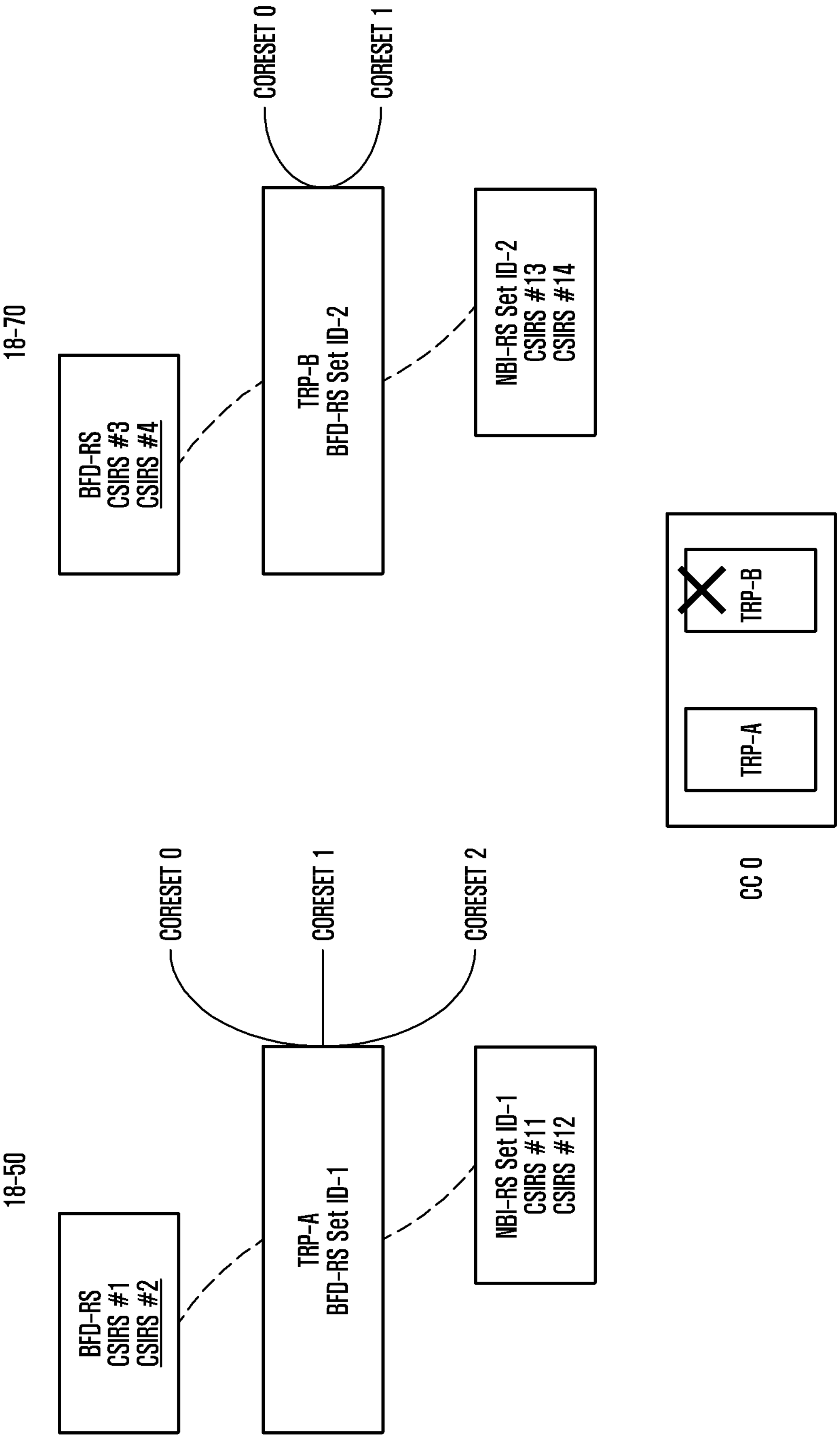
FIG. 18B illustrates a resource configuration and association required for a plurality of TRPs to perform BFD and identify a new beam.

FIGS. 18A and 18B illustrate a resource configuration and association required for a plurality of TRPs to perform beam failure detection and identify new beams.

C-1) The base station may be composed of a TRP-A 18-00 and a TRP-B 18-20. In an RRC configuration operation for multiple TRP-A and TRP-B, the base station may configure a CORESETPoolindex and/or CORESETPoolindex (e.g., 0 or 1) including at least one CORESET to the UE in a serving cell configuration>BWP configuration>PDCCH-config configuration>CORESET configuration. For example, the TRP-A 18-00 may correspond to a CORESETPoolindex 0 and may be configured to include a CORESET 0, CORESET 1, and CORESET 2. The TRP-B 18-20 may correspond to a CORESETPoolindex 1 and be configured to include a CORESET 3 and CORESET 4. In this way, in the case that two different values of CORESETPoolindex are configured, the base station may configure a link between the BFD-RS set and each CORESETPoolindex for TRP-specific BFR in the RRC configuration operation to the UE. For example, the base station may configure SSB or CSI-RS resources in a RadioLinkMonitoringConfig configuration and link and configure CORESETPoolindex related information in an additional configuration. That is, when a CSI-RS #4 satisfies a beam failure reference, the UE may recognize a beam failure situation in the TRP-B linked with a CORESETPoolindex 1 composed of a CORESET 3 or CORESET 4, and perform a TRP-specific BFR operation for the TRP-B.

C-2) The base station may configure to link the CORESETPoolindex and new candidate beam resource or NBI-RS set related information including the corresponding resource in the upper layer for the UE. The base station may link the CORESETPoolindex (e.g., 0 or 1) with information related to PRACH-ResourceDedicatedBFR or PUCCH-ResourceDedicatedBFR, BFR-SSB-Resource and/or BFR-CSIRS-Resource in a configuration such as CandidateBeamRSListExt-r16 and a candidateBeamRSList in the RRC configuration. For example, the base station may configure a CSI-RS #11 and CSI-RS #12 by PRACH-ResourceDedicatedBFR or PUCCH-ResourceDedicatedBFR as NBI-RS Set ID-1 in the CORESETPoolindex 0 linked with the CORESET 0, CORESET 1, and CORESET 2, and configure a CSI-RS #13 and CSI-RS #14 by PRACH-ResourceDedicatedBFR or PUCCH-ResourceDedicatedBFR as NBI-RS Set ID-2 in the CORESETPoolindex 1 linked with the CORESET 2 and CORESET 3. When the UE identifies beam failure based on the CSI-RS #4 resource based on the configuration of the base station, the UE may monitor a CSI-RS #13 or #14 in the BFR-CSIRS-Resource as an NBI-RS set 2 corresponding to the CORESETPoolindex 1 linked with the CSI-RS #4 to find a new beam that may replace the beam.

C-3) The base station may be composed of a TRP-A 18-00 and TRP-B 18-20 or TRP-A 18-50 and TRP-B 18-70. In an RRC configuration operation for multiple TRP-A and TRP-B, the base station may configure the CORESETPoolindex to only 0 or may not configure the CORESETPoolindex to the UE in a serving cell configuration>BWP configuration>PDCCH-config configuration>CORESET configuration. In the case that the CORESETPoolindex is not configured, the UE regards that the CORESETPoolindex is configured to 0.

For example, when the CORESETPoolindex is not configured, the UE may not determine whether the TRP-A 18-00 is configured to include CORESET 0, CORESET 1, and CORESET 2 and whether the TRP-B 18-20 is configured to include the CORESET 3 and CORESET 4. Alternatively, in the case that the CORESETPoolindex is not configured and that two TCI configurations or QCL assumptions are considered in one CORESET (described in Table 13), the UE may not determine whether the TRP-A 18-50 is configured to include a CORESET 0, CORESET 1, and CORESET 2 and whether the TRP-B 18-70 is configured to include a CORESET 0 and CORESET 1 (or CORESET 1, CORESET 2: not illustrated). To solve this, the base station may configure a BFD-RS set ID that may replace the CORESETPoolindex. For example, the BFD-RS set #1 may be configured to correspond to the CORESET 0, CORESET 1, and CORESET 2, and the BFD-RS set #2 may be configured to correspond to the CORESET 3 and CORESET 4. That is, in the case that the CORESETPoolindex is not configured, the base station may link the CORESET and the BFD-RS set ID corresponding to the CORESET for TRP-specific BFR in the RRC configuration operation to the UE to configure the UE to distinguish TRPs. Specifically, the base station may configure SSB or CSI-RS resources in a RadioLinkMonitoringConfig configuration and configure to link with BFD-RS set ID related information in an additional configuration. For example, when the CSI-RS #4 satisfies the beam failure reference, the UE may recognize a beam failure situation in the TRP-B linked with the BFD-RS set #2 composed of the CORESET 3 or CORESET 4, and perform a TRP-specific beam failure recovery operation for the TRP-B.

C-4) The base station may configure to link a CORESETPoolindex and a new candidate beam resource or NBI-RS set related information including the corresponding resource in the upper layer for the UE. The base station may link the CORESET with information related to PRACH-ResourceDedicatedBFR or PUCCH-ResourceDedicatedBFR, BFR-SSB-Resource and/or BFR-CSIRS-Resource in a configuration such as CandidateBeamRSListExt-r16 and a candidateBeamRSList in the RRC configuration.

For example, the base station may configure a CSI-RS #11 and CSI-RS #12 by PRACH-ResourceDedicatedBFR or PUCCH-ResourceDedicatedBFR as NBI-RS Set ID-1 to the BFD-RS set #1 linked with the CORESET 0, CORESET 1, and CORESET 2, and configure a CSI-RS #13 and CSI-RS #14 by PRACH-ResourceDedicatedBFR or PUCCH-ResourceDedicatedBFR as NBI-RS Set ID-2 in the BFD-RS set #2 linked with the CORESET 3 and CORESET 4. Alternatively, in the case that the CORESETPoolindex is not configured and that two TCI configurations or QCL assumptions are considered in one CORESET (described in Table 13), the base station may configure a CSI-RS #11 and CSI-RS #12 by PRACH-ResourceDedicatedBFR or PUCCH-ResourceDedicatedBFR, and NBI-RS Configured as NBI-RS set ID-1 in the BFD-RS set #1 linked with the CORESET 0, CORESET 1, and CORESET 2 and configure a CSI-RS #13 and CSI-RS #14 by PRACH-ResourceDedicatedBFR or PUCCH-ResourceDedicatedBFR as NBI-RS Set ID-2 in the BFD-RS set #2 linked with the CORESET 0 and CORESET 1.

When the UE identifies beam failure based on the CSI-RS #4 resource based on the configuration of the base station, the UE may monitor a CSI-RS #13 or #14 in a BFR-CSIRS-Resource as an NBI-RS set 2 corresponding to a BFD-RS set #2 linked with the CSI-RS #4 to find a new beam that may replace the beam.

In C-3 and C-4, even if two different CORESETPoolIndexes are not configured, if the UE receives an upper layer configuration related to TRP-specific beam failure recovery (e.g., two NBI-RS sets), the UE may receive a configuration of the number of CORESETs to maximum 5. Further, in C-3 and C-4, because two different CORESETPoolIndexes are not configured, the UE may consider the maximum number of CORESETs to 3. In this case, in examples of C-3 and C-4, the BFD-RS set #1 may be configured to correspond to the CORESET 0, and the BFD-RS set #2 may be configured to correspond to the CORESET 1 and CORESET 2.

Two embodiments described above may be operated in combination.

Embodiment 9: TCI Cases of Each PDCCH and PDSCH in TRP-Specific BFR Operation Hereinafter, a configuration of TCI of each CORESET index in the above-described TRP-specific BFR operation will be described. As illustrated in Table 5 described above, a rel-15/16 base station configured one TCI-state for PDCCH monitoring to the CORESET in the RRC configuration for beamforming of the UE, configured multiple TCI-states in the RRC configuration, and activated one of the plurality of TCI-states configured as the TCI-state for the CORESET through the MAC-CE. In the disclosure, the base station may consider configuring or activating at least two TCI state(s) so that the UE may perform Tx/Rx beamforming based on a plurality of TRPs. In order to configure or activate at least two TCI state(s) in the PDCCH configuration, the base station considered to configure together the number of TCI states of the PDSCH scheduled by the PDCCH and association-related information.

Table 13 indicates the transmission technique for the PDCCH in the rows and the transmission technique for the PDSCH in the columns.

TABLE 13

| | — | PDSCH | | |
|---|---|---|---|---|
| PDCCH | — | Rel-15 (1 TCI state) | Rel-16 (1 or 2 TCI states) | Scheme 1 or Pre-compensation (2 TCI states) |
| | Rel-15/16 (1 TCI-state) | Support | Support | Case 3 |
| | Rel-17 repetition (1 TCI state) | Support | Support | Case 4 |
| | Scheme 1 or Pre-compensation(2 TCI-states) | Case 1 | Case 2 | Case5 |

PDCCH transmission techniques may be simply divided into rel-15/16, rel-17 URLLC, scheme 1 or pre-compensation. Rel-15/16 means a state in which one TCI state is configured or activated in the CORESET and means single-TRP-based PDCCH transmission. Rel-17 URLLC means a PDCCH repetition method, which means repeatedly transmitting the PDCCH using the same or different CORESETs connected to two SS sets, respectively. In this case, one TC state may be configured or activated in one CORESET. Scheme 1/pre-compensation assumes a PDCCH transmitted in one frequency band (e.g., one CC) considering at least a high speed train-single frequency network (HST-SFN). In this case, two TC states are configured or activated in one CORESET so that the PDCCH may be transmitted based on an SFN. Further, the scheme 1 may be composed of two TCIs, TCI-1 may be composed of QCL-TypeA (Doppler spread, Doppler shift, average delay, delay spread), and TCI-2 may be composed of QCL-TypeA (Doppler spread, Doppler shift, average delay, delay spread). However, TRP pre-compensation may be composed of two TCIs, TCI-1 may be composed of QCL-TypeA (Doppler spread, Doppler shift, average delay, delay spread), and TCI-2 may be composed of a new type (average delay, delay spread) rather than QCL-typeA and B. The base station and the UE may distinguish whether the same TRP or different TRP based on scheme 1 or TRP pre-compensation configuration.

PDSCH techniques may be simply divided into rel-15, rel-16, and scheme 1/pre-compensation. Here, rel-15 has one TCI state indicated by DCI and means a PDSCH transmitted to a single-TRP. Rel-16 has one or two TCI states indicated by DCI, and when indicated with one codepoint, Rel-16 means single-TRP-based PDSCH transmission, and when indicated with two codepoints, Rel-16 means multi-TRP-based PDSCH transmission (SDM, FDM, and TDM). Scheme 1/pre-compensation means a method of transmitting the PDSCH in the SFN considering at least a HST-SFN. In scheme 1/pre-compensation, two TCI states may be indicated in one TCI codepoint, as in the rel-16 multi-TRP transmission technique.

Considering use cases not indicated as support in Table 13, the base station may basically configure two TCI-state IDs in PDCCH transmission. In this case, when two TCI state IDs are configured in the above configuration, in order to monitor the configured PDCCH candidates (search space resource, search space resource set, or CORESET ID), the UE may perform beamforming in consideration of QCL assumption of the SSB or CSI-RS linked with the TCI state ID. The base station may configure each TRP to include a different CORESET ID in order to avoid overlapping of each other as in 18-00 and 18-20 with a method of configuring two TCI states in one CORESET and configure two TCI state IDs to the UE within one CORESET in one TRP. Further, the base station may configure each TRP to include overlapping CORESET IDs, as in 18-50 and 18-70, and configure one TCI state ID within one CORESET in one TRP to the UE.

For example, in case 1, two different TC states are configured or activated in one CORESET in a plurality of TRPs (e.g., two), and the PDCCH is transmitted based on an SFN, and in this case, the PDSCH scheduled by the PDCCH in the CORESET may be instructed to follow one TCI state. As another example, in case 2, two different TCI states are configured or activated in one CORESET in a plurality of TRPs (e.g., two), and the PDCCH is transmitted based on the SFN, and in this case, when TCI-related information indicated by the DCI in the PDCCH within the CORESET is indicated with one codepoint, the case 2 may operate in the same manner as the case 1, and when TCI-related information indicated by the DCI in the PDCCH within the CORESET is indicated with two codepoints, a multi-TRP-based PDSCH (SDM, FDM, TDM) may be transmitted. As another example, in case 3, one TCI state is configured or activated in one CORESET in a plurality of TRPs (e.g., two), and the PDCCH is transmitted based on the SFN, and in this case, when TCI-related information indicated by the DCI in the PDCCH within the CORESET is indicated with one codepoint, a single TRP-based PDSCH may be transmitted in the SFN. As another example, in case 4, one TCI state is configured or activated in one CORESET in a plurality of TRPs (e.g., two), and the PDCCH is transmitted based on the SFN, and in this case, when TCI-related information indicated by the DCI in the PDCCH within the CORESET is indicated with one codepoint, the case 4 operates the same manner as the case 1, and when TCI-related information indicated by the DCI in the PDCCH within the CORESET is indicated with two codepoints, a multi-TRP-based PDSCH (SDM, FDM, TDM) may be transmitted in the SFN. As another example, in case 5, two TCI states are configured or activated in one CORESET in a plurality of TRPs (e.g., two), and the PDCCH is transmitted based on the SFN, and in this case, when TCI-related information indicated by the DCI in the PDCCH in the CORESET is indicated with one codepoint, one TCI mapped to the codepoint indicated in the PDCCH may be applied, and when TCI-related information indicated by the DCI in the PDCCH in the CORESET is indicated with two codepoints, two TCIs mapped to the codepoint indicated in the PDCCH may be applied. Here, when two TCI states are configured or activated in each of two CORESETs in which the UE is configured to monitor, the UE may assume that the total number of TCI states applied for PDCCH or PDSCH reception based on UE capability does not exceed 2. Detailed operations in the BFR process for each of the cases described above will be described later.

The operations described in Table 13 may be determined whether they are supported according to the capability of the UE. Here, the capability of the UE may be transmitted to the base station in an RRC configuration step through a UE capability message, and the base station may configure at least two TCI state ID(s) in a PDCCH monitoring operation of the UE based on this.

Figure 19A:
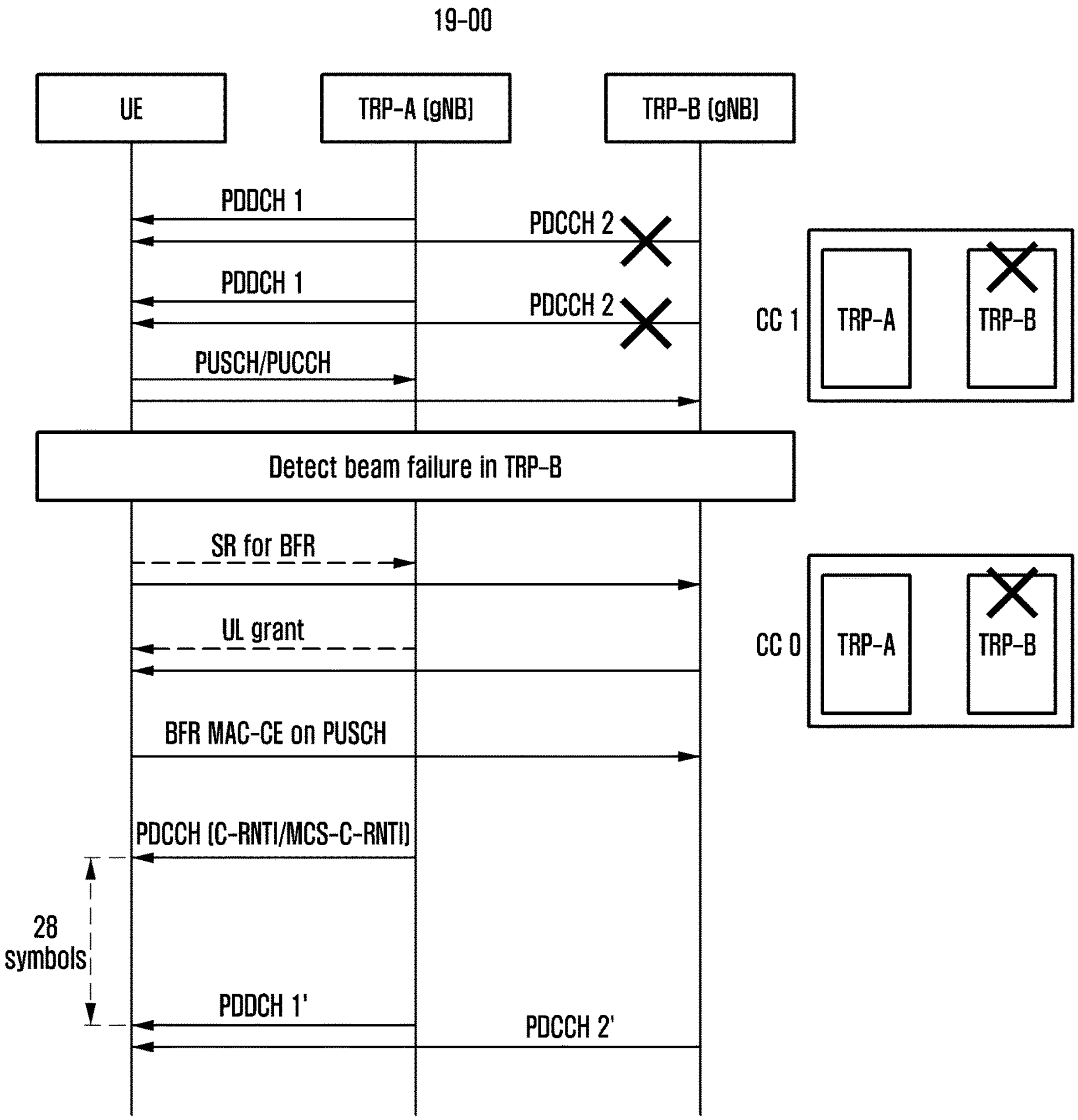
FIG. 19A illustrates a BFR procedure modified to support one or two transmission configuration indicators (TCI) in one CORESET.
Figure 19B:
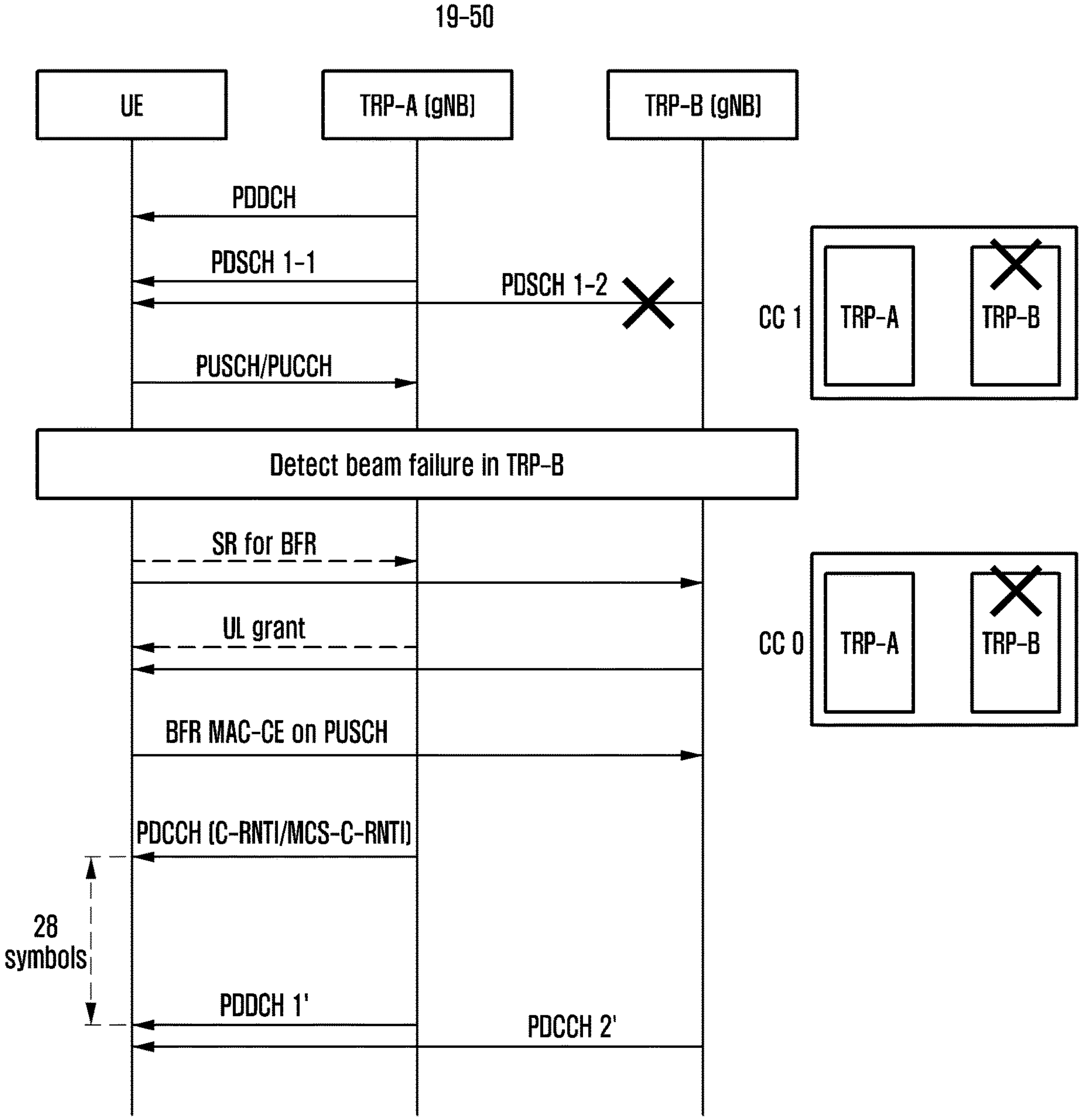
FIG. 19B illustrates a BFR procedure modified to support one or two TCIs in one CORESET.
Figure 20:
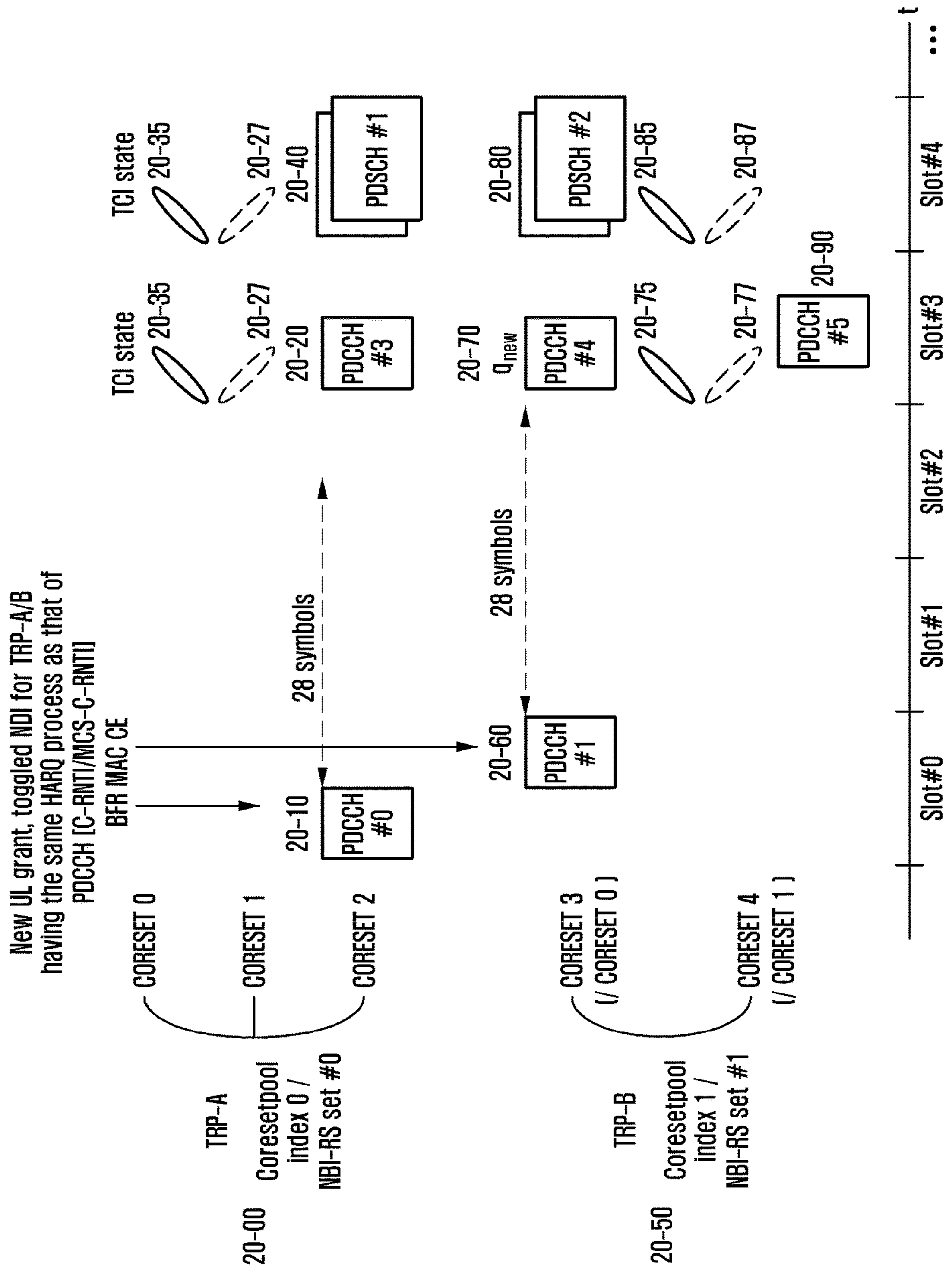
FIG. 20 illustrates a PDCCH reception operation of a UE after receiving a BFR response message transmitted from a TRP-A and TRP-B.

Embodiment 10: Message and Procedure in which BFRQ is Transmitted from TRP-Specific BFR The base station and the UE may change part of a BFRQ message in order to support at least one or two TCIs within one CORESET, as illustrated in FIGS. 18A, 18B, and Table 13. In FIG. 15, when only supporting one TCI is considered in one CORESET, FIGS. 19A and 19B illustrate a changed BFR procedure in order to support one or two TCIs in one CORESET. In FIGS. 19A and 19B, the base station and the UE may consider both multi-DCI-based multiple TRP transmission that transmits the PDCCH and PDSCH from the TRP-A and TRP-B, respectively and single-DCI-based multiple TRP transmission that transmits the PDCCH from one TRP (e.g., TRP-A) and that transmits each PDSCH from two TRPs (e.g., TRP-A and TRP-B). Further, in FIGS. 19A and 19B, when beam failure occurs in at least one CC in a primary component carrier (PCC) and secondary component carrier (SCC) or a master cell group (MCG) and secondary cell group (SCG) in a TRP specific BFR process, the base station and the UE may perform a beam failure recovery process.

FIGS. 19A and 19B each illustrate a BFR process in multi-DCI or single-DCI based multiple TRP transmission.

FIG. 19-00 illustrates the case that a PDCCH and PDSCH are transmitted from a TRP-A and TRP-B in multi-DCI-based multiple TRP transmission. In a weak electric field state in which reception of a PDCCH 2 or PDSCH 2 transmitted from the TRP-B is to fail, the UE may perform periodic RS monitoring thereof or an RS monitoring process based on preconfigured conditions, an identification process of BFD, and a recovery process of BFD based on the above-described RS. Specifically, while monitoring the RS, the UE may determine BFD based on the RS for beam failure detection and transmit a beam failure recovery request for recovering the BFD based on information of the RS corresponding to the TRP-B in which the BFD is identified to the TRP-A or TRP-B.

Here, the base station may allocate a PUCCH SR (e.g., link recovery request) resource for the TRP-A and a PUCCH SR resource for the TRP-B for beam failure recovery request transmission of the UE. As the PUCCH SR resource, the same PUCCH resource set resource (ID) and PUCCH resource (ID) may be configured, or a different PUCCH resource set resource (ID) and PUCCH resource (ID) may be configured according to the TRP. The UE may transmit a BFRQ using a QCL spatial filter corresponding to the CORESETPoolindex linked with the BFD-RS (set ID) of FIG. 18A described above.

Thereafter, the base station may receive a PUCCH-SR request of the UE transmitted at a specific resource and timing. When the base station receives the PUCCH-SR signal or message, the base station may transmit a UL grant to the UE.

The UE that has received the UL grant may transmit a BFR MAC CE message based on the PUSCH resource allocated by the base station. For example, at least one of the following information may be included in the MAC-CE.

RSs in a failed BFD RS set or BFD RS group corresponding to each TRP (or RSs in a BFD RS set or BFD RS group corresponding to each CORESETPoolIndex)

CC index corresponding to a failed link

Whether there is a beam candidate identified in a failed BFD RS set corresponding to the TRP When there is a beam candidate corresponding to the TRP (or CORESETPoolIndex), one or two indexes of a new beam candidate (to be described in detail later)

When a BFR MAC CE message transmitted by the UE is successfully received, the base station may transmit a PDCCH scrambled with a C-RNTI or MCS-C-RNTI to the UE. Here, DCI information included in the PDCCH transmitted to the UE may allocate a new UL grant using the same HARQ process information as that of the BFR MAC CE transmitted by the UE.

The UE requires a monitoring operation of a PDCCH (e.g., PDCCH 1', PDCCH 2') in the CORESET(s) of a specific cell (e.g., PCell or SCell) in which TRP-specific BFR has occurred from a time point after 28 symbols based on a PDCCH reception time point scheduling the UL grant (to be described in detail later).

As another example, FIG. 19-22 illustrate the case that a PDCCH is transmitted from the TRP-A and that a PDSCH is transmitted from the TRP-A or TRP-B in single-DCI-based multiple TRP transmission. In a weak electric field state in which reception of a PDSCH 2 transmitted from the TRP-B is to fail, the UE may perform a periodic RS monitoring process thereof based on the above-described RS or a RS monitoring process based on preconfigured conditions, a process of identifying BFD, and a process of recovering BFD. Specifically, while monitoring the RS, the UE may determine BFD based on the RS for beam failure detection and transmit a beam failure recovery request for recovering BFD based on information of the RS corresponding to the TRP-B in which the BFD is identified to the TRP-A or TRP-B.

Here, the base station may allocate a PUCCH SR (e.g., link recovery request) resource for the TRP-A and a PUCCH SR resource for the TRP-B for beam failure recovery request transmission of the UE. As the PUCCH-SR resource, the same PUCCH resource set resource (ID) and PUCCH resource (ID) may be configured, or a different PUCCH resource set resource (ID) and PUCCH resource (ID) may be configured according to the TRP. The UE may transmit a BFRQ using a QCL spatial filter corresponding to the CORESETPoolindex (e.g., 1) linked with the BFD-RS (set ID) of FIG. 18A described above. Alternatively, the UE may transmit a BFRQ using a QCL spatial filter of an index that does not correspond to the CORESETPoolindex (e.g., 0) linked with the BFD-RS (set ID) of FIG. 18A described above. Alternatively, the UE may transmit all BFRQs or select one by implementation using the QCL spatial filter corresponding to the CORESETPoolindex (e.g., 0 and 1) linked with the BFD-RS (set ID) of FIG. 18A described above.

Thereafter, the base station may receive a PUCCH-SR request of the UE transmitted at a specific resource and timing. When the base station receives the PUCCH-SR signal or message, the base station may transmit a UL grant to the UE. The UE that has received the UL grant may transmit a BFR MAC CE message based on the PUSCH resource allocated by the base station. For example, at least one of the following information may be included in the MAC-CE.

RSs in a failed BFD RS set or BFD RS group corresponding to each TRP (or RSs in the BFD RS set or BFD RS group corresponding to each CORESETPoolIndex)

CC index corresponding to a failed link

Whether there is a beam candidate identified in a failed BFD RS set corresponding to the TRP When there is a beam candidate corresponding to the TRP (or CORESETPoolIndex), one or two indexes of the new beam candidate (to be described in detail later)

When the BFR MAC CE message transmitted by the UE is successfully received, the base station may transmit a PDCCH scrambled with a C-RNTI or MCS-C-RNTI to the UE. Here, DCI information included in the PDCCH transmitted to the UE may allocate a new UL grant using the same HARQ process information as that of the BFR MAC CE transmitted by the UE.

The UE requires a monitoring operation of the PDCCH (e.g., PDCCH 1', PDCCH 2') in the CORESET(s) of a specific cell (e.g., PCell or SCell) in which TRP-specific BFR has occurred from a time after 28 symbols based on a PDCCH reception time scheduling the UL grant (to be described in detail later).

In various embodiments described above, subcarrier spacing for 28 symbols may be determined based on the smaller of subcarrier spacing of activated DL BWP receiving the PDCCH and subcarrier spacing of activated DL BWP in each failed Cell. Specifically, failed cell monitoring of the UE is an operation of identifying a new beam for recovery of a new link instead of a link in which beamforming has failed, and by applying a spatial domain filter based on preconfigured $q_{new}$ related information, the UE may perform beamforming to perform uplink control channel (e.g., PUCCH-SCell) or data channel transmission.

Embodiment 11: Default PDCCH Reception Operation after Receiving BFR Response In various embodiments described above, the UE requires a monitoring operation of the PDCCH (PDCCH 1' or PDCCH 2' of 19-00 and 19-50) in the CORESET(s) of a specific cell (e.g., PCell or SCell) in which TRP-specific BFR has occurred from a time point after 28 symbols based on a PDCCH reception time point scheduling a UL grant. Hereinafter, a PDCCH monitoring operation after 28 symbols from a time point at which the UE finally receives the BFR response after the TRP-specific BFR occurs will be described.

In FIGS. 20, 20-10 and 20-60 illustrate a PDCCH reception operation after receiving a BFR response message transmitted from a TRP-A 20-00 and TRP-B 20-50.

Option 1-1) In M-DCI-based multiple TRP transmission, as in 19-00, after a CORESETPoolindex is configured in the upper layer, as in C-1 and C-2 of the above-described Embodiment 8, in the case that the UE transmits one NBI-RS index (first NBI-RS index) included in the above-described BFRQ message, the UE may determine default QCL assumption 20-77 based on the first NBI-RS index in all CORESETs (e.g., CORESET 3, CORESET 4) configured to link with a BFD-RS set ID (e.g., BFD-RS set 1) or a CORESETPoolindex (e.g., CORESETPoolindex 1) in which TRP-specific BFR occurs from a time point after 28 symbols from the last symbol of the PDCCH resource as a BFR response. That is, the UE may update to apply the QCL filter 20-77 with one activated TCI state linked with the first NBI-RS index in a CORESET 3 and CORESET 4. The operation within Option 1-1) may be limited to the case that ServingCellConfig>enableTwoDefaultTCI-States is not configured with the RRC signal or that upper layer signaling for SFN PDCCH transmission is not configured. In this case, upper layer signaling for SFN PDCCH transmission may be commonly applied to all CORESETs (i.e., the case that upper layer signaling for one corresponding SFN PDCCH transmission is not configured) or may be configured independently for each CORESET (i.e., the case that upper layer signaling for SFN PDCCH transmission for all CORESETs is not configured).

Option 1-2) In M-DCI-based multiple TRP transmission, as in 19-00, after a CORESETPoolindex is configured in the upper layer, as in C-1 and C-2 of the above-described Embodiment 8, in the case that the UE transmits two NBI-RS indexes (first NBI-RS index, second NBI-RS index) included in the above-described BFRQ message, the UE may determine QCL assumptions 20-75 and 20-77 based on the first NBI-RS index and the second NBI-RS in all CORESETs (e.g., CORESET 3, CORESET 4) configured to link with a BFD-RS set ID (e.g., BFD-RS set 1) or a CORESETPoolindex (e.g., CORESETPoolindex 1) in which TRP-specific BFR occurs from a time point after 28 symbols from the last symbol of the PDCCH resource as a BFR response. That is, the UE may apply all QCL filters 20-77 and 20-75 using one activated TCI state linked with the first NBI-RS index and another activated TCI state linked with the second NBI-RS index in the CORESET 3 and CORESET 4. In this case, the UE may receive all CORESETs in the form of an SFN using two TCI states, or the UE may arbitrarily select one of two TCI states to receive all CORESETs. The operation within option 1-2) may be limited to the case that ServingCellConfig>enableTwoDefaultTCI-States is configured with the RRC signal and that upper layer signaling for SFN PDCCH transmission is configured. In this case, upper layer signaling for SFN PDCCH transmission may be commonly applied to all CORESETs (i.e., the case that upper layer signaling for one corresponding SFN PDCCH transmission is configured) or may be configured independently for each CORESET (i.e., the case that higher layer signaling for SFN PDCCH transmission for all CORESETs is configured).

Option 1-3) In M-DCI-based multiple TRP transmission, as in 19-00, after the CORESETPoolindex is configured in the upper layer, as in C-1 and C-2 of the above-described Embodiment 8, in the case that the UE transmits two NBI-RS indexes (first NBI-RS index, second NBI-RS index) included in the above-described BFRQ message, the UE may determine QCL assumption 20-77 based on one (e.g., first NBI-RS index) of a first NBI-RS index and a second NBI-RS in all CORESETs (e.g., CORESET 3, CORESET 4) configured to link with a BFD-RS set ID (e.g., BFD-RS set 1) or a CORESETPoolindex (e.g., CORESETPoolindex 1) in which TRP-specific BFR occurs from a time point after 28 symbols from the last symbol of the PDCCH resource as a BFR response. That is, the UE may apply the QCL filter 20-77 using one activated TCI state linked with the first NBI-RS index in the CORESET 3 and CORESET 4. Here, the second NBI-RS index not used in CORESET monitoring may be determined to be configured for default QCL assumptions 20-85 and 20-87 in the PDSCH. The operation within option 1-3) may be limited to the case that ServingCellConfig>enableTwoDefaultTCI-States is not configured with the RRC signal or that upper layer signaling for SFN PDCCH transmission is not configured. In this case, upper layer signaling for SFN PDCCH transmission may be commonly applied to all CORESETs (i.e., the case that upper layer signaling for one corresponding SFN PDCCH transmission is not configured) or may be configured independently for each CORESET (i.e., the case that upper layer signaling for SFN PDCCH transmission for all CORESETs is not configured).

Option 1-4) In S-DCI-based multiple TRP transmission as in 19-50, after the CORESETPoolindex is configured to only 0 or is not configured in the upper layer as in C-3 and C-4 of the above-described Embodiment 8, in the case that the UE transmits one NBI-RS index (first NBI-RS index) included in the above-described BFRQ message, the UE may determine default QCL assumption 20-77 based on the first NBI-RS index in all CORESETs (e.g., {CORESET 3, CORESET 4} or (CORESET 0, CORESET 11) configured to link with the BFD-RS set (e.g., BFD-RS set #1) in which TRP-specific BFR occurs from a time point after 28 symbols from the last symbol of the PDCCH resource as a BFR response. That is, the UE may update to apply the QCL filter 20-77 with one activated TCI state linked with the first NBI-RS index in {CORESET 3, CORESET 4} or (CORESET 0, CORESET 11. Within the corresponding paragraph, the operation in option 1-4) may be limited to the case that ServingCellConfig>enableTwoDefaultTCI-States is not configured with an RRC signal or that upper layer signaling for SFN PDCCH transmission is not configured. In this case, upper layer signaling for SFN PDCCH transmission may be commonly applied to all CORESETs (i.e., the case that upper layer signaling for one corresponding SFN PDCCH transmission is not configured) or may be configured independently for each CORESET (i.e., the case that upper layer signaling for SFN PDCCH transmission for all CORESETs is not configured).

Alternatively, the UE may determine default QCL assumption based on the first NBI-RS index in some CORESET(s) (e.g., lowest/highest CORESET; CORESET 3/4 among CORESET 3 and CORESET 4 or CORESET 0/1 among CORESET 0 and CORESET 1) configured to link with a BFD-RS (Set) ID (e.g., 1) in which TRP-specific BFR occurs from a time point after 28 symbols from the last symbol of the PDCCH resource as a BFR response. That is, the UE may update to apply a QCL filter 20-77 having one activated TCI state linked with the first NBI-RS index in the CORESET 3 or CORESET 0 (lowest CORESET, 20-70), or CORESET 4 or CORESET 2 (highest CORESET, 20-90). Within the corresponding paragraph, the operation in option 1-4) may be limited to the case that ServingCellConfig>enableTwoDefaultTCI-States is not configured with an RRC signal or that upper layer signaling for SFN PDCCH transmission is not configured. In this case, upper layer signaling for SFN PDCCH transmission may be commonly applied to all CORESETs (i.e., the case that upper layer signaling for one corresponding SFN PDCCH transmission is not configured) or may be configured independently for each CORESET (i.e., the case that higher layer signaling for SFN PDCCH transmission for each CORESET for some CORESETs is not configured).

Option 1-5) In M-DCI-based multiple TRP transmission as in 19-00, after the CORESETPoolindex is configured to only 0 or is not configured in the upper layer as in C-1 and C-2 of the above-described Embodiment 8, in the case that the UE transmits two NBI-RS indexes (first NBI-RS index, second NBI-RS index) included in the above-described BFRQ message, the UE may determine QCL assumption based on the first NBI-RS index and the second NBI-RS index in all CORESETs (e.g., (CORESET 3, CORESET 4) or {CORESET 0, CORESET 1}) configured to the BFD-RS set ID (e.g., BFD-RS set #1) in which TRP-specific BFR occurs from a time after 28 symbols from the last symbol of the PDCCH resource as a BFR response.

For example, the UE may apply all QCL filters 20-77 and 20-75 using one activated TCI state linked with the first NBI-RS index and another activated TCI state linked with the second NBI-RS index in {CORESET 3 and CORESET 4} or {CORESET 0 and CORESET 1}. In this case, the UE may receive all CORESETs in the form of an SFN using two TCI states or the UE may arbitrarily select one of two TCI states to receive all CORESETs. Alternatively, the UE may apply the QCL filter 20-77 using one activated TCI state linked with the first NBI-RS index (NBI-RS with the best reception signal) in the lowest CORESET (e.g., CORESET 3 or CORESET 0 for TRP-B) and apply the QCL filter 20-75 using another activated TCI state linked with the second NBI-RS index (NBI-RS with the next best reception signal) in the remaining CORESET (e.g., CORESET 4 or CORESET 1 for TRP-B). Within the corresponding paragraph, the operation in option 1-5) may be limited to the case that ServingCellConfig>enableTwoDefaultTCI-States is configured with an RRC signal and that upper layer signaling for SFN PDCCH transmission is configured. In this case, upper layer signaling for SFN PDCCH transmission may be commonly applied to all CORESETs (i.e., the case that upper layer signaling for one corresponding SFN PDCCH transmission is configured) or may be configured independently for each CORESET (i.e., the case that higher layer signaling for SFN PDCCH transmission for all CORESETs is configured).

Alternatively, the UE may determine QCL assumption based on the first NBI-RS index and the second NBI-RS index in some CORESETs (e.g., lowest/highest CORESET; CORESET 3/4 among CORESET 3 and CORESET 4 or CORESET 0/1 among CORESET 0 and CORESET 1) configured to link with an BFD-RS (set) ID (e.g., 1) in which TRP-specific BFR occurs from a time point after 28 symbols from the last symbol of the PDCCH resource as a BFR response. That is, the UE may apply all QCL filters 20-77 and 20-75 using one activated TCI state linked with the first NBI-RS index or another activated TCI state linked with the second NBI-RS index in the CORESET 3 (or CORESET 4). In this case, the UE may receive some corresponding CORESETs in the form of an SFN using two TCI states, or the UE may arbitrarily select and receive one of two TCI states. Within the corresponding paragraph, the operation in option 1-5) may be limited to the case that ServingCellConfig>enableTwoDefaultTCI-States is configured with an RRC signal and that upper layer signaling for SFN PDCCH transmission is configured. In this case, upper layer signaling for SFN PDCCH transmission may be commonly applied to all CORESETs (i.e., the case that upper layer signaling for one corresponding SFN PDCCH transmission is configured) or may be configured independently for each CORESET (the case that higher layer signaling for SFN PDCCH transmission for each CORESET for some CORESETs is configured).

Option 1-6) In S-DCI-based multiple TRP transmission as in 19-50, after the CORESETPoolindex is configured to only 0 or is not configured in the upper layer as in C-3 and C-4 of the above-described Embodiment 8, in the case that the UE transmits two NBI-RS indexes (first NBI-RS index, second NBI-RS index) included in the above-described BFRQ message, the UE may determine QCL assumption based on one (e.g., first NBI-RS index) of the first NBI-RS index and the second NBI-RS index in all CORESETs (e.g., {CORESET 3, CORESET 4} or {CORESET 0, CORESET 1}) configured in a BFD-RS set ID (e.g., BFD-RS set #1) in which TRP-specific BFR occurs from a time point after 28 symbols from the last symbol of the PDCCH resource as a BFR response. That is, the UE may apply the QCL filter 20-77 using one activated TCI state linked with the first NBI-RS index in the CORESET 3 and CORESET 4. Here, the second NBI-RS index not used in CORESET monitoring may be determined to be configured for default QCL assumption in the PDSCH. For another example, the UE may apply one QCL filter 20-77 linked with the first NBI-RS index in the CORESET 0 and CORESET 1 in consideration of the activated TCI state already monitored in the TRP-A in {CORESET 0 and CORESET 1}. The first NBI-RS index may be determined based on the NBI-RS with the best reception signal, or the UE may arbitrarily select one. Within the corresponding paragraph, the operation in option 1-6) may be limited to the case that ServingCellConfig>enableTwoDefaultTCI-States is not configured with an RRC signal or that upper layer signaling for SFN PDCCH transmission is not configured. In this case, upper layer signaling for SFN PDCCH transmission may be commonly applied to all CORESETs (i.e., the case that upper layer signaling for one corresponding SFN PDCCH transmission is not configured) or may be configured independently for each CORESET (i.e., the case that upper layer signaling for SFN PDCCH transmission for all CORESETs is not configured). Alternatively, the UE may determine QCL assumption based on the first NBI-RS index and the second NBI-RS index in some CORESETs (e.g., lowest/highest CORESET; CORESET 3/4 among CORESET 3 and CORESET 4 or CORESET 0/1 among CORESET 0 and CORESET 1) configured to link with a BFD-RS (Set) ID (e.g., 1) in which TRP-specific BFR occurs from a time point after 28 symbols from the last symbol of the PDCCH resource as a BFR response. That is, the UE may apply a QCL filter (e.g., 20-77) using one activated TCI state linked with the first NBI-RS index in the CORESET 3 (or CORESET 4). Here, the second NBI-RS index not used in CORESET monitoring may be determined to be configured for default QCL assumptions 20-85 and 20-87 in the PDSCH. Alternatively, the UE may apply the QCL filter 20-77 using one activated TCI state linked with the first NBI-RS index in the lowest CORESET (e.g., for TRP-B or CORESET 0). For another example, the UE may apply one QCL filter 20-77 linked with the first NBI-RS index at the CORESET 0 for the TRP-B in consideration of an activated TCI state already monitored in the TRP-A at the lowest CORESET (e.g., CORESET 0). The first NBI-RS index may be determined based on the NBI-RS with the best reception signal or the UE may arbitrarily select one. Within the corresponding paragraph, the operation in option 1-6) may be limited to the case that ServingCellConfig>enableTwoDefaultTCI-States is not configured with an RRC signal or that upper layer signaling for SFN PDCCH transmission is not configured. In this case, upper layer signaling for SFN PDCCH transmission may be commonly applied to all CORESETs (i.e., the case that upper layer signaling for one corresponding SFN PDCCH transmission is not configured) or may be configured independently for each CORESET (i.e., the case that higher layer signaling for SFN PDCCH transmission for each CORESET for some CORESETs is not configured).

Embodiment 12: Default PUCCH Transmission Operation after Receiving BFR Response In Embodiment 11, based on the TCI configuration and QCL assumption determined to receive a CORESET according to option 1-1 to option 1-6, the UE may apply the same spatial QCL filter as that of spatial QCL corresponding to $q_{new}$ (e.g., first NBI-RS and/or second NBI-RS) identified in the TRP-specific BFR process to transmit a PUCCH until performing TCI-related update by receiving a MAC CE message. That is, the UE may determine a spatial QCL or TCI configuration based on at least one NBI-RS index of the first NBI-RS index or the second NBI-RS index, and apply the same spatial QCL filter to transmit a PUCCH. For example, the UE may apply the same spatial QCL filter as that of the spatial QCL corresponding to an NBI-RS with the best reception signal among the first NBI-RS index and the second NBI-RS index to transmit a PUCCH. For another example, the UE may apply a spatial QCL filter determined in the lowest (or highest) NBI-RS index and CORESET ID to transmit a PUCCH.

Further, when calculating pathloss for uplink transmission power, the UE that has performed TRP-specific BFR may update the identified RS (e.g., the RS corresponding to at least one of the first NBI-RS index or the second NBI-RS index; $q_d$) to $q_{new}$ based on the at least one identified RS.

Embodiment 13: Default PDSCH Reception Operation after Receiving BFR Response

In various embodiments described above, a UE that has performed CORESET monitoring after TRP specific BFR requires a default QCL assumption operation for PDSCH reception scheduled in a PDCCH. The following description may be related to cases 1 to 5 according to the number of TCI states of the PDCCH and PDSCH described in Table 13.

In FIGS. 20, 20-20 and 20-70 illustrate reception operation of PDSCHs 20-40 and 20-80 scheduled at PDCCHs 20-20, 20-30, and 20-70 after receiving a BFR response message (e.g., 20-10 or 20-60) transmitted from a TRP-A 20-00 and TRP-B 20-50.

Option 2-1) In the case that the base station configures ServingCellConfig>enableTwoDefaultTCI-States to enabled in an RRC configuration to a specific UE and that as in options 1-1 and 1-4 described above, the UE includes and transmits one NBI-RS index (first NBI-RS index) in the BFRQ message during the BFR process, the base station and the UE may identify that one default spatial QCL assumption has been configured for at least one PDSCH (e.g., PDCCH #2) scheduled in the PDCCH (e.g., PDCCH #4) in the CORESET (e.g., CORESET 3, CORESET 4) within the BWP. That is, the UE may assume that QCL assumption 20-87 of the PDSCH (e.g., PDSCH #1) scheduled by the PDCCH (e.g., PDCCH #4) in the CORESET is the same as the QCL assumption 20-77 of the CORESET according to the RS resource (first NBI-RS index) for the candidate beam in the BFD-RS set ID (e.g., BFD-RS set #1) or coresetpoolindex (e.g., coresetpoolindex 1) previously described in the Embodiment 9. In this case, the UE may not be configured with upper layer signaling for SFN PDSCH transmission.

Option 2-2) In the case that the base station configures ServingCellConfig>enableTwoDefaultTCI-States to enabled in an RRC configuration to a specific UE and that as in option 1-2 described above, the UE includes and transmits two NBI-RS indexes (first NBI-RS index, second NBI-RS index) in the BFRQ message during the BFR process, the base station and the UE may identify that two default spatial QCL assumptions 20-85 and 20-87 have been configured for at least one PDSCH (e.g., PDSCH #2) scheduled in the CORESET (e.g., CORESET 3, CORESET 4) within the BWP. That is, the UE may assume that the assumptions 20-85 and 20-87 of the PDSCH (e.g., PDSCH #2) scheduled by the PDCCH (e.g., PDCCH #4, 20-70) in the CORESET is the same as QCL assumptions 20-75 and 20-77 of the CORESET according to RS resources (first NBI-RS index and second NBI-RS index) for a candidate beam in the BFD-RS set ID (e.g., BFD-RS set #1) or coresetpoolindex (e.g., coresetpoolindex 1) (e.g., CSI-RS #4) previously described in the Embodiment 9 (Case 2 and Case 5 in Table 13). In this case, the UE may be configured with upper layer signaling for SFN PDSCH transmission.

In the case that the base station configures ServingCellConfig>enableTwoDefaultTCI-States to enabled in an RRC configuration to a specific UE and that as in option 1-3 described above, the UE includes and transmits two NBI-RS indexes (first NBI-RS index, second NBI-RS index) in the BFRQ message during the BFR process, the base station and the UE may identify that two default spatial QCL assumptions 20-85 and 20-87 have been configured for at least one PDSCH (e.g., PDSCH #2) scheduled in a PDCCH (PDCCH #4, 20-70) within all CORESETs (e.g., CORESET 3, CORESET 4) configured to link with a CORESETPoolindex (e.g., CORESETPoolindex 1) or BFD-RS set ID (e.g., BFD-RS set #1) within the BWP. That is, the UE may determine that TwoDefaultTCI-States of the PDSCH (e.g., PDSCH #2) scheduled by the PDCCH (e.g., PDCCH #4) in the CORESET are updated to the first NBI-RS index and the second NBI-RS index according to RS resources (first NBI-RS index and second NBI-RS index) for a candidate beam in the BFD-RS set ID (e.g., BFD-RS set #1) or coresetpoolindex (e.g., coresetpoolindex 1) previously described in the Embodiment 9. The UE may apply the QCL filter 20-77 linked with the first NBI-RS index to QCL assumption of the PDCCH (e.g., PDCCH #4) in the CORESET and receive the PDCCH, and apply QCL filters 20-85 and 20-87 linked with the first NBI-RS index and the second NBI-RS index to QCL assumption of the PDSCH (e.g., PDSCH #2) and receive the PDSCH. In this case, the UE may be configured with upper layer signaling for SFN PDSCH transmission.

In this way, the base station and the UE may apply the QCL filter linked with the first NBI-RS index and the second NBI-RS index until receiving an additional MAC CE message (Case 3 and case 4 in Table 13) PDSCH (e.g., PDSCH #2).

Option 2-3) In the case that the base station configures ServingCellConfig>enableTwoDefaultTCI-States to disabled in an RRC configuration to a specific UE and that as in option 1-5 described above, the UE includes and transmits two NBI-RS indexes (first NBI-RS index, second NBI-RS index) in the BFRQ message during the BFR process, the base station and the UE may identify that one default spatial QCL assumption 20-85 or 20-87 is configured for at least one PDSCH (e.g., PDSCH #2) scheduled in all CORESETs (e.g., CORESET 3, CORESET 4) configured to link with the BFD-RS set ID (e.g., BFD-RS set #1) and the BFD-RS ID in the BWP. That is, the UE may determine that default QCL assumption 20-85 or 20-87 of the PDSCH(s) scheduled by the PDCCH (e.g., PDCCH #4) in the CORESETs (e.g., CORESET 3, CORESET 4) is determined based on one (e.g., the first NBI-RS index 20-85) of the first NBI-RS index and the second NBI-RS index according to RS resources (first NBI-RS index, second NBI-RS index) for a candidate beam in the BFD-RS set ID (e.g., BFD-RS set #1) and the BFD-RS ID previously described in the Embodiment 9. When the UE receives a PDCCH #4 using the QCL filter 20-77 linked with the first NBI-RS index, receives the PDSCH #2 scheduled in the PDCCH #4 using the QCL filter 20-87 linked with the first NBI-RS index, and receives the PDSCH #4 using the QCL filter 20-85 linked with the second NBI-RS index, the UE may receive the PDSCH #2 scheduled in the PDCCH #4 using the QCL filter 20-85 linked with the first NBI-RS index. In this case, the UE may not be configured with upper layer signaling for SFN PDSCH transmission.

In the case that the base station configures ServingCellConfig>enableTwoDefaultTCI-States to disabled in an RRC configuration to a specific UE and that as in option 1-6 described above, the UE includes and transmits two NBI-RS indexes (first NBI-RS index, second NBI-RS index) in the BFRQ message during the BFR process, the base station and the UE may identify that one default spatial QCL assumption 20-87 has been configured for at least one PDSCH scheduled in some specific CORESET (e.g., CORESET 3) configured to link with the BFD-RS set ID (e.g., BFD-RS set #1) and the BFD-RS ID within the BWP. That is, the UE may determine that default QCL assumption 20-85 or 20-87 of the PDSCH(s) scheduled by the PDCCH in the CORESET (e.g., CORESET 3) is determined based on one (e.g., the RS index 20-85 with the best first NBI-RS index link) of the first NBI-RS index and the second NBI-RS index according to RS resources (first NBI-RS index and second NBI-RS index) for a candidate beam in the BFD-RS set ID (e.g., #1) and BFD-RS ID (e.g., CSI-RS #4) previously described in the Embodiment 9. The UE may receive a PDCCH #4 using the QCL filter 20-77 linked with the first NBI-RS index, and receive a PDSCH #2 scheduled in the PDCCH #4 using the QCL filter 20-87 linked with the first NBI-RS index. In this case, the UE may not be configured with upper layer signaling for SFN PDSCH transmission.

In this way, the base station and the UE may apply the QCL filter linked with the first NBI-RS index and the second NBI-RS index for reception of the at least one PDSCH(s) until receiving an additional MAC CE message (case 2, case 4, and case 5 in Table 13).

Figure 21:
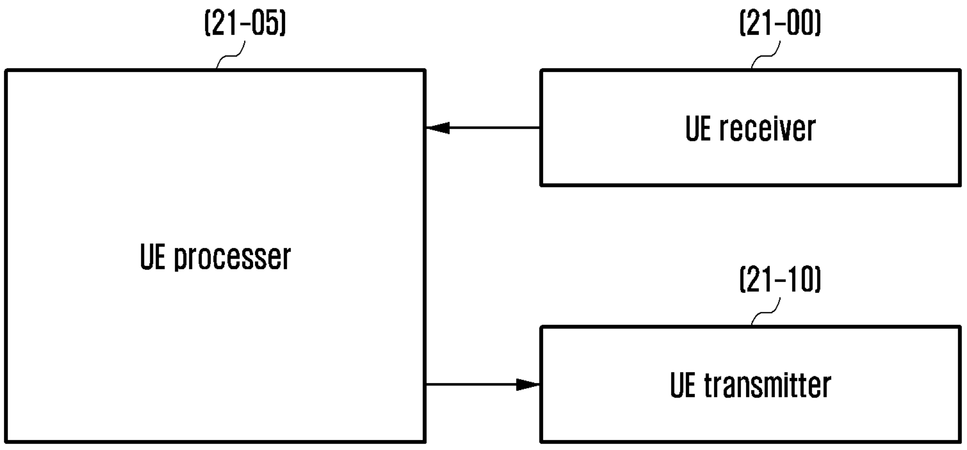
FIG. 21 is a block diagram illustrating a UE structure according to an embodiment of the disclosure.

FIG. 21 is a block diagram illustrating a structure of a UE according to an embodiment of the disclosure.

With reference to FIG. 21, the UE may include a transceiver composed of a receiver 21-00 and a transmitter 21-10, and a processer (or controller) 21-05 including a memory and a processor. According to a communication method of the UE described above, the transceivers 21-00 and 21-10 and the processer 21-05 of the UE may operate. However, the components of the UE are not limited to the examples described above. For example, the UE may include more or fewer components than the above-described components. Further, the transceivers 21-00 and 21-10 and the processer 21-05 may be implemented in the form of a single chip.

The transceivers 21-00 and 21-10 may transmit and receive signals to and from a base station (or TRP). Here, the signal may include control information and data. To this end, the transceivers 21-00 and 21-10 may include an RF transmitter for up-converting and amplifying a frequency of a transmitted signal, and an RF receiver for amplifying a received signal with low noise and down-converting a frequency thereof. However, this is only an example of the transceivers 21-00 and 21-10, and the components of the transceivers 21-00 and 21-10 are not limited to the RF transmitter and RF receiver.

Further, the transceivers 21-00 and 21-10 may receive signals through a wireless channel and output the signals to the processer 21-05, and transmit the signal output from the processer 21-05 through a wireless channel.

The processer 21-05 may store programs and data necessary for an operation of the UE, and be implemented into one or more processors. Further, the processer 21-05 may store control information or data included in the signal acquired from the UE. The processer 21-05 may include a memory composed of a storage medium such as a read-only memory (ROM), random-access memory (RAM), hard disk, compact disc read-only memory (CD-ROM), and digital versatile disc (DVD), or a combination of storage media.

Further, the processer 21-05 may control a series of processes so that the UE may operate according to the above-described embodiment. According to some embodiments, the processer 21-05 may receive DCI composed of two layers and control the components of the UE to simultaneously receive multiple PDSCHs. For example, the processer 21-05 may acquire information on at least one reference signal for beam failure detection and identify whether beam failure is detected for each of a first reference signal, a second reference signal set, and a third reference signal set included in the at least one reference signal, and in the case that the beam failure is detected for at least one of the first reference signal, the second reference signal set, and the third reference signal set, the processer 21-05 may control the transceivers 21-00 and 21-10 to transmit beam failure recovery request information for the reference signal set in which the beam failure is detected. Here, the first reference signal set may correspond to a first control resource set (CORESET) pool, the second reference signal set may correspond to a second CORESET pool, and the third reference signal set may correspond to a cell related to the first CORESET pool and the second CORESET pool.

Figure 22:
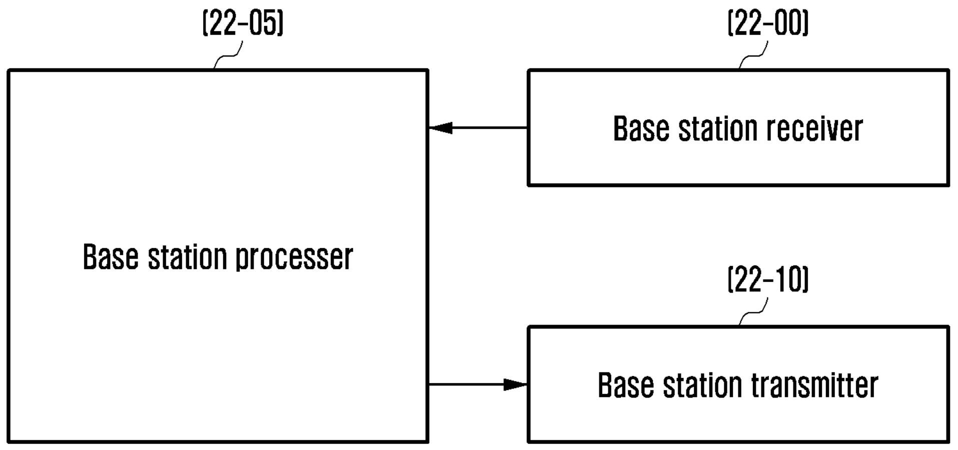
FIG. 22 is a block diagram illustrating a base station structure according to an embodiment of the disclosure.

FIG. 22 is a block diagram illustrating a structure of a base station (or TRP) according to an embodiment of the disclosure.

With reference to FIG. 22, the base station (or TRP) may include a transceiver including a receiver 22-00 and a transmitter 22-10, and a processer (or controller) 22-05 including a memory and a processor. According to a communication method of the base station (or TRP) described above, the transceivers 22-00 and 22-10 and the processer 22-05 of the base station (or TRP) may operate. However, the components of the base station (or TRP) are not limited to the examples described above. For example, the base station (or TRP) may include more or fewer components than the above-described components. Further, the transceivers 22-00 and 22-10 and the processer 22-05 may be implemented in the form of a single chip.

The transceivers 22-00 and 22-10 may transmit and receive signals to and from the UE. Here, the signal may include control information and data. For this purpose, the transceivers 22-00 and 22-10 may include an RF transmitter for up-converting and amplifying a frequency of a transmitted signal, and an RF receiver for amplifying a received signal with low noise and down-converting a frequency thereof. However, this is only an example of the transceivers 22-00 and 22-10, and the components of the transceivers 22-00 and 22-10 are not limited to the RF transmitter and RF receiver.

Further, the transceivers 22-00 and 22-10 may receive signals through a wireless channel and output the signals to the processer 22-05, and transmit the signal output from the processer 22-05 through a wireless channel.

The processer 22-05 may store programs and data necessary for an operation of the base station (or TRP), and be implemented into one or more processors. Further, the processer 22-05 may store control information or data included in the signal acquired from the base station (or TRP). The processer 22-05 may include a memory composed of a storage medium such as a ROM, RAM, hard disk, CD-ROM, and DVD, or a combination of storage media.

The processer 22-05 may control a series of processes so that the base station (or TRP) may operate according to the above-described embodiment of the disclosure. According to some embodiments, the processer 22-05 may control each component of the base station (or TRP) to constitute DCI including allocation information on a PDSCH and transmit the DCI. For example, the processer 22-05 may control the transceivers 22-00 and 22-10 to transmit information on at least one reference signal for beam failure detection to the UE, and in the case that beam failure is detected for at least one of a first reference signal set, a second reference signal set, or a third reference signal set included in the at least one reference signal, the processer 22-05 may control the transceivers 22-00 and 22-10 to receive beam failure recovery request information for the reference signal set in which beam failure is detected from the UE. Here, the first reference signal set may correspond to a first control resource set (CORESET) pool, the second reference signal set may correspond to a second CORESET pool, and the third reference signal set may correspond to a cell related to the first CORESET pool the second CORESET pool.

Embodiments of the disclosure disclosed in this specification and drawings merely present specific examples to easily describe the technical content of the disclosure and help the understanding of the disclosure, and are not intended to limit the scope of the disclosure. That is, it will be apparent to those of ordinary skill in the art to which the disclosure pertains that other modifications based on the technical spirit of the disclosure may be implemented. Further, each of the above embodiments may be operated in combination with each other, as needed. For example, parts of the first to seventh embodiments of the disclosure may be combined to operate the base station and the UE.

In the specific embodiments of the disclosure described above, components included in the disclosure were expressed in the singular or plural according to the presented specific embodiments. However, the singular or plural expression is appropriately selected for a situation presented for convenience of description, and the disclosure is not limited to the singular or plural components, and even if a component is represented in the plural, it may be formed with the singular, or even if a component is represented in the singular, it may be formed with the plural.

In the detailed description of the disclosure, although specific embodiments have been described, various modifications are possible without departing from the scope of the disclosure. Therefore, the scope of the disclosure should not be limited to the described embodiments and should be defined by the claims described below as well as by those equivalent to the claims.

The invention claimed is:

1. A method performed by a terminal in a wireless communication system, the method comprising:

receiving, from a base station, a radio resource control message including information on a plurality of beam failure detection sets;

determining whether beam failure for one or more reference signals included in a beam failure detection set among the plurality of beam failure detection sets is detected;

identifying, in case that beam failure for the one or more reference signals is detected, at least one candidate beam reference signal based on a candidate beam set associated with the beam failure detection set in which the beam failure is detected;

transmitting, to the base station, based on a spatial filter, a scheduling request for a beam failure recovery on a physical uplink control channel resource;

receiving, from the base station, an uplink grant in response to the scheduling request; and transmitting, to the base station, a medium access control (MAC) control element (CE) for a beam failure recovery request on a physical uplink shared channel resource based on the uplink grant, the MAC CE including information on the at least one candidate beam reference signal, wherein, in case that the terminal is configured for a control resource set pool index 0 and a control resource set pool index 1, the spatial filter corresponds to a control resource set pool index associated with the beam failure detection set in which the beam failure is detected.

2. The method of claim 1, further comprising:

receiving from the base station downlink control information in response to the beam failure recovery request; and monitoring a physical downlink control channel on a control resource set pool based on a transmission configuration indicator state corresponding to the at least one candidate beam reference signal after receiving the downlink control information and a plurality of symbols.

3. The method of claim 2, further comprising:

in case that the physical downlink control channel is received, receiving, from the base station, a physical downlink shared channel scheduled by the physical downlink control channel based on the transmission configuration indicator state corresponding to the at least one candidate beam reference signal.

4. The method of claim 2, wherein the beam failure detection set, the control resource set pool, and the candidate beam set are linked based on the control resource set pool, and the control resource set pool is associated with at least one of one or more transmission reception points.

5. The method of claim 2, wherein the beam failure detection set, the control resource set pool, and the candidate beam set are linked based on an identifier of the beam failure detection set, and the control resource set pool is associated with at least one of one or more transmission reception points.

6. A terminal of a wireless communication system, the terminal comprising:

a transceiver; and at least one processor comprising processing circuitry, the at least one processor configured, individually and/or collectively, to:

receive, from a base station, a radio resource control message including information on a plurality of beam failure detection sets;

determine whether beam failure for one or more reference signals included in a beam failure detection set among the plurality of beam failure detection sets is detected;

identify, in case that beam failure for the one or more reference signals is detected, at least one candidate beam reference signal based on a candidate beam set associated with the beam failure detection set in which the beam failure is detected;

transmit, to the base station, based on a spatial filter, a scheduling request for a beam failure recovery on a physical uplink control channel resource;

receive, from the base station, an uplink grant in response to the scheduling request; and transmit, to the base station, a medium access control (MAC) control element (CE) for a beam failure recovery request on a physical uplink shared channel resource based on the uplink grant, the MAC CE including information on the at least one candidate beam reference signal, wherein, in case that the terminal is configured for a control resource set pool index 0 and a control resource set pool index 1, the spatial filter corresponds to a control resource set pool index associated with the beam failure detection set in which the beam failure is detected.

7. The terminal of claim 6, wherein the at least one processor is configured, individually and/or collectively, to:

receive, from the base station, downlink control information in response to the beam failure recovery request, and monitor a physical downlink control channel on a control resource set pool based on a transmission configuration indicator state corresponding to the at least one candidate beam reference signal after receiving the downlink control information and a plurality of symbols.

8. The terminal of claim 7, wherein in case that the physical downlink control channel is received, the at least one processor is configured, individually and/or collectively, to receive, from the base station, a physical downlink shared channel scheduled by the physical downlink control channel based on the transmission configuration indicator state corresponding to the at least one candidate beam reference signal.

9. The terminal of claim 7, wherein the beam failure detection set, the control resource set pool, and the candidate beam set are linked based on the control resource set pool, and the control resource set pool is associated with at least one of one or more transmission reception points.

10. The terminal of claim 7, wherein the beam failure detection set, the control resource set pool, and the candidate beam set are linked based on an identifier of the beam failure detection set, and the control resource set pool is associated with at least one of one or more transmission reception points.

11. A method performed by a base station in a wireless communication system, the method comprising:

transmitting, to a terminal, a radio resource control message including information on a plurality of beam failure detection sets;

receiving from the terminal, a scheduling request for a beam failure recovery on a physical uplink control channel resource, wherein the scheduling request is transmitted based on a spatial filter;

transmitting, to the terminal, an uplink grant in response to the scheduling request; and receiving, from the terminal, a medium access control (MAC) control element (CE) for a beam failure recovery request on a physical uplink shared channel resource based on the uplink grant, the MAC CE including information on at least one candidate beam reference signal, wherein, in case that the terminal is configured for a control resource set pool index 0 and a control resource set pool index 1, the spatial filter corresponds to a control resource set pool index associated with a beam failure detection set in which the beam failure is detected, and wherein beam failure is identified based on one or more reference signals included in the plurality of beam failure detection sets.

12. The method of claim 11, further comprising:

transmitting downlink control information to the terminal in response to the MAC CE for the beam failure recovery request, wherein a physical downlink control channel is monitored based on a transmission configuration indicator state corresponding to the at least one candidate beam reference signal on a control resource set pool after transmitting the downlink control information and a plurality of symbols to the terminal.

13. A base station of a wireless communication system, the base station comprising:

a transceiver; and at least one processor comprising processing circuitry, the at least one processor configured, individually and/or collectively, to:

transmit, to a terminal, a radio resource control message including information on a plurality of beam failure detection sets;

receive, from the terminal, a scheduling request for a beam failure recovery on a physical uplink control channel resource, wherein the scheduling request is transmitted based on a spatial filter;

transmit to the terminal, an uplink grant in response to the scheduling request; and receive, from the terminal, a medium access control (MAC) control element (CE) for a beam failure recovery request on a physical uplink shared channel resource based on the uplink grant, the MAC CE including information on at least one candidate beam reference signal, wherein, in case that the terminal is configured for a control resource set pool index 0 and a control resource set pool index 1, the spatial filter corresponds to a control resource set pool index with a beam failure detection set in which the beam failure is detected, and wherein beam failure is identified based on one or more reference signals included in the plurality of beam failure detection sets.

14. The base station of claim 13, wherein the at least one processor is configured, individually and/or collectively, to:

transmit downlink control information to the terminal in response to the MAC CE for the beam failure recovery request, wherein a physical downlink control channel is monitored based on a transmission configuration indicator state corresponding to the at least one candidate beam reference signal on a control resource set pool after transmitting the downlink control information and a plurality of symbols to the terminal.

* * * * *